United States Patent
Kondo et al.

(10) Patent No.: US 9,401,655 B2
(45) Date of Patent: Jul. 26, 2016

(54) POWER CONVERSION APPARATUS WITH INVERTER CIRCUIT AND SERIES CONVERTER CIRCUIT HAVING POWER FACTOR CONTROL

(75) Inventors: Ryota Kondo, Tokyo (JP); Satoshi Murakami, Tokyo (JP); Masaki Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 215 days.

(21) Appl. No.: 14/234,536
(22) PCT Filed: May 22, 2012
(86) PCT No.: PCT/JP2012/063015
§ 371 (c)(1),
(2), (4) Date: Mar. 6, 2014
(87) PCT Pub. No.: WO2013/035383
PCT Pub. Date: Mar. 14, 2013

(65) Prior Publication Data
US 2014/0233279 A1    Aug. 21, 2014

(30) Foreign Application Priority Data
Sep. 8, 2011 (JP) ................................. 2011-195537

(51) Int. Cl.
| H02M 7/217 | (2006.01) |
| H02M 5/458 | (2006.01) |
| H02M 7/797 | (2006.01) |
| H02M 1/42  | (2007.01) |
| H02M 1/00  | (2006.01) |

(52) U.S. Cl.
CPC ............ *H02M 5/4585* (2013.01); *H02M 7/217* (2013.01); *H02M 1/4208* (2013.01); *H02M 7/797* (2013.01); *H02M 2001/0067* (2013.01)

(58) Field of Classification Search
CPC ....... H02M 7/217; H02M 7/28; H02M 7/797; H02M 7/25; H02M 7/21; H02M 2001/0067; H02M 2001/0083; H02M 5/4585; H02M 1/4258; H02M 1/4266; H02M 1/42; H02M 1/4208
See application file for complete search history.

(56) References Cited

U.S. PATENT DOCUMENTS

| 2011/0127838 A1* | 6/2011 | Awane | H02M 7/217 307/75 |
| 2011/0215651 A1* | 9/2011 | Yamada | H02M 1/12 307/75 |

(Continued)

FOREIGN PATENT DOCUMENTS

| CN | 102918758 A | 2/2013 |
| JP | 2009 095160 A | 4/2009 |
| WO | WO2010067467 A1 * | 6/2010 |

OTHER PUBLICATIONS

Combined Office Action and Search Report issued Oct. 23, 2015 in Chinese Patent Application No. 201280043511.0 (with partial English language translation and English translation of categories of cited documents).

(Continued)

*Primary Examiner* — Harry Behm
(74) *Attorney, Agent, or Firm* — Oblon, McClelland, Maier & Neustadt, L.L.P

(57) ABSTRACT

An inverter circuit including a DC capacitor is connected in series to an AC power supply, and at the stage subsequent to the inverter circuit, a smoothing capacitor is connected via a converter circuit. A short-circuit period T for short-circuiting the AC terminals of the converter circuit is provided in one cycle, whereby the converter circuit is controlled, and PWM control is performed for the inverter circuit so as to improve an AC power supply power factor. When current control by the inverter circuit cannot be performed, the PWM control is switched to PWM control for the converter circuit, to perform current control.

10 Claims, 27 Drawing Sheets

(56) References Cited

U.S. PATENT DOCUMENTS

2012/0014139 A1    1/2012   Yamada et al.
2013/0121045 A1*   5/2013   Murakami .............. H02M 7/49
                                                                             363/67

OTHER PUBLICATIONS

International Search Report issued Jun. 26, 2012 in PCT/JP2012/063015 filed May 22, 2012.

* cited by examiner

POWER CONVERSION APPARATUS WITH INVERTER CIRCUIT AND SERIES CONVERTER CIRCUIT HAVING POWER FACTOR CONTROL

TECHNICAL FIELD

The present invention relates to a power conversion apparatus which superimposes the AC-side output of a single-phase inverter onto a power supply output to obtain desired DC voltage.

BACKGROUND ART

In a conventional power conversion apparatus, an output from a first terminal of an AC power supply is connected to a reactor, and at the subsequent stage of the reactor, the AC side of an inverter circuit composed of a single-phase inverter is connected in series. The single-phase inverter in the inverter circuit is composed of a semiconductor switching device and a DC voltage source. In addition, first and second series circuits, which are connected in parallel and each of which is composed of a short-circuit switch and a rectification diode connected in series to form an inverter, are connected between both terminals of a smoothing capacitor at the output stage. The middle point of the first series circuit is connected to an AC output line at the subsequent stage of the inverter circuit, and the middle point of the second series circuit is connected to a second terminal of the AC power supply. Current is controlled and outputted by PWM control such that DC voltage of the smoothing capacitor can be maintained at constant target voltage and the input power factor from the AC power supply is about 1, and voltage generated on the AC side is superimposed onto an input voltage from the AC power supply. The short-circuit switch is turned on to bypass the smoothing capacitor only in a short-circuit phase range centered at a zero cross phase of the phase of the input voltage from the AC power supply, and a voltage instruction for the inverter circuit is corrected in synchronization with ON/OFF switching of the short-circuit switch (for example, see Patent Document 1).

CITATION LIST

Patent Document

Patent Document 1: Japanese Laid-Open Patent Publication No. 2009-095160

SUMMARY OF THE INVENTION

Problems to be Solved by the Invention

In such a power conversion apparatus, the charge/discharge state of the DC voltage source of the inverter circuit is switched by ON/OFF switching of the short-circuit switch, to keep the voltage of the DC voltage source, and the inverter circuit is subjected to output control so as to control the current. However, if the DC voltage of the inverter circuit is low, the current control by the inverter circuit cannot be performed and therefore the voltage of the DC voltage source of the inverter circuit needs to be maintained at comparatively high voltage that allows the current control. As a result, increase in the withstand voltage of the power conversion apparatus is required, and this hinders downsizing and reduction of power loss.

The present invention has been made to solve the above problem, and an object of the present invention is to obtain a small-sized and low-power-loss power conversion apparatus that allows reduction of DC voltage of an inverter circuit and can continue current control reliably.

Solution to the Problems

A power conversion apparatus according to the present invention includes: an inverter circuit including a plurality of semiconductor switching devices and a DC capacitor and connected in series to a first terminal of an AC power supply; a converter circuit including a plurality of semiconductor switching devices provided between DC bus lines, the converter circuit having one AC terminal connected in series to the inverter circuit and the other AC terminal connected to a second terminal of the AC power supply, and being configured to output DC power between the DC bus lines; a smoothing capacitor connected between the DC bus lines, for smoothening output of the converter circuit; and a control circuit for controlling the inverter circuit and the converter circuit such that voltage of the DC capacitor of the inverter circuit follows a set voltage instruction value, voltage of the smoothing capacitor follows target voltage, and a power factor of input current which is current from the AC power supply is 1. The control circuit provides a short-circuit period including a zero cross phase of the AC power supply in which the AC terminals of the converter circuit are continuously short-circuited to bypass the smoothing capacitor, and an open-circuit period in which DC output of the converter circuit is continuously outputted to the smoothing capacitor, and the control circuit thereby causes the voltage of the DC capacitor of the inverter circuit to follow the set voltage instruction value. The control circuit performs PWM control for the inverter circuit in the short-circuit period and in the open-circuit period. The control circuit provides a period for performing PWM control for the converter circuit in accordance with the voltage of the DC capacitor, and controls the power factor of the input current to be 1 by switching the PWM control for the inverter circuit and the PWM control for the converter circuit therebetween.

Effect of the Invention

In the power conversion apparatus according to the present invention, the control circuit provides a period for performing PWM control for the converter circuit in accordance with the voltage of the DC capacitor, and controls the power factor of the input current to be 1 by switching the PWM control for the inverter circuit and the PWM control for the converter circuit therebetween. Therefore, the current control can be continued without the need of maintaining the DC voltage of the inverter circuit at high voltage. Thus, it becomes possible to reduce the DC voltage of the inverter circuit and continue the current control reliably, thereby allowing downsizing and power loss reduction of the power conversion apparatus.

DESCRIPTION OF EMBODIMENTS

Embodiment 1

Figure 1:
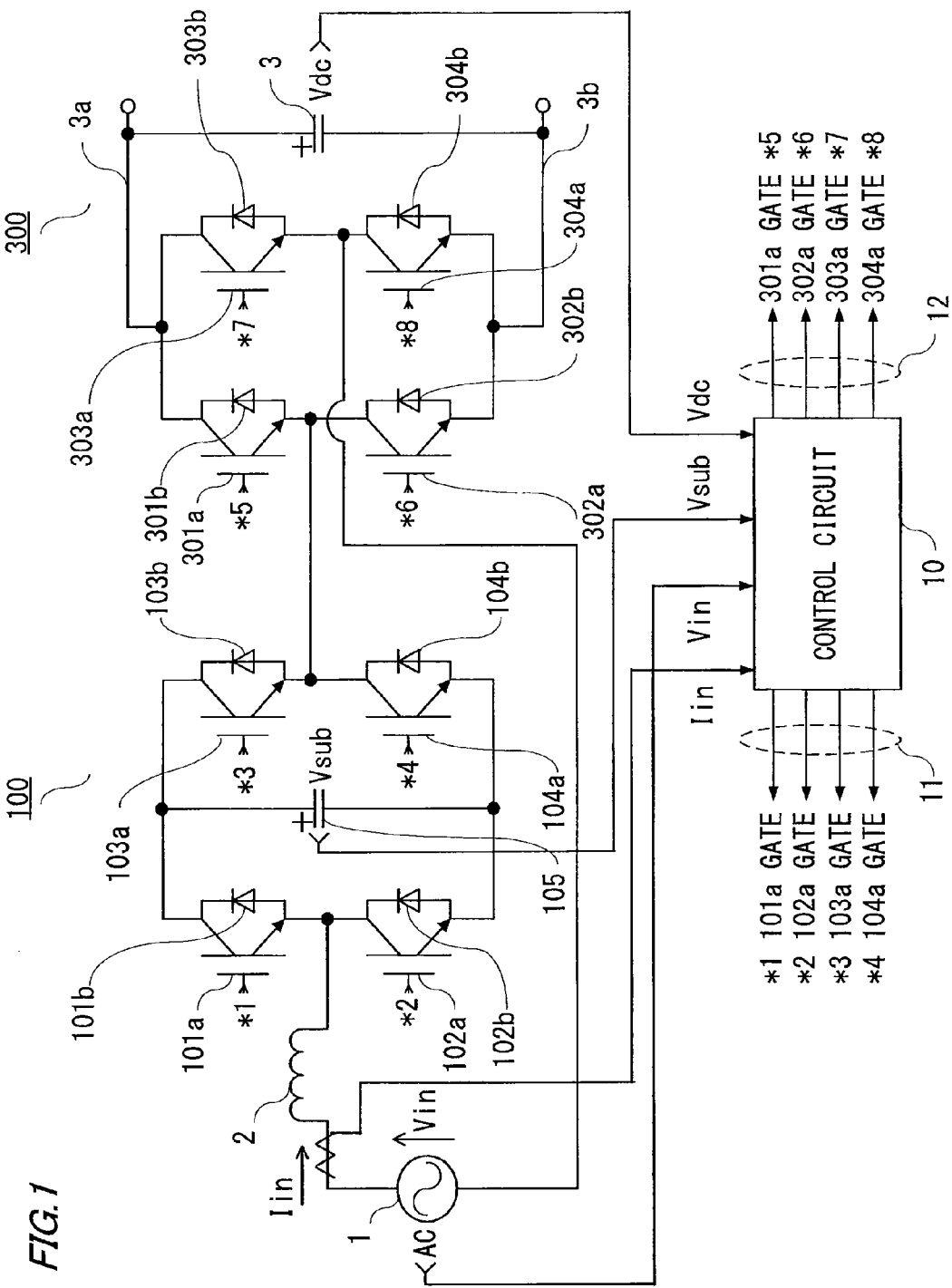
FIG. 1 is a configuration diagram of a power conversion apparatus according to embodiment 1 of the present invention.

Hereinafter, a power conversion apparatus according to embodiment 1 of the present invention will be described. FIG. 1 is a schematic configuration diagram of the power conversion apparatus according to embodiment 1 of the present invention.

As shown in FIG. 1, the power conversion apparatus includes a main circuit for converting AC power of an AC power supply 1 to DC power and outputting the DC power, and a control circuit 10.

The main circuit includes a reactor 2 as a current-limiting circuit, an inverter circuit 100, a converter circuit 300, and a smoothing capacitor 3. An output from a first terminal of the AC power supply 1 is connected to the reactor 2, and at the subsequent stage of the reactor 2, the AC side of the inverter circuit 100 composed of a single-phase inverter is connected in series. One of the AC terminals of the converter circuit 300 is connected to an AC output line at the subsequent stage of the inverter circuit 100, and the other AC terminal is connected to a second terminal of the AC power supply 1. The converter circuit 300 outputs DC power to the smoothing capacitor 3 connected between DC bus lines 3a and 3b of the converter circuit 300.

The single-phase inverter in the inverter circuit 100 is an inverter with a full-bridge configuration, composed of: a plurality of semiconductor switching devices 101a to 104a such as IGBTs (Insulated Gate Bipolar Transistors) to which diodes 101b to 104b are respectively connected in reverse-parallel; and a DC capacitor 105.

The converter circuit 300 has a plurality of semiconductor switching devices 301a to 304a between the DC bus lines. In this case, the converter circuit 300 is composed of two bridge circuits connected in parallel between the DC bus lines, each of which includes two of the plurality of semiconductor switching devices 301a to 304a such as IGBTs to which diodes 301b to 304b are respectively connected in reverse-parallel.

An AC output line at the subsequent stage of the inverter circuit 100 is connected to a connection point between the emitter of the semiconductor switching device 301a and the collector of the semiconductor switching device 302a of the converter circuit 300. A connection point between the emitter of the semiconductor switching device 303a and the collector of the semiconductor switching device 304a is connected to the second terminal of the AC power supply 1.

It is noted that, instead of IGBTs, the semiconductor switching devices 101a to 104a and 301a to 304a may be, for example, a MOSFET (Metal Oxide Semiconductor Field Effect Transistor) having a diode between the source and the drain.

The reactor 2 may be connected in series between the inverter circuit 100 and the converter circuit 300.

Based on voltage Vsub of the DC capacitor 105 of the inverter circuit 100, voltage Vdc of the smoothing capacitor 3, and voltage Vin and current Iin from the AC power supply 1, the control circuit 10 generates a gate signal 11 to the semiconductor switching devices 101a to 104a of the inverter circuit 100, and a gate signal 12 to the semiconductor switching devices 301a to 304a of the converter circuit 300 to perform output control for the inverter circuit 100 and the converter circuit 300 such that the voltage Vdc of the smoothing capacitor 3 becomes constant target voltage Vdc*.

A load not shown is connected to the smoothing capacitor 3. In a normal state, the voltage Vdc is lower than the target voltage Vdc*, and the control circuit 10 performs output control for the inverter circuit 100 and the converter circuit 300 so as to convert AC power from the AC power supply 1 and supply DC power to the smoothing capacitor 3.

Figure 6:
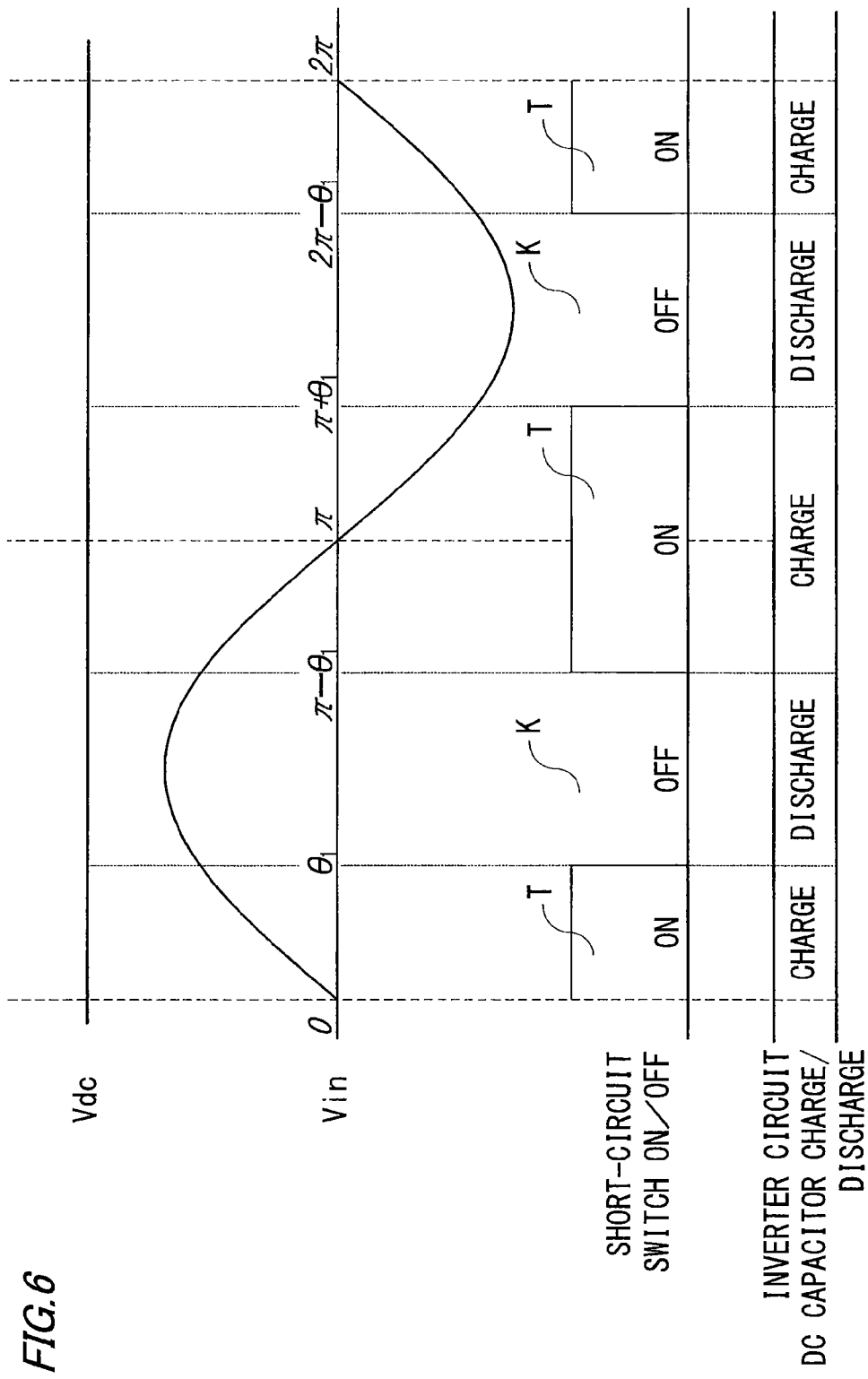
FIG. 6 is a diagram showing a waveform at each section, and charge and discharge of a DC capacitor of an inverter circuit, for explaining basic operation in step-up operation of the power conversion apparatus according to embodiment 1 of the present invention.
Figure 7:
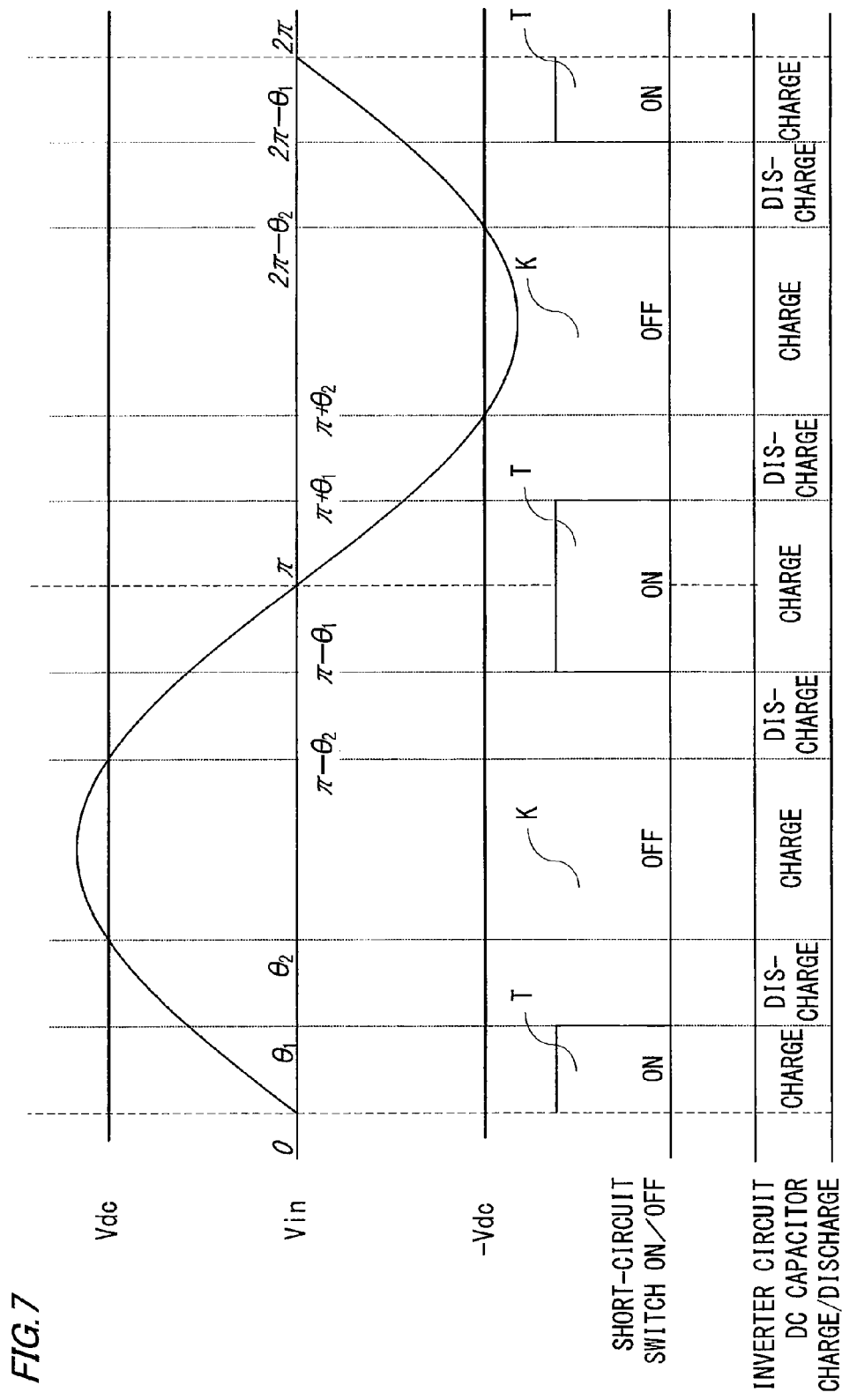
FIG. 7 is a diagram showing a waveform at each section, and charge and discharge of the DC capacitor of the inverter circuit, for explaining basic operation in step-down operation of the power conversion apparatus according to embodiment 1 of the present invention.

Power running operation of the power conversion apparatus having the above configuration, that is, operation of outputting DC power to the smoothing capacitor 3 will be described with reference to the drawings. FIGS. 2 to 5 show current route diagrams in the power running operation. FIG. 6 is a diagram showing the waveform at each section, and charge and discharge of the DC capacitor 105 of the inverter circuit 100, for explaining a basic power running operation in step-up operation of the power conversion apparatus. FIG. 7 is a diagram showing the waveform at each section, and charge and discharge of the DC capacitor 105 of the inverter circuit 100, for explaining a basic power running operation in step-down operation of the power conversion apparatus.

It is noted that the operation in which the voltage Vdc of the smoothing capacitor 3 at the output stage is higher than peak voltage Vp of the voltage Vin of the AC power supply 1 is referred to as "step-up operation", and the operation in which the voltage Vdc of the smoothing capacitor 3 at the output stage is lower than the peak voltage Vp of the voltage Vin of the AC power supply 1 is referred to as "step-down operation". In addition, FIGS. 6 and 7 show the states in which the voltage Vdc of the smoothing capacitor 3 is controlled to be the constant target voltage Vdc*.

The voltage Vin from the AC power supply 1 has waveforms as shown in FIGS. 6 and 7. The inverter circuit 100 controls and outputs the current Iin by PWM control such that the input power factor from the AC power supply 1 is about 1, and superimposes a generated voltage at the AC side onto the voltage Vin which is an output of the AC power supply 1. Hereinafter, control of the current Iin so as to cause the input power factor from the AC power supply 1 to be about 1 is simply referred to as current control.

First, the case where the voltage Vin is positive, that is, a voltage phase θ of the AC power supply 1 is in a range of $0 \leq \theta < \pi$, will be described.

In the inverter circuit 100, when the semiconductor switching devices 101a and 104a are ON and the semiconductor switching devices 102a and 103a are OFF, current flows so as to charge the DC capacitor 105, and when the semiconductor switching devices 102a and 103a are ON and the semiconductor switching devices 101a and 104a are OFF, current flows so as to cause the DC capacitor 105 to discharge. On the other hand, when the semiconductor switching devices 101a and 103a are ON and the semiconductor switching devices 102a and 104a are OFF, and when the semiconductor switching devices 102a and 104a are ON and the semiconductor switching devices 101a and 103a are OFF, current flows without flowing in the DC capacitor 105. The semiconductor switching devices 101a to 104a are controlled by a combination of the four types of control as described above, to cause the inverter circuit 100 to perform PWM operation, thereby causing the DC capacitor 105 to perform charge and discharge, thus performing the current control. It is noted that when the current flowing in each of the semiconductor switching devices 101a to 104a flows from the emitter to the collector thereof, the semiconductor switching device may be turned off so that current flows in the corresponding one of diodes 101b to 104b connected in reverse-parallel thereto.

Figure 2:
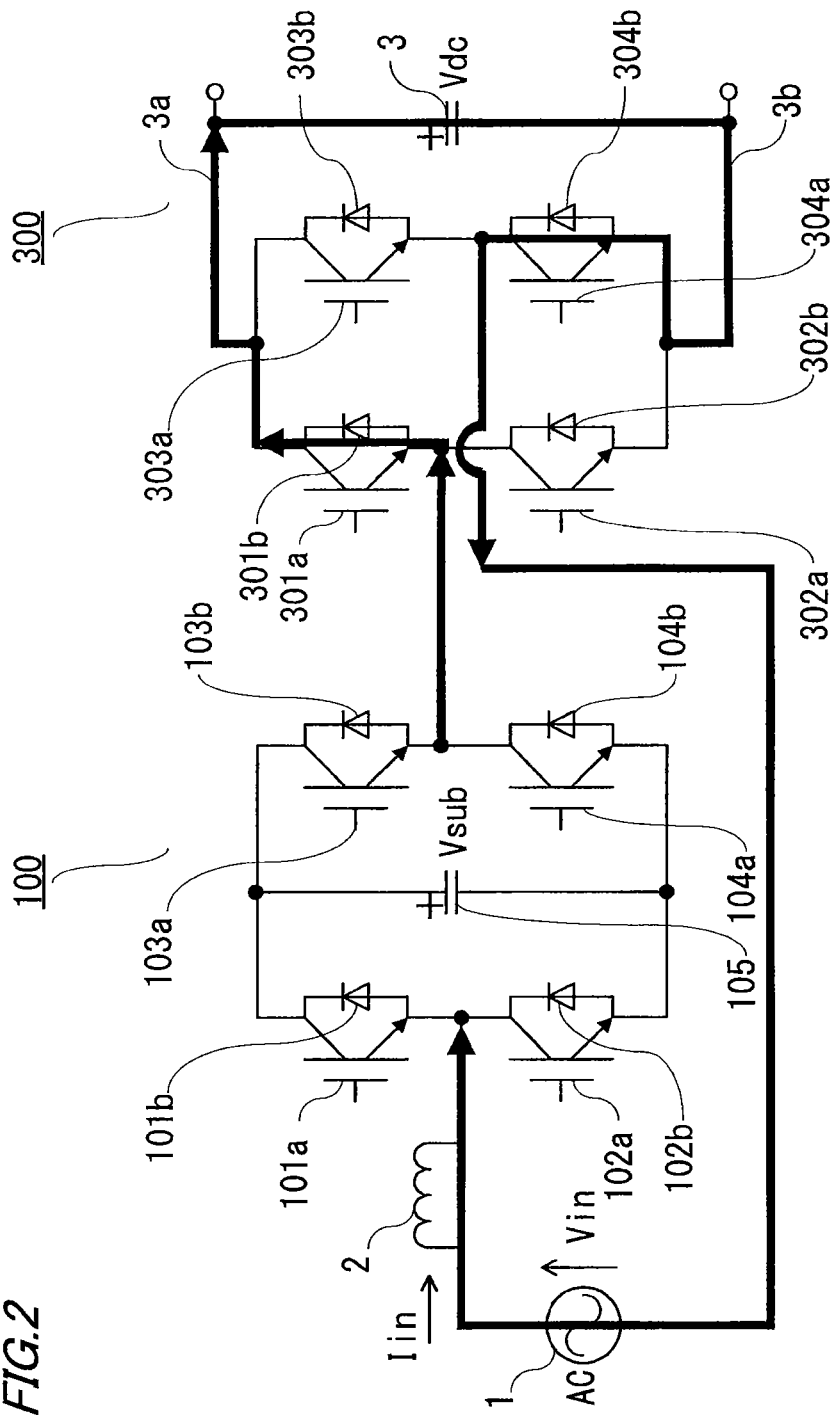
FIG. 2 is a current route diagram explaining a power running operation of the power conversion apparatus according to embodiment 1 of the present invention.

As shown in FIG. 2, current from the AC power supply 1 is limited by the reactor 2, and then flows into the inverter circuit 100. The output thereof passes through the diode 301b in the converter circuit 300, to charge the smoothing capacitor 3, and then passes through the diode 304b to return to the AC power supply 1. At this time, in the inverter circuit 100, PWM operation is performed by a combination of the above four types of control, thereby causing the DC capacitor 105 to perform charge and discharge, thus performing the current control.

Figure 3:
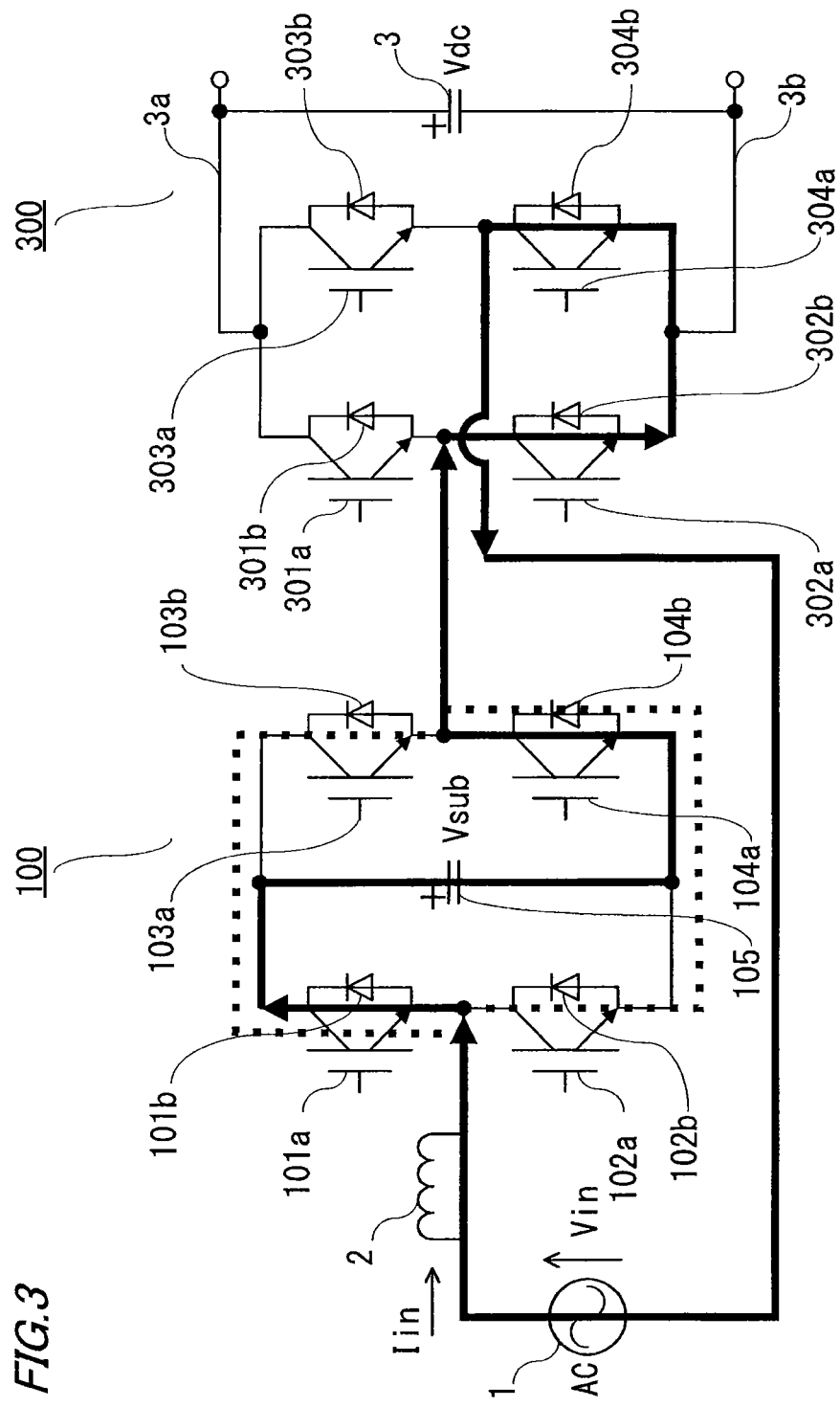
FIG. 3 is a current route diagram explaining a power running operation of the power conversion apparatus according to embodiment 1 of the present invention.

In a phase range (hereinafter, referred to as a short-circuit period T) between $=\theta_1$ centered at a zero cross phase of the voltage Vin of the AC power supply 1, as shown in FIG. 3, in the converter circuit 300, the semiconductor switching device 302a which is a short-circuit switch is turned on, whereby the smoothing capacitor 3 is bypassed. At this time, the other semiconductor switching devices 301a, 303a, and 304a in the converter circuit 300 are turned off. Current from the AC power supply 1 is limited by the reactor 2 and then flows into the inverter circuit 100, to charge the DC capacitor 105, and then passes through the semiconductor switching device 302a and the diode 304b in the converter circuit 300, to return to the AC power supply 1. At this time, in the inverter circuit 100, PWM operation is performed by a combination of control for charging the DC capacitor 105 and control for causing current not to flow therein, thereby charging the DC capacitor 105, thus performing the current control.

Next, the case where the voltage Vin is negative, that is, the phase θ is in a range of $\pi \leq \theta < 2\pi$, will be described.

In the inverter circuit 100, when the semiconductor switching devices 102a and 103a are ON and the semiconductor switching devices 101a and 104a are OFF, current flows so as to charge the DC capacitor 105, and when the semiconductor switching devices 101a and 104a are ON and the semiconductor switching devices 102a and 103a are OFF, current flows so as to cause the DC capacitor 105 to discharge. On the other hand, when the semiconductor switching devices 101a and 103a are ON and the semiconductor switching devices 102a and 104a are OFF, and when the semiconductor switching devices 102a and 104a are ON and the semiconductor switching devices 101a and 103a are OFF, current flows without flowing in the DC capacitor 105. The semiconductor switching devices 101a to 104a are controlled by a combination of the four types of control as described above, to cause the inverter circuit 100 to perform PWM operation, thereby causing the DC capacitor 105 to perform charge and discharge, thus performing the current control.

Figure 4:
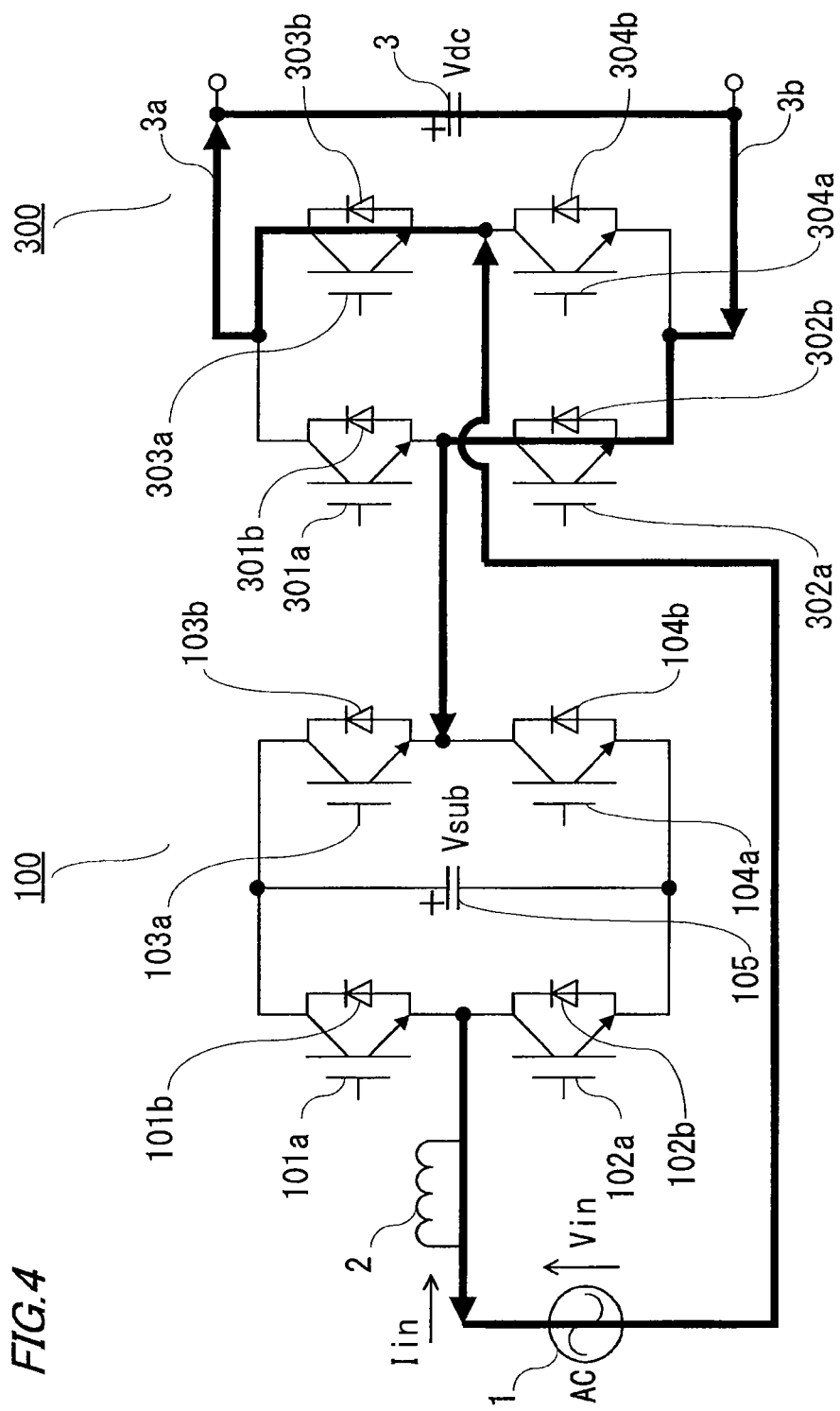
FIG. 4 is a current route diagram explaining a power running operation of the power conversion apparatus according to embodiment 1 of the present invention.

As shown in FIG. 4, current from the AC power supply 1 passes through the diode 303b in the converter circuit 300, to charge the smoothing capacitor 3, passes through the diode 302b, and then flows into the inverter circuit 100. The output of the inverter circuit 100 passes through the reactor 2 to return to the AC power supply 1. At this time, in the inverter circuit 100, PWM operation is performed by a combination of the above four types of control, thereby causing the DC capacitor 105 to perform charge and discharge, thus performing the current control.

Figure 5:
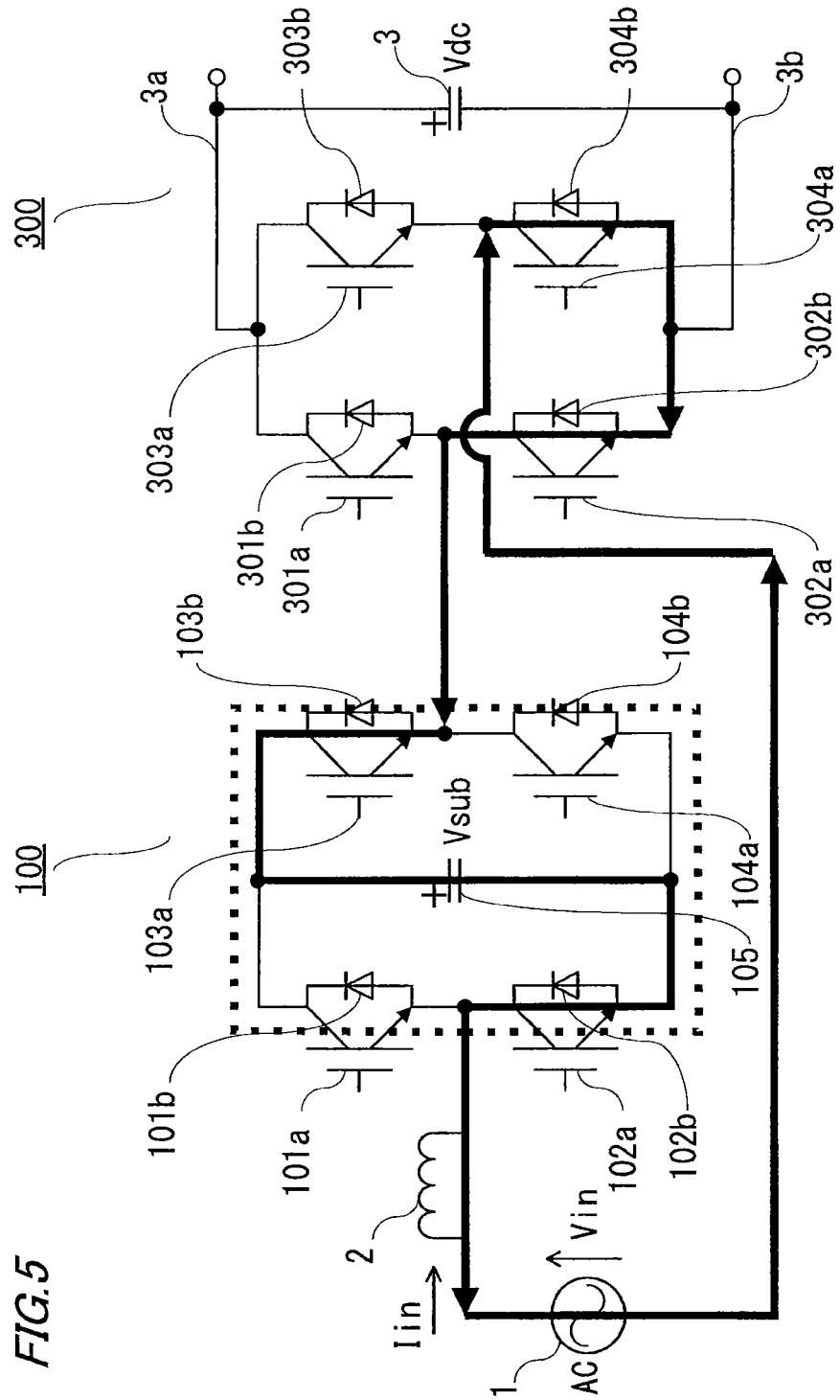
FIG. 5 is a current route diagram explaining a power running operation of the power conversion apparatus according to embodiment 1 of the present invention.

In the short-circuit period T, as shown in FIG. 5, in the converter circuit 300, the semiconductor switching device 304a which is a short-circuit switch is turned on, whereby the smoothing capacitor 3 is bypassed. At this time, the other semiconductor switching devices 301a, 302a, and 303a in the converter circuit 300 are turned off. Current from the AC power supply 1 passes through the semiconductor switching device 304a and the diode 302b in the converter circuit 300, flows into the inverter circuit 100 to charge the DC capacitor 105, and then passes through the reactor 2 to return to the AC power supply 1. At this time, in the inverter circuit 100, PWM operation is performed by a combination of control for charging the DC capacitor 105 and control for causing current not to flow therein, thereby charging the DC capacitor 105, thus performing the current control.

Thus, the operation of the converter circuit 300 includes the short-circuit period T in which the AC terminals of the converter circuit 300 are continuously short-circuited so that the smoothing capacitor 3 is bypassed, and the period (hereinafter, referred to as an open-circuit period K) in which DC output of the converter circuit 300 is continuously outputted to the smoothing capacitor 3, and in both the short-circuit period T and the open-circuit period K, current is controlled by PWM operation of the inverter circuit 100. It is noted that FIGS. 6 and 7 show the case where the voltage of the DC capacitor 105 of the inverter circuit 100 is comparatively high and the current control by PWM operation of the inverter circuit 100 can be performed in the entire phase range of the AC power supply voltage, and the entire period other than the short-circuit period T is the open-circuit period K. It is noted that voltage conditions for the DC capacitor 105 will be described later.

In the converter circuit 300, the case where each of the semiconductor switching devices 302a and 304a is turned on only when the semiconductor switching device is operated as a short-circuit switch, has been described. However, when current flows in each of the diodes 301b to 304b, the corresponding one of the semiconductor switching devices 301a to 304a to which said diode is connected in reverse-parallel may be turned on so that the current flows in the semiconductor switching devices 301a to 304a. That is, whether the voltage Vin is positive or negative, in the short-circuit period T, the two semiconductor switching devices 302a and 304a may be turned on as short-circuit switches, or the other two semiconductor switching devices 301a and 303a may be turned on as short-circuit switches.

By the above operation, in the step-up operation of the power conversion apparatus, as shown in FIG. 6, the inverter circuit 100 outputs voltage (−Vin) to charge the DC capacitor 105 by the AC power supply 1 in the short-circuit period T. Thereafter, in the open-circuit period K of $\theta_1 \leq \theta < \pi - \theta_1$ for causing the DC capacitor 105 to discharge, the inverter circuit 100 adds (Vdc*−Vin) which is output voltage of the inverter circuit 100, to the voltage Vin of the AC power supply 1, whereby the voltage Vdc of the smoothing capacitor 3 is controlled to be the target voltage Vdc* that is higher than peak voltage of the AC power supply 1.

In addition, in the step-down operation of the power conversion apparatus, as shown in FIG. 7, the inverter circuit 100 outputs voltage (−Vin) to charge the DC capacitor 105 by the AC power supply 1 in the short-circuit period T. Thereafter, in the subsequent open-circuit period K, the inverter circuit 100 adds output voltage of the inverter circuit 100 to the voltage Vin of the AC power supply 1, whereby the voltage Vdc of the smoothing capacitor 3 is controlled to be the target voltage Vdc* that is lower than the peak voltage of the AC power supply 1. Here, $\theta_2$ ($0<\theta_2<\pi/2$) is defined as the phase θ at which the voltage Vin of the AC power supply 1 is equal to the target voltage Vdc* of the smoothing capacitor 3. In this case, in a range of $\theta_1 \leq \theta < \theta_2$ and in a range of it $\pi - \theta_2 \leq \theta < \pi - \theta_1$, the inverter circuit 100 outputs voltage (Vdc*−Vin) to cause the DC capacitor 105 to discharge. In addition, in a range of $\theta_2 \leq \theta < \pi - \theta_2$, the inverter circuit 100 outputs negative voltage (Vdc*−Vin) to charge the DC capacitor 105.

As described above, in the power running operation, at ±$\theta_1$ from a zero cross phase (θ=0, π) of the voltage phase θ of the AC power supply 1, the control for the converter circuit 300 is switched, and in the short-circuit period T which is a phase range between ±$\theta_1$ centered at the zero cross phase, the semiconductor switching devices 302a and 304a which are short-circuit switches are continuously turned on to bypass the smoothing capacitor 3. At this time, the inverter circuit 100 generates voltage substantially equal to the opposite polarity voltage of the voltage Vin, and controls and outputs the current Iin such that the input power factor is about 1, while the DC capacitor 105 is charged. On the other hand, in the open-circuit period K in which DC output of the converter circuit 300 is continuously outputted to the smoothing capacitor 3, the inverter circuit 100 maintains the DC voltage Vdc of the smoothing capacitor 3 at the target voltage Vdc* and controls and outputs the current Iin such that the input power factor is about 1. At this time, when the absolute value of the voltage Vin is equal to or lower than the target voltage Vdc* of the smoothing capacitor 3, the DC capacitor 105 discharges, and when the absolute value of the voltage Vin is equal to or higher than the target voltage Vdc*, the DC capacitor 105 is charged.

It is noted that although the short-circuit period T is centered at the zero cross phase (θ=0, π), the short-circuit period T may be a phase range, including the zero cross phase, whose center is deviated in either direction.

In addition, the phase range of the short-circuit period T can be determined so as to make energy of charge and energy of discharge of the DC capacitor 105 of the inverter circuit 100 equal to each other. In the case where the current control by PWM operation of the inverter circuit 100 can be performed in the entire phase range of the AC power supply voltage and the charge-discharge amount of the DC capacitor 105 of the inverter circuit 100 is 0 in total, that is, energy of charge and energy of discharge are equal to each other, in the step-down operation in which Vdc*<Vp is satisfied, the following expression A is satisfied. Here, Vp is peak voltage of the voltage Vin, and Ip is peak current of the current Iin.

[Mathematical 1]

$$\int_0^{\theta_1} V_p \sin\theta \cdot I_p \sin\theta \cdot d\theta + \int_{\theta_2}^{\pi/2}(V_p \sin\theta - V_{dc}^*) \cdot I_p \sin\theta \cdot d\theta = \int_{\theta_1}^{\theta_2}(V_{dc}^* - V_p \sin\theta) \cdot I_p \sin\theta \cdot d\theta \quad \text{Expression A}$$

Here, if Vin=Vp·sin θ and Iin=Ip·sin θ are assumed, a relational expression between Vdc* and Vp is represented by the following expression 1.

$$V_{dc}^* = V_p \cdot \pi/(4\cos\theta_1) \quad \text{Expression 1}$$

Here, Vdc* takes its lower limit value when $\theta_1$ is 0, and the lower limit value is $(\pi/4)$Vp. The above expression 1 is satisfied also in the step-up operation in which Vp≤Vdc* is satisfied.

Thus, the target voltage Vdc* of the smoothing capacitor 3 is determined by $\theta_1$ which determines the phase range of the short-circuit period T, that is, the target voltage Vdc* can be controlled by $\theta_1$ being changed. Then, the DC voltage Vdc of the smoothing capacitor 3 is controlled so as to follow the target voltage Vdc*.

Next, the voltage Vsub of the DC capacitor 105 of the inverter circuit 100 will be described.

The voltage Vsub of the DC capacitor 105 is set to be equal to or greater than the magnitude of desired generated voltage of the inverter circuit 100 for each phase range. That is, the voltage Vsub of the DC capacitor 105 is required to satisfy the following expressions 2 and 3.

At the phase θ in the short-circuit period T, $$V\text{sub} \geq |Vp \cdot \sin \theta| \qquad \text{Expression 2}$$

At the phase θ in the open-circuit period K, $$V\text{sub} \geq ||Vdc^*| - |Vp \cdot \sin \theta|| \qquad \text{Expression 3}$$

By eliminating a variable θ from the above expressions 2 and 3, the following three expressions 4 to 6 are obtained.

$$V\text{sub} \geq Vp \cdot \sin \theta_1 \qquad \text{Expression 4}$$

$$V\text{sub} \geq (Vdc^* - Vp \cdot \sin \theta_1) \qquad \text{Expression 5}$$

$$V\text{sub} \geq (Vp - Vdc^*) \qquad \text{Expression 6}$$

That is, when the voltage Vsub satisfies the above three conditions (expressions 4 to 6), the DC voltage Vdc of the smoothing capacitor 3 can be maintained at the target voltage Vdc*, and the control for the inverter circuit 100 to control the current Iin such that the input power factor is about 1 can be performed reliably in the entire phase range of the AC power supply 1. It is noted that the voltage Vsub of the DC capacitor 105 is set to be equal to or smaller than the peak voltage Vp of the voltage Vin of the AC power supply 1. In the inverter circuit 100 subjected to PWM control, loss increases with increase in the voltage Vsub of the DC capacitor 105, and therefore, it is desired that the voltage Vsub is set to be small under the three conditions (expressions 4 to 6).

Further, only a phase range between $\pm\theta_1$ centered at a zero cross phase is set as the short-circuit period T in which the smoothing capacitor 3 is bypassed, whereby both in the short-circuit period T and the other open-circuit period K, the inverter circuit 100 can control the current Iin such that the input power factor is about 1 and can output DC power of desired voltage to the smoothing capacitor 3.

Next, operation of the power conversion apparatus in the case where the voltage Vsub of the DC capacitor 105 does not satisfy one of the above three conditions (expressions 4 to 6) will be described below. In this case, it is impossible to perform the current control by the PWM control for the inverter circuit 100 in the entire phase range of the AC power supply voltage. Therefore, the current Iin is controlled such that the input power factor is about 1, while the PWM control for the inverter circuit 100 and the PWM control for the converter circuit 300 are switched therebetween.

Figure 8:
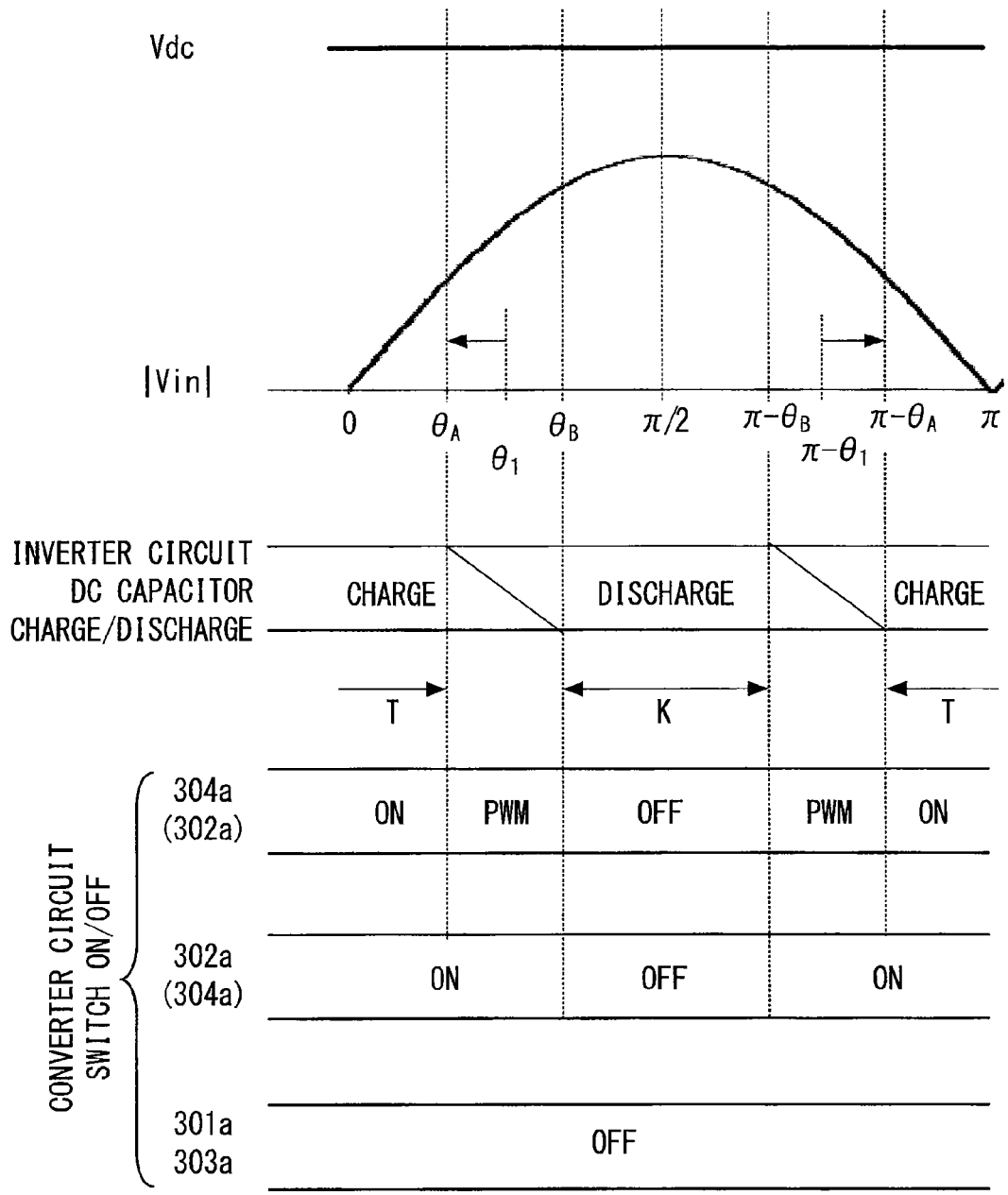
FIG. 8 is a diagram explaining current control switching operation together with a waveform at each section, in the power conversion apparatus according to embodiment 1 of the present invention.

FIG. 8 is a diagram explaining current control switching operation together with a waveform at each section. In this case, at the phase $\theta_1$ determining the short-circuit period T obtained by expression 1, the voltage Vsub of the DC capacitor 105 does not satisfy expression 4, that is, Vsub<Vp·sin $\theta_1$ is satisfied. Therefore, a new phase $\theta_A$ determining the short-circuit period T is to be determined, and along with this, a new phase $\theta_B$ determining the open-circuit period K is to be determined.

In the short-circuit period T and the open-circuit period K, current control is performed by PWM control for the inverter circuit 100, and in the other period, PWM control is performed for the converter circuit 300. In the short-circuit period T of $0 \leq \theta \leq \theta_A$, $\pi - \theta_A \leq \theta \leq \pi \theta_A$, and $2\pi - \theta_A \leq \theta \leq 2\pi$, the voltage Vsub of the DC capacitor 105 satisfies the above expression 2, and in the open-circuit period K of $\theta_B \leq \theta \leq \pi - \theta_B$ and $\pi + \theta_B \leq \theta \leq 2\pi - \theta_B$, the voltage Vsub satisfies the above expression 3.

That is, in the short-circuit period T, the voltage Vsub is equal to or greater than the magnitude of the voltage Vin of the AC power supply 1, and in the open-circuit period K, the voltage Vsub is equal to or greater than the difference between the magnitudes of the voltage Vdc (target voltage Vdc*) of the smoothing capacitor 3 and the voltage Vin.

In this case, first, the phase $\theta_A$ determining the short-circuit period T is calculated so as to satisfy the above expression 2, and then the phase $\theta_B$ is calculated so as to cause the charge-discharge amount of the DC capacitor 105 in the short-circuit period T and the open-circuit period K to be 0 in total, thereby determining the open-circuit period K. For example, in step-up operation, since the DC capacitor 105 is charged in the short-circuit period T and discharges in the open-circuit period K, the calculation is made by using the following expression B so as to make energy of charge and energy of discharge equal to each other.

[Mathematical 2]

$$\int_0^{\theta_A} V_p \sin \theta \cdot I_p \sin \theta \cdot d\theta = \int_{\theta_B}^{\pi/2} (V_{dc}^* - V_p \sin \theta) \cdot I_p \sin \theta \cdot d\theta \qquad \text{Expression B}$$

Then, as shown in FIG. 8, in the short-circuit period T of $0 \leq \theta \leq \theta_A$ and $\pi - \theta_A \leq \theta \leq \pi$, the converter circuit 300 continuously turns on the semiconductor switching devices 302a and 304a which are short-circuit switches, to bypass the smoothing capacitor 3. At this time, the other semiconductor switching devices 301a and 303a in the converter circuit 300 are turned off. Current from the AC power supply 1 flows into the inverter circuit 100 to charge the DC capacitor 105, and then passes through the converter circuit 300 to return to the AC power supply 1. At this time, in the inverter circuit 100, current control is performed by PWM control such that the DC capacitor 105 is charged.

In the open-circuit period K of $\theta_B \leq \theta \leq \pi - \theta_B$, in the converter circuit 300, all the semiconductor switching devices 301a to 304a are turned off. Current from the AC power supply 1 flows into the inverter circuit 100, and its output passes through the converter circuit 300 while charging the smoothing capacitor 3, and then returns to the AC power supply 1. At this time, in the inverter circuit 100, current control is performed by PWM control such that the DC capacitor 105 is caused to discharge.

Figure 9:
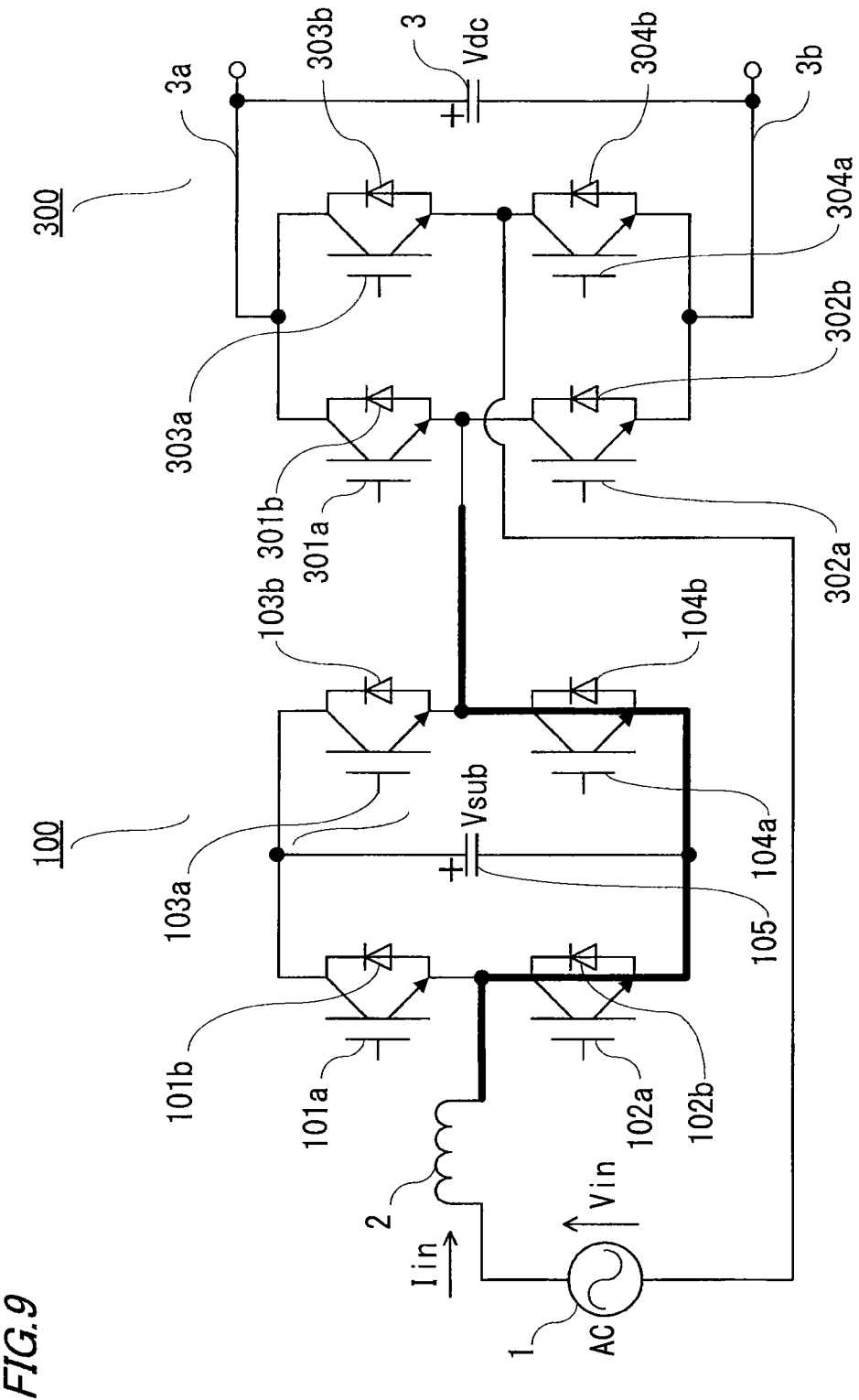
FIG. 9 is a current route diagram of the inside of the inverter circuit upon current control by a converter circuit according to embodiment 1 of the present invention.

In the period of $\theta_A \leq \theta \leq \theta_B$ and $\pi - \theta_B \leq \theta \leq \pi - \theta_A$, in the inverter circuit 100, as shown in FIG. 9, the AC-side output voltage is controlled to be 0 to cause current not to flow in the DC capacitor 105, while the DC capacitor 105 does not perform charge and discharge. Current from the AC power supply 1 passes through the inverter circuit 100 and then flows into the converter circuit 300. Then, in the converter circuit 300, the semiconductor switching devices 301a and 303a are turned off and the semiconductor switching device 302a is turned on, and current is controlled by PWM control using the semiconductor switching device 304a, thereby charging the smoothing capacitor 3. It is noted that when the voltage Vin is negative, the semiconductor switching device 304a is turned on and current is controlled by PWM control using the semiconductor switching device 302a, thereby charging the smoothing capacitor 3.

Thus, in the case where there is a period in which the input current power factor control by the inverter circuit 100 is not realized, the short-circuit period T and the open-circuit period K are newly set so as to make energy of charge and energy of discharge of the DC capacitor 105 of the inverter circuit 100 equal to each other. Then, in the short-circuit period T and the open-circuit period K, current control by the inverter circuit 100 is performed, and in the other period, current control by the converter circuit 300 is performed, whereby the DC voltage of the DC capacitor 105 of the inverter circuit 100 is kept constant, and power factor control for the input current Iin is continued throughout one cycle, so that the power factor of the input current Iin is controlled to be 1.

Figure 10:
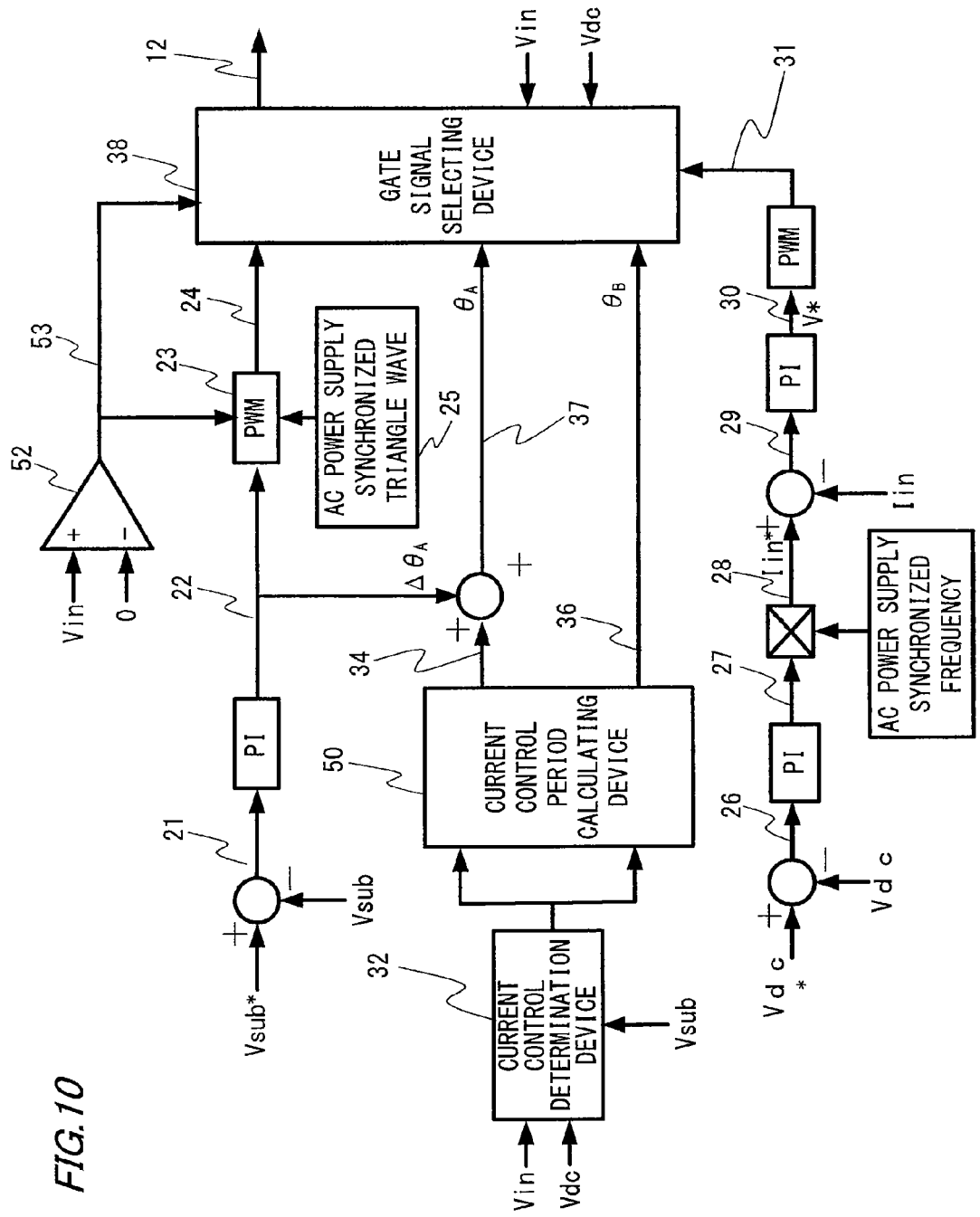
FIG. 10 is a control block diagram showing control for the converter circuit by a control circuit according to embodiment 1 of the present invention.
Figure 11:
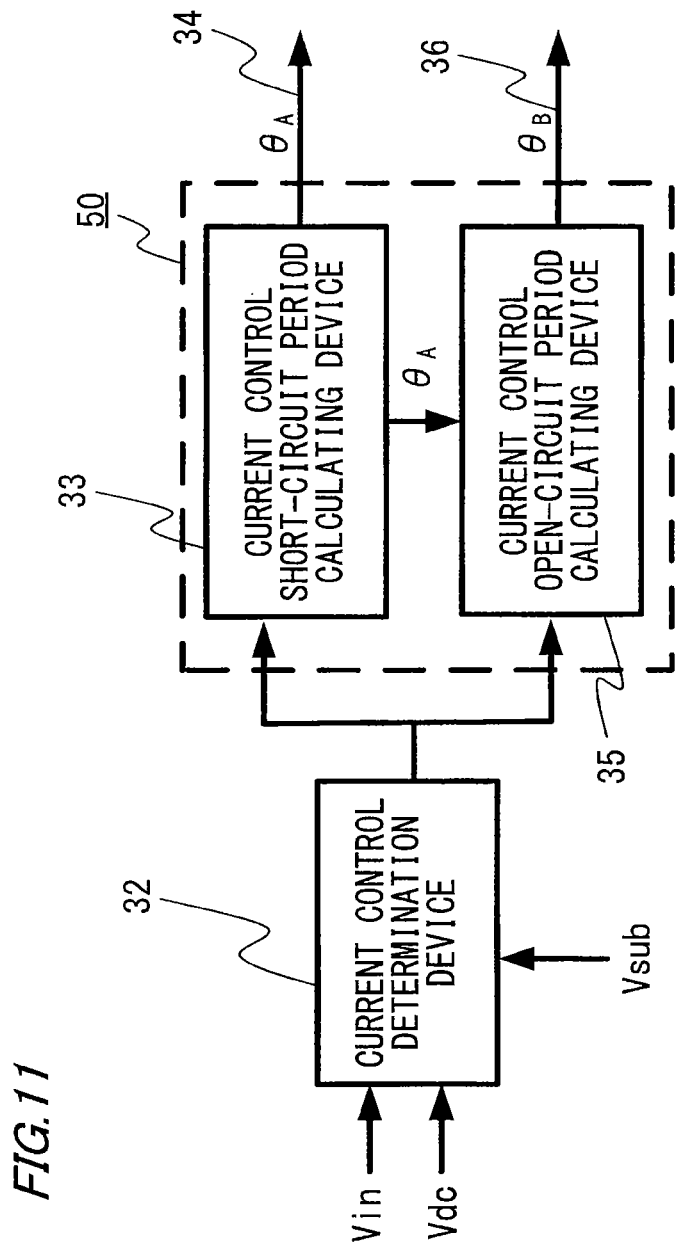
FIG. 11 is a partial control block diagram showing control for the converter circuit by the control circuit according to embodiment 1 of the present invention.
Figure 12:
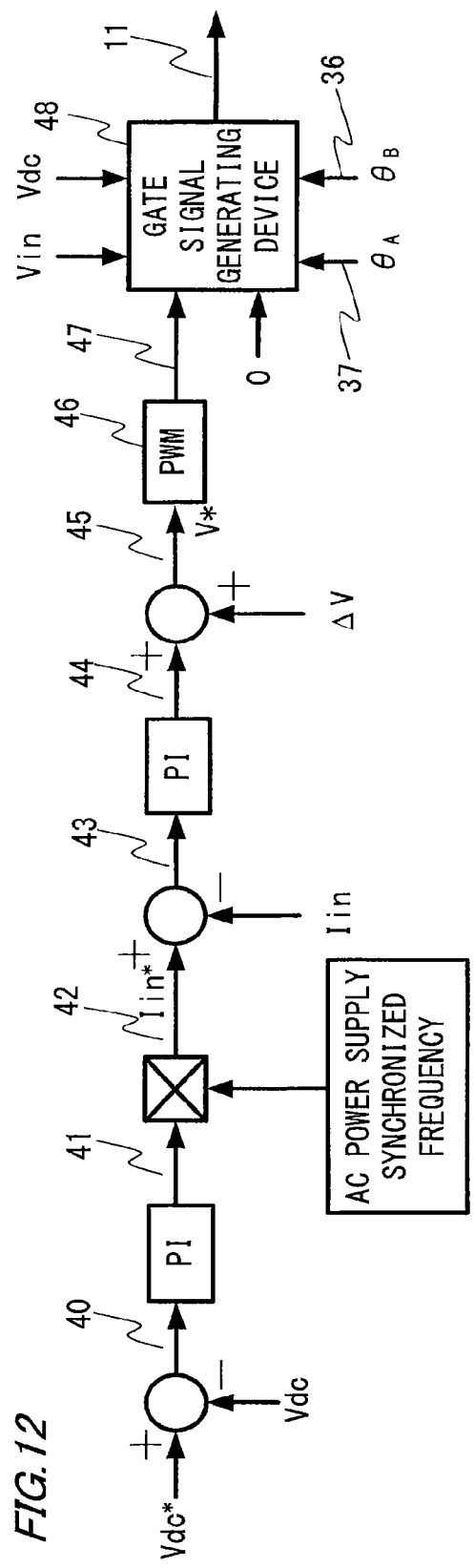
FIG. 12 is a control block diagram showing control for the inverter circuit by the control circuit according to embodiment 1 of the present invention.

Next, the details of the controls for the inverter circuit 100 and the converter circuit 300 will be described below. FIG. 10 is a control block diagram of output control for the converter circuit 300 by the control circuit 10. FIG. 11 is a partial control block diagram of output control for the converter circuit 300 by the control circuit 10. FIG. 12 is a control block diagram of output control for the inverter circuit 100 by the control circuit 10.

As shown in FIG. 10, in the output control for the converter circuit 300, not only voltage-Vsub-constant control to cause the voltage Vsub of the DC capacitor 105 of the inverter circuit 100 to follow the instruction value Vsub*, but also input current power factor control is performed as necessary.

First, the voltage-Vsub-constant control for the DC capacitor 105 of the inverter circuit 100 by the converter circuit 300 will be described. Using as a feedback amount a difference 21 between the set instruction value Vsub* and the detected voltage Vsub, PI control is performed to obtain an output 22 as a voltage instruction, and then using the voltage instruction, a gate signal 24 for each of the semiconductor switching devices 301a to 304a of the converter circuit 300 is generated by PWM control 23. In the PWM control 23, comparison operation is performed using as a carrier wave a triangle wave (AC power supply synchronized triangle wave) 25 which is synchronized with a period corresponding to two times of the frequency of the AC power supply 1. Then, from the signal obtained by the comparison operation, based on a polarity 53 of the AC power supply voltage Vin obtained by a polarity determination device 52, the gate signal 24 is generated which operates being substantially centered at the zero cross phase of the voltage Vin of the AC power supply 1. Then, the gate signal 24 is inputted to a gate signal selecting device 38.

Next, the input current power factor control by the converter circuit 300 will be described. This control maintains the DC voltage Vdc of the smoothing capacitor 3 at the target voltage Vdc* and controls the current Iin such that the power factor of the AC power supply 1 is about 1. First, using as a feedback amount a difference 26 between the DC voltage Vdc and the target voltage Vdc* of the smoothing capacitor 3, PI control is performed to obtain an output as an amplitude target value 27, and then based on the amplitude target value 27, a current instruction Iin*28 represented by a sine wave synchronized with the voltage Vin is generated from an AC power supply synchronized frequency. Next, using as a feedback amount a difference 29 between the current instruction Iin* and the detected current Iin, PI control is performed to obtain an output as a voltage instruction 30 which is a target value of the generated voltage of the converter circuit 300. Based on the voltage instruction 30, a gate signal 31 is generated by PWM control, and is inputted to the gate signal selecting device 38.

In addition, a current control determination device 32 determines whether or not the conditions for the input current power factor control by the inverter circuit 100 are satisfied, based on the voltage Vin of the AC power supply 1, the DC voltage Vdc of the smoothing capacitor 3, and the voltage Vsub of the DC capacitor 105 of the inverter circuit 100. That is, whether or not the voltage Vsub of the DC capacitor 105 satisfies the above three conditions (expressions 4 to 6) is determined, to derive a condition in which the input current power factor control by the inverter circuit 100 is not realized.

A current control period (short-circuit period, open-circuit period) calculating device 50 newly determines the short-circuit period T and the open-circuit period K based on the output of the current control determination device 32, to output phases $\theta_A$34 and $\theta_B$36.

In the present embodiment, as described above, the voltage Vsub does not satisfy the condition of expression 4. As shown in FIG. 11, the current control period calculating device 50 includes a current control short-circuit period calculating device 33 and a current control open-circuit period calculating device 35. First, the current control short-circuit period calculating device 33 outputs the phase $\theta_A$34 determining the short-circuit period T so as to satisfy the above expression 2, and then the current control open-circuit period calculating device 35 determines the open-circuit period K so as to cause the charge-discharge amount of the DC capacitor 105 in the short-circuit period T and the open-circuit period K to be 0 in total, and then outputs the phase $\theta_B$36. At this time, in the determined open-circuit period K, the voltage Vsub satisfies the above expression 3.

Then, the output 22 obtained by PI control using the difference 21 between the instruction value Vsub* and the voltage Vsub is added to an output 34 from the current control short-circuit period calculating device 33, whereby the phase $\theta_A$ is finely adjusted. The adjusted phase $\theta_A$37 and the phase $\theta_B$36 from the current control open-circuit period calculating device 35 are inputted to the gate signal selecting device 38.

The gate signal selecting device 38 receives the gate signal 24 by the voltage-Vsub-constant control, the gate signal 31 by the input current power factor control, and the phases $\theta_A$37 and $\theta_B$36 determining the newly set short-circuit period T and the newly set open-circuit period K. Then, further based on the voltage Vin of the AC power supply 1 and the DC voltage Vdc of the smoothing capacitor 3, the gate signal selecting device 38 outputs, as the gate signal 12 to the converter circuit 300, the gate signal 24 in the short-circuit period T and in the open-circuit period K and the gate signal 31 in the other period.

Next, as shown in FIG. 12, the output control for the inverter circuit 100 maintains the DC voltage Vdc of the smoothing capacitor 3 at the target voltage Vdc* and controls the current Iin such that the power factor of the AC power supply 1 is about 1.

First, using as a feedback amount a difference 40 between the DC voltage Vdc and the target voltage Vdc* of the smoothing capacitor 3, PI control is performed to obtain an output as an amplitude target value 41, and then based on the amplitude target value 41, a current instruction Iin*42 represented by a sine wave synchronized with the voltage Vin is generated from an AC power supply synchronized frequency. Next, using as a feedback amount a difference 43 between the current instruction Iin*42 and the detected current Iin, PI control is performed to obtain an output as a voltage instruction 44 which is a target value of the generated voltage of the inverter circuit 100. At this time, the voltage instruction 44 is corrected by adding thereto a feedforward correction voltage $\Delta V$ synchronized with a time of switching between control in the short-circuit period T for short-circuiting the AC terminals of the converter circuit 300, and control in the periods other than the short-circuit period. Then, a gate signal 47 for each of the semiconductor switching devices 101a to 104a of the inverter circuit 100 is generated by PWM control 46 using the corrected voltage instruction 45, and is inputted to a gate signal generating device 48.

Then, the gate signal generating device 48 receives the gate signal 47 by the input current power factor control, and the phases $\theta_A$ 37 and $\theta_B$ 36 determining the short-circuit period T and the open-circuit period K, calculated by the control of the converter circuit 300. Then, further based on the voltage Vin of the AC power supply 1 and the DC voltage Vdc of the smoothing capacitor 3, the gate signal generating device 48 outputs, as the gate signal 11 to the inverter circuit 100, the gate signal 47 in the short-circuit period T and in the open-circuit period K, and a gate signal for outputting voltage 0 in the other period.

It is noted that in the case where the voltage Vsub satisfies the above three conditions (expressions 4 to 6), in the control for the converter circuit 300, the current control period calculating device 50 does not output the phases $\theta_A$ and $\theta_B$, and the gate signal selecting device 38 continues to output the gate signal 24 based on the voltage-Vsub-constant control. In addition, in the output control for the inverter circuit 100, the gate signal generating device 48 continues to output the gate signal 47 based on the input current power factor control.

In the present embodiment, the main control for the inverter circuit 100 is performed using the current instruction Iin*, thereby causing the voltage Vdc of the smoothing capacitor 3 to follow the target voltage Vdc* and improving the power factor of the AC power supply 1. In the main control for the converter circuit 300, it is not necessary to perform high-frequency switching and therefore switching loss is low. In addition, the inverter circuit 100 which controls the power factor and controls the DC voltage Vdc of the smoothing capacitor 3 can make the voltage Vsub used in the switching much lower than the peak voltage of the AC power supply 1. In addition, the short-circuit period T for bypassing the smoothing capacitor 3 is provided to control the converter circuit 300, and the inverter circuit 100 charges the DC capacitor 105 in the short-circuit period T. Therefore, it is possible to prevent the current from being 0 without the inverter circuit 100 generating high voltage, and to use energy stored in the DC capacitor 105 for discharge to the smoothing capacitor 3. Therefore, in the inverter circuit 100, the voltage used in the switching can be further reduced, whereby the efficiency can be further increased and noise can be further reduced.

Further, even in the case where the voltage Vsub of the DC capacitor 105 does not satisfy the condition for realizing the current control by the inverter circuit 100 in the entire phase range of the AC power supply, a period for performing PWM control for the converter circuit 300 is provided, whereby the power factor of the input current is controlled to be 1 while the PWM control for the inverter circuit 100 and the PWM control for the converter circuit 300 are switched therebetween, thus continuing the current control reliably. Therefore, it is not necessary to maintain the DC voltage Vsub of the inverter circuit 100 at a voltage level that allows the current control, and the voltage can be further reduced.

In addition, the current control period for the converter circuit 300 in the case where the current control is switched to the converter circuit 300 is set such that the charge-discharge amount of the DC capacitor 105 of the inverter circuit 100 is 0 in total. Therefore, the voltage Vsub of the DC capacitor 105 of the inverter circuit 100 is controlled to be constant.

Therefore, the ranges of the AC power supply voltage Vin and the DC voltage Vdc can be expanded without increasing the withstand voltage of the power conversion apparatus, the current control can be realized in a wide operation range, and downsizing and power loss reduction of the power conversion apparatus can be realized. In addition, since the current control can be continued, reliability of the apparatus is improved.

Embodiment 2

In the above embodiment 1, the case where the inverter circuit 100 does not satisfy expression 4 among the three conditions (expressions 4 to 6) for allowing the current control in the entire phase range of the AC power supply 1, has been described. In the present embodiment, the case of not satisfying expression 6 will be described. That is, the power conversion apparatus performs step-down operation, thus satisfying Vsub<(Vp−Vdc*). It is noted that the main circuit configuration and the configuration of the control circuit 10 are the same as in the above embodiment 1, and the basic power running operation described with reference to FIGS. 2 to 7 is also the same as in the above embodiment 1.

Figure 13:
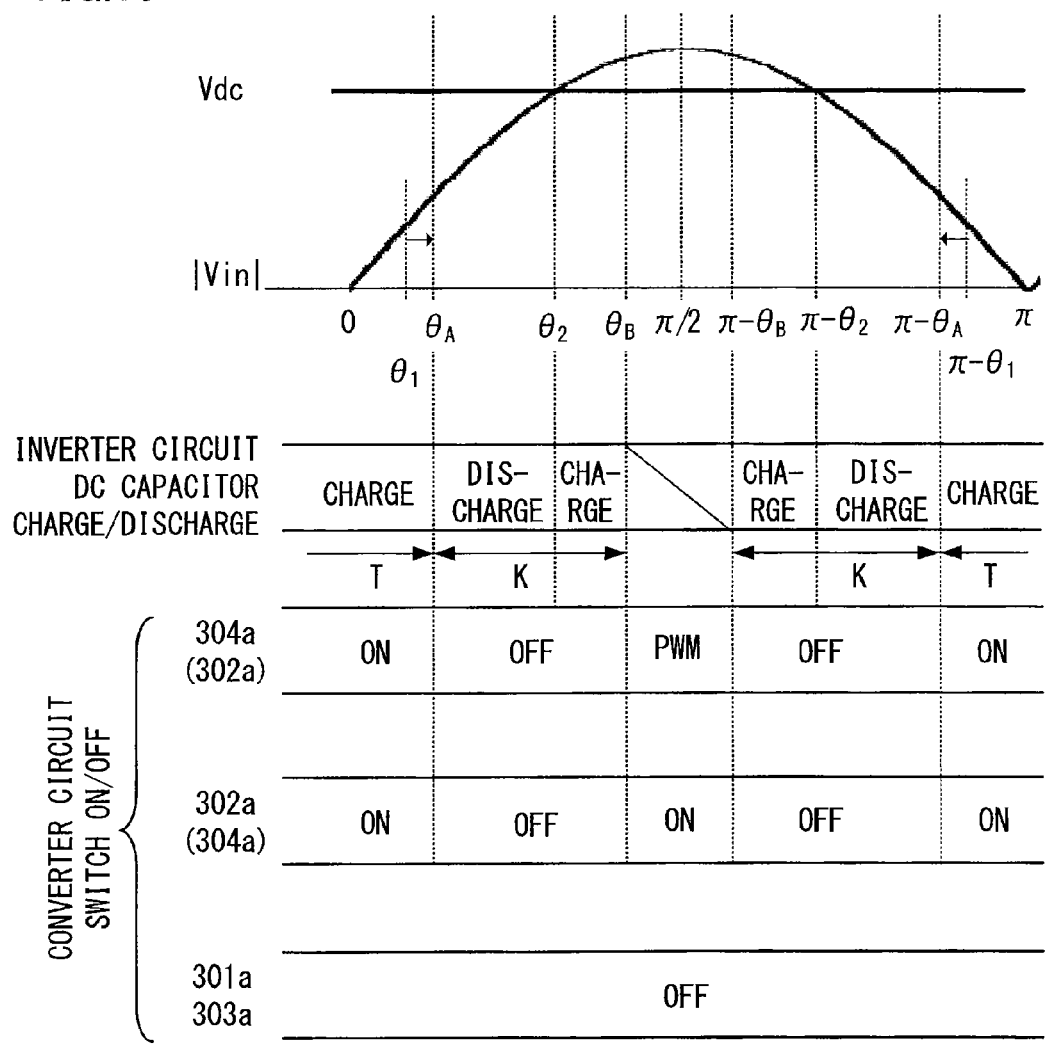
FIG. 13 is a diagram explaining current control switching operation together with a waveform at each section, in the power conversion apparatus according to embodiment 2 of the present invention.

FIG. 13 is a diagram explaining current control switching operation according to embodiment 2 together with a waveform at each section. In this case, there is a period including a peak voltage point of the AC power supply 1 in which the inverter circuit 100 cannot perform operation of outputting voltage (Vin−Vdc*) to charge the DC capacitor 105. Therefore, a new phase $\theta_B$ determining one end of the open-circuit period K is to be determined, and along with this, a new phase $\theta_A$ determining the short-circuit period T is to be determined. In this case, the phase $\theta_A$ is also the other end of the open-circuit period K.

In the short-circuit period T and the open-circuit period K, current control is performed by PWM control for the inverter circuit 100, and in the other period, PWM control is performed for the converter circuit 300. In the short-circuit period T of $0 \leq \theta \leq \theta_A$, $\pi - \theta_A \leq \theta \leq \pi + \theta_A$, and $2\pi - \theta_A \leq \theta \leq 2\pi$, the voltage Vsub of the DC capacitor 105 satisfies the above expression 2, and in the open-circuit period K of $\theta_A \leq \theta \leq \theta_B$, $\pi - \theta_B \leq \theta \leq \pi - \theta_A$, $\pi + \theta_A \leq \theta \leq \pi + \theta_B$, $2\pi - \theta_B \leq \theta \leq 2\pi - \theta_A$, the voltage Vsub satisfies the above expression 3.

That is, in the short-circuit period T, the voltage Vsub is equal to or greater than the magnitude of the voltage Vin of the AC power supply 1, and in the open-circuit period K, the voltage Vsub is equal to or greater than the difference between the magnitudes of the voltage Vdc (target voltage Vdc*) of the smoothing capacitor 3 and the voltage Vin.

In this case, first, the phase $\theta_B$ determining one end of the open-circuit period K is calculated so as to satisfy the above expression 3, and then the phase $\theta_A$ is calculated so as to cause the charge-discharge amount of the DC capacitor 105 in the short-circuit period T and the open-circuit period K to be 0 in total, thereby determining both ends of the short-circuit period T and the other end of the open-circuit period K. In this case, the calculation is made by using the following expression C so as to make energy of charge and energy of discharge equal to each other.

[Mathematical 3]

$$\int_0^{\theta_A} V_p \sin\theta \cdot I_p \sin\theta \cdot d\theta + \int_{\theta_2}^{\theta_B}(V_p \sin\theta - V_{dc}^*) \cdot I_p \sin\theta \cdot d\theta = \int_{\theta_A}^{\theta_2}(V_{dc}^* - V_p \sin\theta) \cdot I_p \sin\theta \cdot d\theta \qquad \text{Expression C}$$

As shown in FIG. 13, in the short-circuit period T of $0 \leq \theta \leq \theta_A$ and $\pi - \theta_A \leq \theta \leq \pi$, the converter circuit 300 continuously turns on the semiconductor switching devices 302a and 304a which are short-circuit switches, to bypass the smoothing capacitor 3. At this time, the other semiconductor switching devices 301a and 303a in the converter circuit 300 are turned off. Current from the AC power supply 1 flows into the inverter circuit 100 to charge the DC capacitor 105, and then passes through the converter circuit 300 to return to the AC power supply 1. At this time, in the inverter circuit 100, current control is performed by PWM control such that the DC capacitor 105 is charged.

In the open-circuit period K of $\theta_A \leq \theta \leq \theta_B$ and $\pi - \theta_B \leq \theta \leq \pi - \theta_A$, in the converter circuit 300, all the semiconductor switching devices 301a to 304a are turned off. Current from the AC power supply 1 flows into the inverter circuit 100, and its output passes through the converter circuit 300 while charging the smoothing capacitor 3, and then returns to the AC power supply 1. At this time, in the inverter circuit 100, when the voltage Vin is equal to or smaller than the voltage Vdc* of the smoothing capacitor 3, current control is performed by PWM control such that the DC capacitor 105 is caused to discharge, and when the voltage Vin is equal to or greater than the voltage Vdc* of the smoothing capacitor 3, current control is performed by PWM control such that the DC capacitor 105 is charged.

In the period of $\theta_B \leq \theta \leq \pi - \theta_B$, in the inverter circuit 100, the AC-side output voltage is controlled to be 0 to cause current not to flow in the DC capacitor 105, while the DC capacitor 105 does not perform charge and discharge. Current from the AC power supply 1 passes through the inverter circuit 100 and then flows into the converter circuit 300. Then, in the converter circuit 300, the semiconductor switching devices 301a and 303a are turned off and the semiconductor switching device 302a is turned on, and current is controlled by PWM control using the semiconductor switching device 304a, thereby charging the smoothing capacitor 3. It is noted that when the voltage Vin is negative, the semiconductor switching device 304a is turned on and current is controlled by PWM control using the semiconductor switching device 302a, thereby charging the smoothing capacitor 3.

Thus, in the case where there is a period in which the input current power factor control by the inverter circuit 100 is not realized, the short-circuit period T and the open-circuit period K are newly set so as to cause the charge-discharge amount of the DC capacitor 105 of the inverter circuit 100 to be 0 in total. Then, in the short-circuit period T and the open-circuit period K, current control by the inverter circuit 100 is performed, and in the other period, current control by the converter circuit 300 is performed, whereby the DC voltage of the DC capacitor 105 of the inverter circuit 100 is kept constant, and power factor control for the input current Iin is continued throughout one cycle, so that the power factor of the input current Iin is controlled to be 1.

Figure 14:
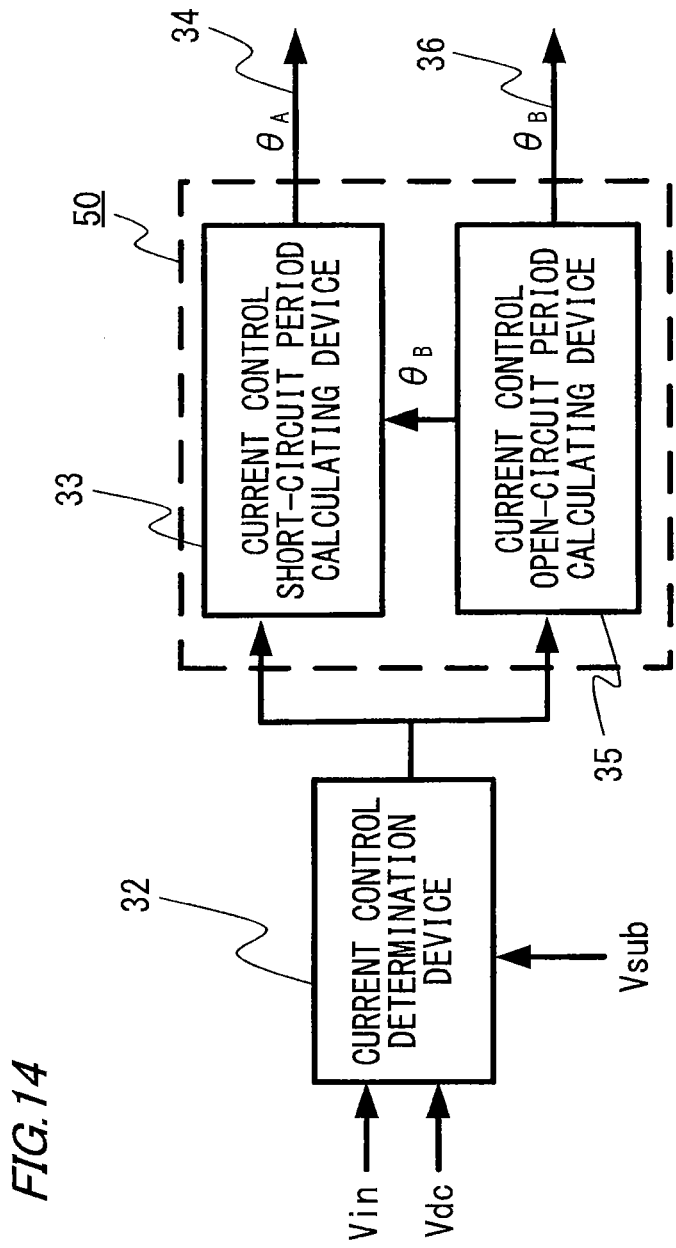
FIG. 14 is a partial control block diagram explaining control for the converter circuit by the control circuit according to embodiment 2 of the present invention.

Next, controls for the inverter circuit 100 and the converter circuit 300 will be described below. The control configuration for the converter circuit 300 by the control circuit 10 is the same as in FIG. 10 shown in the above embodiment 1, and the control configuration for the inverter circuit 100 is the same as in FIG. 12. In this case, the operation of the current control period (short-circuit period, open-circuit period) calculating device 50 is different. FIG. 14 shows a control block diagram of the different part.

In the output control for the converter circuit 300, as in the above embodiment 1, the gate signal 24 by the voltage-Vsub-constant control, the gate signal 31 by the input current power factor control, the phases $\theta_A 37$ and $\theta_B 36$ determining the newly set short-circuit period T and the newly set open-circuit period K, are generated and inputted to the gate signal selecting device 38.

The gate signal 24 by the voltage-Vsub-constant control and the gate signal 31 by the input current power factor control are generated in the same manner as in the above embodiment 1.

A current control determination device 32 determines whether or not the conditions for the input current power factor control by the inverter circuit 100 are satisfied, based on the voltage Vin of the AC power supply 1, the DC voltage Vdc of the smoothing capacitor 3, and the voltage Vsub of the DC capacitor 105 of the inverter circuit 100. That is, whether or not the voltage Vsub of the DC capacitor 105 satisfies the above three conditions (expressions 4 to 6) is determined, to derive a condition in which the input current power factor control by the inverter circuit 100 is not realized. In the present embodiment, the voltage Vsub does not satisfy the condition of expression 6.

The current control period calculating device 50 newly determines the short-circuit period T and the open-circuit period K based on the output of the current control determination device 32, to output phases $\theta_A 34$ and $\theta_B 36$.

As shown in FIG. 14, the current control period calculating device 50 includes a current control short-circuit period calculating device 33 and a current control open-circuit period calculating device 35. First, the current control open-circuit period calculating device 35 outputs the phase $\theta_B 36$ determining one end of the open-circuit period K so as to satisfy the above expression 3, and then the current control open-circuit period calculating device 35 determines both ends of the short-circuit period T and the other end of the open-circuit period K so as to cause the charge-discharge amount of the DC capacitor 105 in the short-circuit period T and the open-circuit period K to be 0 in total, and then outputs the phase $\theta_A 34$. At this time, in the determined short-circuit period T, the voltage Vsub satisfies the above expression 2, and in the determined open-circuit period K, the voltage Vsub satisfies the above expression 3.

Then, as in the above embodiment 1, the output 22 obtained by PI control using the difference 21 between the instruction value Vsub* and the voltage Vsub is added to an output 34 from the current control short-circuit period calculating device 33, whereby the phase $\theta_A$ is finely adjusted. The adjusted phase $\theta_A 37$ and the phase $\theta_B 36$ from the current control open-circuit period calculating device 35 are inputted to the gate signal selecting device 38.

The gate signal selecting device 38 receives the gate signal 24 by the voltage-Vsub-constant control, the gate signal 31 by the input current power factor control, and the phases $\theta_{2A} 37$ and $\theta_B 36$ determining the newly set short-circuit period T and the newly set open-circuit period K. Then, further based on the voltage Vin of the AC power supply 1 and the DC voltage Vdc of the smoothing capacitor 3, the gate signal selecting device 38 outputs, as the gate signal 12 to the converter circuit 300, the gate signal 24 in the short-circuit period T and in the open-circuit period K and the gate signal 31 in the other period.

In the output control for the inverter circuit 100, as in the above embodiment 1, the gate signal 47 by the input current power factor control, and the phases $\theta_A 37$ and $\theta_B 36$ determining the short-circuit period T and the open-circuit period K, calculated by the control of the converter circuit 300, are inputted to the gate signal generating device 48. The gate signal generating device 48 further receives the voltage Vin of the AC power supply 1 and the DC voltage Vdc of the smoothing capacitor 3, and outputs, as the gate signal 11 to the inverter circuit 100, the gate signal 47 in the short-circuit period T and in the open-circuit period K, and a gate signal for outputting voltage 0 in the other period.

Also in the present embodiment, as in the above embodiment 1, even in the case where the voltage Vsub of the DC capacitor 105 does not satisfy the condition for realizing the current control by the inverter circuit 100 in the entire phase range of the AC power supply, a period for performing PWM control for the converter circuit 300 is provided, whereby the power factor of the input current is controlled to be 1 while the PWM control for the inverter circuit 100 and the PWM control for the converter circuit 300 are switched therebetween, thus continuing the current control reliably. Therefore, the DC voltage Vsub of the inverter circuit 100 can be further reduced.

Therefore, the ranges of the AC power supply voltage Vin and the DC voltage Vdc can be expanded without increasing the withstand voltage of the power conversion apparatus, the current control can be realized in a wide operation range, and downsizing and power loss reduction of the power conversion apparatus can be realized. In addition, since the current control can be continued, reliability of the apparatus is improved.

Embodiment 3

In the above embodiments 1 and 2, the case where the inverter circuit 100 does not satisfy expression 4 or 6 among the three conditions (expressions 4 to 6) for allowing the current control in the entire phase range of the AC power supply 1, has been described. In the present embodiment, the case of not satisfying expression 5 will be described. In this case, at the phase $\theta_1$ calculated by the above expression 1, the voltage Vsub of the DC capacitor 105 does not satisfy expression 5, thus satisfying Vsub<(Vdc*−Vp·sin $\theta_1$). It is noted that the main circuit configuration and the configuration of the control circuit 10 are the same as in the above embodiment 1, and the basic power running operation described with reference to FIGS. 2 to 7 is also the same as in the above embodiment 1.

Figure 15:
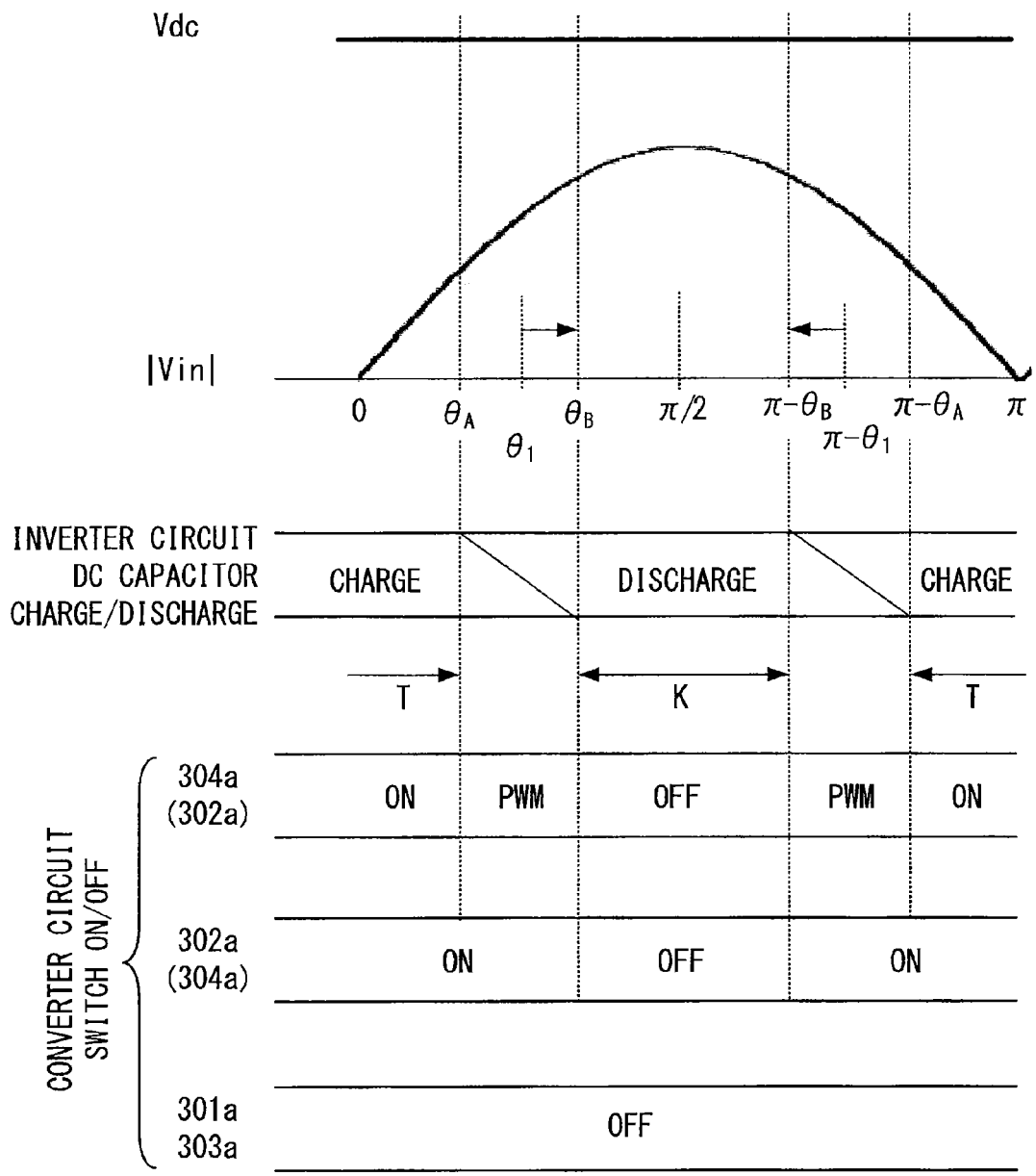
FIG. 15 is a diagram explaining current control switching operation together with a waveform at each section, in the power conversion apparatus according to embodiment 3 of the present invention.

FIG. 15 is a diagram explaining current control switching operation according to embodiment 3 together with a waveform at each section. In this case, there is a period including the phase $\theta_1$ of the AC power supply 1 in which the inverter circuit 100 cannot perform operation of outputting voltage (Vdc*−Vin) to cause the DC capacitor 105 to discharge. Therefore, a new phase $\theta_B$ determining the open-circuit period K is to be determined, and along with this, a new phase $\theta_A$ determining the short-circuit period T is to be determined.

In the short-circuit period T and the open-circuit period K, current control is performed by PWM control for the inverter circuit 100, and in the other period, PWM control is performed for the converter circuit 300. In the short-circuit period T of $0 \leq \theta \leq \theta_A$, $\pi - \theta_A \leq \theta \leq \pi + \theta_A$, and $2\pi - \theta_A \leq \theta \leq 2\pi$, the voltage Vsub of the DC capacitor 105 satisfies the above expression 2, and in the open-circuit period K of $\theta_B \leq \theta \leq \pi - \theta_B$, $\pi + \theta_B \leq \theta \leq 2\pi - \theta_B$, the voltage Vsub satisfies the above expression 3.

That is, in the short-circuit period T, the voltage Vsub is equal to or greater than the magnitude of the voltage Vin of the AC power supply 1, and in the open-circuit period K, the voltage Vsub is equal to or greater than the difference between the magnitudes of the voltage Vdc (target voltage Vdc*) of the smoothing capacitor 3 and the voltage Vin.

In this case, first, the phase $\theta_B$ determining the open-circuit period K is calculated so as to satisfy the above expression 3, and then the phase $\theta_A$ is calculated so as to cause the charge-discharge amount of the DC capacitor 105 in the short-circuit period T and the open-circuit period K to be 0 in total, thereby determining the short-circuit period T. In the step-up operation shown in FIG. 15, the calculation is made by using the above expression B so as to make energy of charge and energy of discharge equal to each other.

Then, as shown in FIG. 15, in the short-circuit period T of $0 \leq \theta \leq \theta_A$ and $\pi - \theta_A \leq \theta \leq \pi$, the converter circuit 300 continuously turns on the semiconductor switching devices 302a and 304a which are short-circuit switches, to bypass the smoothing capacitor 3. At this time, the other semiconductor switching devices 301a and 303a in the converter circuit 300 are turned off. Current from the AC power supply 1 flows into the inverter circuit 100 to charge the DC capacitor 105, and then passes through the converter circuit 300 to return to the AC power supply 1. At this time, in the inverter circuit 100, current control is performed by PWM control such that the DC capacitor 105 is charged.

In the open-circuit period K of $\theta_B \leq \theta \leq \pi - \theta_B$, in the converter circuit 300, all the semiconductor switching devices 301a to 304a are turned off. Current from the AC power supply 1 flows into the inverter circuit 100, and its output passes through the converter circuit 300 while charging the smoothing capacitor 3, and then returns to the AC power supply 1. At this time, in the inverter circuit 100, current control is performed by PWM control such that the DC capacitor 105 is caused to discharge.

In the period of $\theta_A \leq \theta \leq \theta_B$ and $\pi - \theta_B \leq \theta \leq \pi - \theta_A$, in the inverter circuit 100, the AC-side output voltage is controlled to be 0 to cause current not to flow in the DC capacitor 105, while the DC capacitor 105 does not perform charge and discharge. Current from the AC power supply 1 passes through the inverter circuit 100 and then flows into the converter circuit 300. Then, in the converter circuit 300, the semiconductor switching devices 301a and 303a are turned off and the semiconductor switching device 302a is turned on, and current is controlled by PWM control using the semiconductor switching device 304a, thereby charging the smoothing capacitor 3. It is noted that when the voltage Vin is negative, the semiconductor switching device 304a is turned on and current is controlled by PWM control using the semiconductor switching device 302a, thereby charging the smoothing capacitor 3.

Thus, in the case where there is a period in which the input current power factor control by the inverter circuit 100 is not realized, the short-circuit period T and the open-circuit period K are newly set so as to cause the charge-discharge amount of the DC capacitor 105 of the inverter circuit 100 to be 0 in total. Then, in the short-circuit period T and the open-circuit period K, current control by the inverter circuit 100 is performed, and in the other period, current control by the converter circuit 300 is performed, whereby the DC voltage of the DC capacitor 105 of the inverter circuit 100 is kept constant, and power factor control for the input current Iin is continued throughout one cycle, so that the power factor of the input current Iin is controlled to be 1.

Next, controls for the inverter circuit 100 and the converter circuit 300 will be described below. The control configuration for the converter circuit 300 by the control circuit 10 is the same as in FIG. 10 shown in the above embodiment 1, and the control configuration for the inverter circuit 100 is the same as in FIG. 12. In this case, the operation of the current control period (short-circuit period, open-circuit period) calculating device 50 is different, and a control block diagram of the different part is the same as in FIG. 14 shown in the above embodiment 2.

In the output control for the converter circuit 300, as in the above embodiment 1, the gate signal 24 by the voltage-Vsub-constant control, the gate signal 31 by the input current power factor control, the phases $\theta_A$ 37 and $\theta_B$ 36 determining the newly set short-circuit period T and the newly set open-circuit period K, are generated and inputted to the gate signal selecting device 38.

The gate signal 24 by the voltage-Vsub-constant control and the gate signal 31 by the input current power factor control are generated in the same manner as in the above embodiment 1.

A current control determination device 32 determines whether or not the conditions for the input current power factor control by the inverter circuit 100 are satisfied, based on the voltage Vin of the AC power supply 1, the DC voltage Vdc of the smoothing capacitor 3, and the voltage Vsub of the DC capacitor 105 of the inverter circuit 100. That is, whether or not the voltage Vsub of the DC capacitor 105 satisfies the above three conditions (expressions 4 to 6) is determined, to derive a condition in which the input current power factor control by the inverter circuit 100 is not realized. In the present embodiment, the voltage Vsub does not satisfy the condition of expression 5.

The current control period calculating device 50 newly determines the short-circuit period T and the open-circuit period K based on the output of the current control determination device 32, to output phases $\theta_A$34 and $\theta_B$36.

In the current control period calculating device 50, first, the current control open-circuit period calculating device 35 outputs the phase $\theta_B$36 determining one end of the open-circuit period K so as to satisfy the above expression 3, and then the current control open-circuit period calculating device 35 determines the short-circuit period T so as to cause the charge-discharge amount of the DC capacitor 105 in the short-circuit period T and the open-circuit period K to be 0 in total, and then outputs the phase $\theta_A$34. At this time, in the determined short-circuit period T, the voltage Vsub satisfies the above expression 2.

Then, as in the above embodiment 1, the output 22 obtained by PI control using the difference 21 between the instruction value Vsub* and the voltage Vsub is added to an output 34 from the current control short-circuit period calculating device 33, whereby the phase $\theta_A$ is finely adjusted. The adjusted phase $\theta_A$37 and the phase $\theta_B$36 from the current control open-circuit period calculating device 35 are inputted to the gate signal selecting device 38.

The gate signal selecting device 38 receives the gate signal 24 by the voltage-Vsub-constant control, the gate signal 31 by the input current power factor control, and the phases $\theta_A$37 and $\theta_B$36 determining the newly set short-circuit period T and the newly set open-circuit period K. Then, further based on the voltage Vin of the AC power supply 1 and the DC voltage Vdc of the smoothing capacitor 3, the gate signal selecting device 38 outputs, as the gate signal 12 to the converter circuit 300, the gate signal 24 in the short-circuit period T and in the open-circuit period K and the gate signal 31 in the other period.

In the output control for the inverter circuit 100, as in the above embodiment 1, the gate signal 47 by the input current power factor control, and the phases $\theta_A$37 and $\theta_B$36 determining the short-circuit period T and the open-circuit period K, calculated by the control of the converter circuit 300, are inputted to the gate signal generating device 48. The gate signal generating device 48 further receives the voltage Vin of the AC power supply 1 and the DC voltage Vdc of the smoothing capacitor 3, and outputs, as the gate signal 11 to the inverter circuit 100, the gate signal 47 in the short-circuit period T and in the open-circuit period K, and a gate signal for outputting voltage 0 in the other period.

Also in the present embodiment, as in the above embodiment 1, even in the case where the voltage Vsub of the DC capacitor 105 does not satisfy the condition for realizing the current control by the inverter circuit 100 in the entire phase range of the AC power supply, a period for performing PWM control for the converter circuit 300 is provided, whereby the power factor of the input current is controlled to be 1 while the PWM control for the inverter circuit 100 and the PWM control for the converter circuit 300 are switched therebetween, thus continuing the current control reliably. Therefore, the DC voltage Vsub of the inverter circuit 100 can be further reduced. Therefore, the ranges of the AC power supply voltage Vin and the DC voltage Vdc can be expanded without increasing the withstand voltage of the power conversion apparatus, the current control can be realized in a wide operation range, and downsizing and power loss reduction of the power conversion apparatus can be realized. In addition, since the current control can be continued, reliability of the apparatus is improved.

Embodiment 4

In the above embodiments 1 to 3, the case where the inverter circuit 100 does not satisfy one of the three conditions (expressions 4 to 6) for allowing the current control in the entire phase range of the AC power supply 1, has been described. In the present embodiment, the case of not satisfying two conditions of expressions 4 and 5 will be described. It is noted that the main circuit configuration and the configuration of the control circuit 10 are the same as in the above embodiment 1, and the basic power running operation described with reference to FIGS. 2 to 7 is also the same as in the above embodiment 1.

Figure 16:
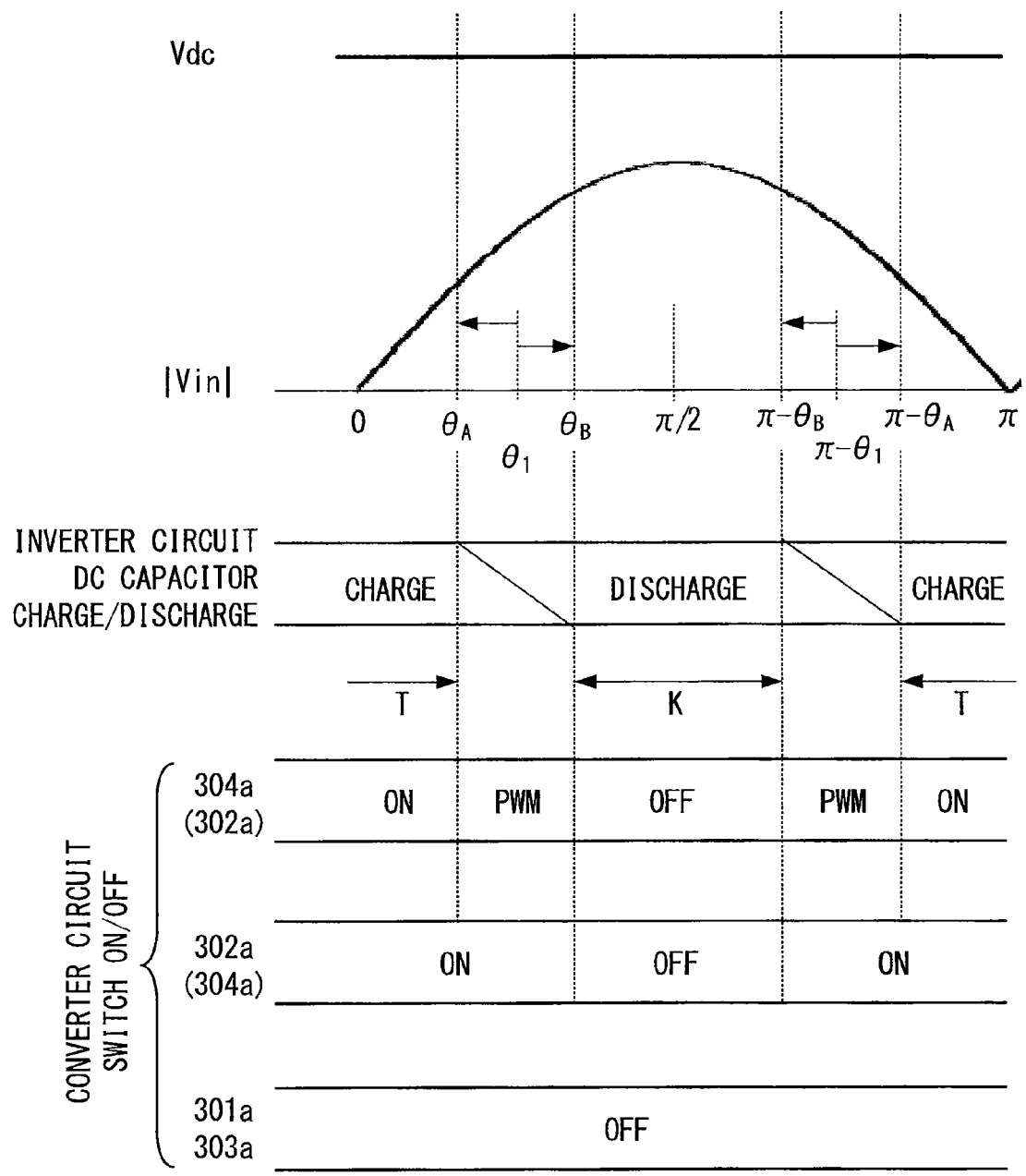
FIG. 16 is a diagram explaining current control switching operation together with a waveform at each section, in the power conversion apparatus according to embodiment 4 of the present invention.

FIG. 16 is a diagram explaining current control switching operation according to embodiment 4 together with a waveform at each section. In this case, there is a period including the phase $\theta_1$ of the AC power supply 1 in which the inverter circuit 100 cannot perform either operation of outputting voltage (−Vin) to charge the DC capacitor 105 or operation of outputting voltage (Vdc*−Vin) to cause the DC capacitor 105 to discharge. Therefore, a new phase $\theta_A$ and a new phase $\theta B$ determining the short-circuit period T and the open-circuit period K are to be determined.

In the short-circuit period T and the open-circuit period K, current control is performed by PWM control for the inverter circuit 100, and in the other period, PWM control is performed for the converter circuit 300. In the short-circuit period T of $0 \le \theta \le \theta_A$, $\pi - \theta_A \le \theta \le \pi + \theta_A$, and $2\pi - \theta_A \le \theta \le 2\pi$, the voltage Vsub of the DC capacitor 105 satisfies the above expression 2, and in the open-circuit period K of $\theta_B \le \theta \le \pi - \theta_B$, $\pi + \theta_B \le \theta \le 2\pi - \theta_B$, the voltage Vsub satisfies the above expression 3.

That is, in the short-circuit period T, the voltage Vsub is equal to or greater than the magnitude of the voltage Vin of the AC power supply 1, and in the open-circuit period K, the voltage Vsub is equal to or greater than the difference between the magnitudes of the voltage Vdc (target voltage Vdc*) of the smoothing capacitor 3 and the voltage Vin.

In this case, the phase $\theta_A$ and the phase $\theta_B$ are determined such that the above expression 2 is satisfied in the short-circuit period T and the above expression 3 is satisfied in the open-circuit period K, and such that the above expression B is satisfied so as to cause the charge-discharge amount of the DC capacitor 105 in the short-circuit period T and the open-circuit period K to be 0 in total.

Then, as shown in FIG. 16, in the short-circuit period T of $0 \le \theta \le \theta_A$ and $\pi - \theta_A \le \theta \le \pi$, the converter circuit 300 continuously turns on the semiconductor switching devices 302a and 304a which are short-circuit switches, to bypass the smoothing capacitor 3. At this time, the other semiconductor switching devices 301a and 303a in the converter circuit 300 are turned off. Current from the AC power supply 1 flows into the inverter circuit 100 to charge the DC capacitor 105, and then passes through the converter circuit 300 to return to the AC power supply 1. At this time, in the inverter circuit 100, current control is performed by PWM control such that the DC capacitor 105 is charged.

In the open-circuit period K of $\theta_B \leq \theta \leq \pi - \theta_B$, in the converter circuit 300, all the semiconductor switching devices 301a to 304a are turned off. Current from the AC power supply 1 flows into the inverter circuit 100, and its output passes through the converter circuit 300 while charging the smoothing capacitor 3, and then returns to the AC power supply 1. At this time, in the inverter circuit 100, current control is performed by PWM control such that the DC capacitor 105 is caused to discharge.

In the period of $\theta_A \leq \theta \leq \theta_B$ and $\pi - \theta_B \leq \theta \leq \pi - \theta_A$, in the inverter circuit 100, the AC-side output voltage is controlled to be 0 to cause current not to flow in the DC capacitor 105, while the DC capacitor 105 does not perform charge and discharge. Current from the AC power supply 1 passes through the inverter circuit 100 and then flows into the converter circuit 300. Then, in the converter circuit 300, the semiconductor switching devices 301a and 303a are turned off and the semiconductor switching device 302a is turned on, and current is controlled by PWM control using the semiconductor switching device 304a, thereby charging the smoothing capacitor 3. It is noted that when the voltage Vin is negative, the semiconductor switching device 304a is turned on and current is controlled by PWM control using the semiconductor switching device 302a, thereby charging the smoothing capacitor 3.

Thus, in the case where there is a period in which the input current power factor control by the inverter circuit 100 is not realized, the short-circuit period T and the open-circuit period K are newly set so as to cause the charge-discharge amount of the DC capacitor 105 of the inverter circuit 100 to be 0 in total. Then, in the short-circuit period T and the open-circuit period K, current control by the inverter circuit 100 is performed, and in the other period, current control by the converter circuit 300 is performed, whereby the DC voltage of the DC capacitor 105 of the inverter circuit 100 is kept constant, and power factor control for the input current Iin is continued throughout one cycle, so that the power factor of the input current Iin is controlled to be 1.

Next, controls for the inverter circuit 100 and the converter circuit 300 will be described below. The control configuration for the converter circuit 300 by the control circuit 10 is the same as in FIG. 10 shown in the above embodiment 1, and the control configuration for the inverter circuit 100 is the same as in FIG. 12.

In the output control for the converter circuit 300, as in the above embodiment 1, the gate signal 24 by the voltage-Vsub-constant control, the gate signal 31 by the input current power factor control, the phases $\theta_A 37$ and $\theta_B 36$ determining the newly set short-circuit period T and the newly set open-circuit period K, are generated and inputted to the gate signal selecting device 38.

The gate signal 24 by the voltage-Vsub-constant control and the gate signal 31 by the input current power factor control are generated in the same manner as in the above embodiment 1.

A current control determination device 32 determines whether or not the conditions for the input current power factor control by the inverter circuit 100 are satisfied, based on the voltage Vin of the AC power supply 1, the DC voltage Vdc of the smoothing capacitor 3, and the voltage Vsub of the DC capacitor 105 of the inverter circuit 100. That is, whether or not the voltage Vsub of the DC capacitor 105 satisfies the above three conditions (expressions 4 to 6) is determined, to derive a condition in which the input current power factor control by the inverter circuit 100 is not realized. In the present embodiment, the voltage Vsub does not satisfy two conditions of expressions 4 and 5.

The current control period calculating device 50 newly determines the short-circuit period T and the open-circuit period K based on the output of the current control determination device 32, to output phases $\theta_A 34$ and $\theta_B 36$.

In this case, the phase $\theta_A$ and the phase $\theta_B$ are determined such that the above expression 2 is satisfied in the short-circuit period T and the above expression 3 is satisfied in the open-circuit period K, and such that the charge-discharge amount of the DC capacitor 105 in the short-circuit period T and the open-circuit period K is 0 in total. In this case, the calculation is made by using the above expression B.

Then, as in the above embodiment 1, the output 22 obtained by PI control using the difference 21 between the instruction value Vsub* and the voltage Vsub is added to an output 34 from the current control short-circuit period calculating device 33, whereby the phase $\theta_A$ is finely adjusted. The adjusted phase $\theta_A 37$ and the phase $\theta_B 36$ from the current control open-circuit period calculating device 35 are inputted to the gate signal selecting device 38.

The gate signal selecting device 38 receives the gate signal 24 by the voltage-Vsub-constant control, the gate signal 31 by the input current power factor control, and the phases $\theta_A 37$ and $\theta_B 36$ determining the newly set short-circuit period T and the newly set open-circuit period K. Then, further based on the voltage Vin of the AC power supply 1 and the DC voltage Vdc of the smoothing capacitor 3, the gate signal selecting device 38 outputs, as the gate signal 12 to the converter circuit 300, the gate signal 24 in the short-circuit period T and in the open-circuit period K and the gate signal 31 in the other period.

In the output control for the inverter circuit 100, as in the above embodiment 1, the gate signal 47 by the input current power factor control, and the phases $\theta_A 37$ and $\theta_B 36$ determining the short-circuit period T and the open-circuit period K, calculated by the control of the converter circuit 300, are inputted to the gate signal generating device 48. The gate signal generating device 48 further receives the voltage Vin of the AC power supply 1 and the DC voltage Vdc of the smoothing capacitor 3, and outputs, as the gate signal 11 to the inverter circuit 100, the gate signal 47 in the short-circuit period T and in the open-circuit period K, and a gate signal for outputting voltage 0 in the other period.

Also in the present embodiment, as in the above embodiment 1, even in the case where the voltage Vsub of the DC capacitor 105 does not satisfy the condition for realizing the current control by the inverter circuit 100 in the entire phase range of the AC power supply, a period for performing PWM control for the converter circuit 300 is provided, whereby the power factor of the input current is controlled to be 1 while the PWM control for the inverter circuit 100 and the PWM control for the converter circuit 300 are switched therebetween, thus continuing the current control reliably. Therefore, the DC voltage Vsub of the inverter circuit 100 can be further reduced. Therefore, the ranges of the AC power supply voltage Vin and the DC voltage Vdc can be expanded without increasing the withstand voltage of the power conversion apparatus, the current control can be realized in a wide operation range, and downsizing and power loss reduction of the power conversion apparatus can be realized. In addition, since the current control can be continued, reliability of the apparatus is improved.

Embodiment 5

In the above embodiments 1 to 4, only the power running operation of the power conversion apparatus has been described. On the other hand, in embodiment 5, the power conversion apparatus has a regeneration function, so that the power conversion apparatus regenerates power to the AC power supply 1 through regeneration operation.

It is noted that the circuit configuration is the same as that shown in FIG. 1, and the power running operation is the same as in the above embodiment 1.

FIGS. 17 to 20 show current route diagrams in the regeneration operation.

First, the case where the voltage Vin of the AC power supply 1 is positive, that is, θ is in a range of 0≤θ<π, will be described.

In the inverter circuit 100, when the semiconductor switching devices 101a and 104a are ON and the semiconductor switching devices 102a and 103a are OFF, current flows so as to cause the DC capacitor 105 to discharge, and when the semiconductor switching devices 102a and 103a are ON and the semiconductor switching devices 101a and 104a are OFF, current flows so as to charge the DC capacitor 105. On the other hand, when the semiconductor switching devices 101a and 103a are ON and the semiconductor switching devices 102a and 104a are OFF, and when the semiconductor switching devices 102a and 104a are ON and the semiconductor switching devices 101a and 103a are OFF, current flows without flowing in the DC capacitor 105. The inverter circuit 100 controls the semiconductor switching devices 101a to 104a by a combination of the four types of control as described above, to control and output the current Iin by PWM control such that the power factor of the AC power supply 1 is about (−1), thereby causing the DC capacitor 105 to perform charge and discharge, and superimposing the generated voltage on the AC side onto the voltage Vin which is an output of the AC power supply 1. It is noted that when the current flowing in each of the semiconductor switching devices 101a to 104a flows from the emitter to the collector thereof, the semiconductor switching device may be turned off so that current flows in the corresponding one of diodes 101b to 104b connected in reverse-parallel thereto.

Figure 17:
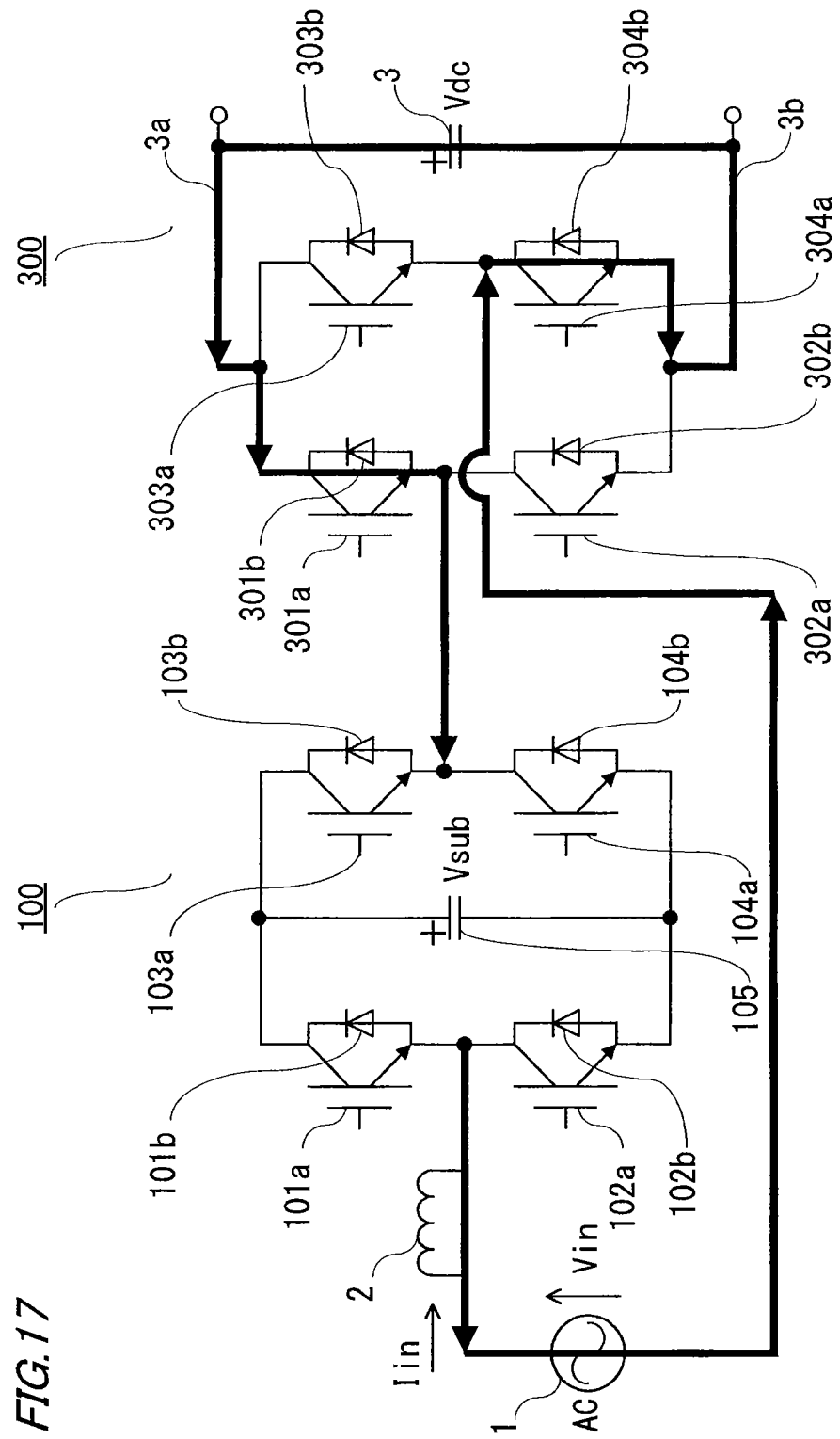
FIG. 17 is a current route diagram explaining a regeneration operation of the power conversion apparatus according to embodiment 5 of the present invention.

As shown in FIG. 17, in the converter circuit 300, the semiconductor switching devices 301a and 304a are turned on. Current from the positive terminal of the smoothing capacitor 3 passes through the semiconductor switching device 301a of the converter circuit 300, and then flows into the inverter circuit 100. The current from the inverter circuit 100 passes through the reactor 2, to be regenerated to the AC power supply 1, and then, from the other terminal of the AC power supply 1, passes through the semiconductor switching device 304a of the converter circuit 300, to return to the negative terminal of the smoothing capacitor 3. At this time, in the inverter circuit 100, PWM operation is performed by a combination of the above four types of control, thereby causing the DC capacitor 105 to perform charge and discharge, thus performing the current control. The DC capacitor 105 is charged with energy from the smoothing capacitor 3, and on the other hand, in the case of discharging (step-up operation), energy from the DC capacitor 105 is regenerated, together with energy from the smoothing capacitor 3, to the AC power supply 1.

Figure 18:
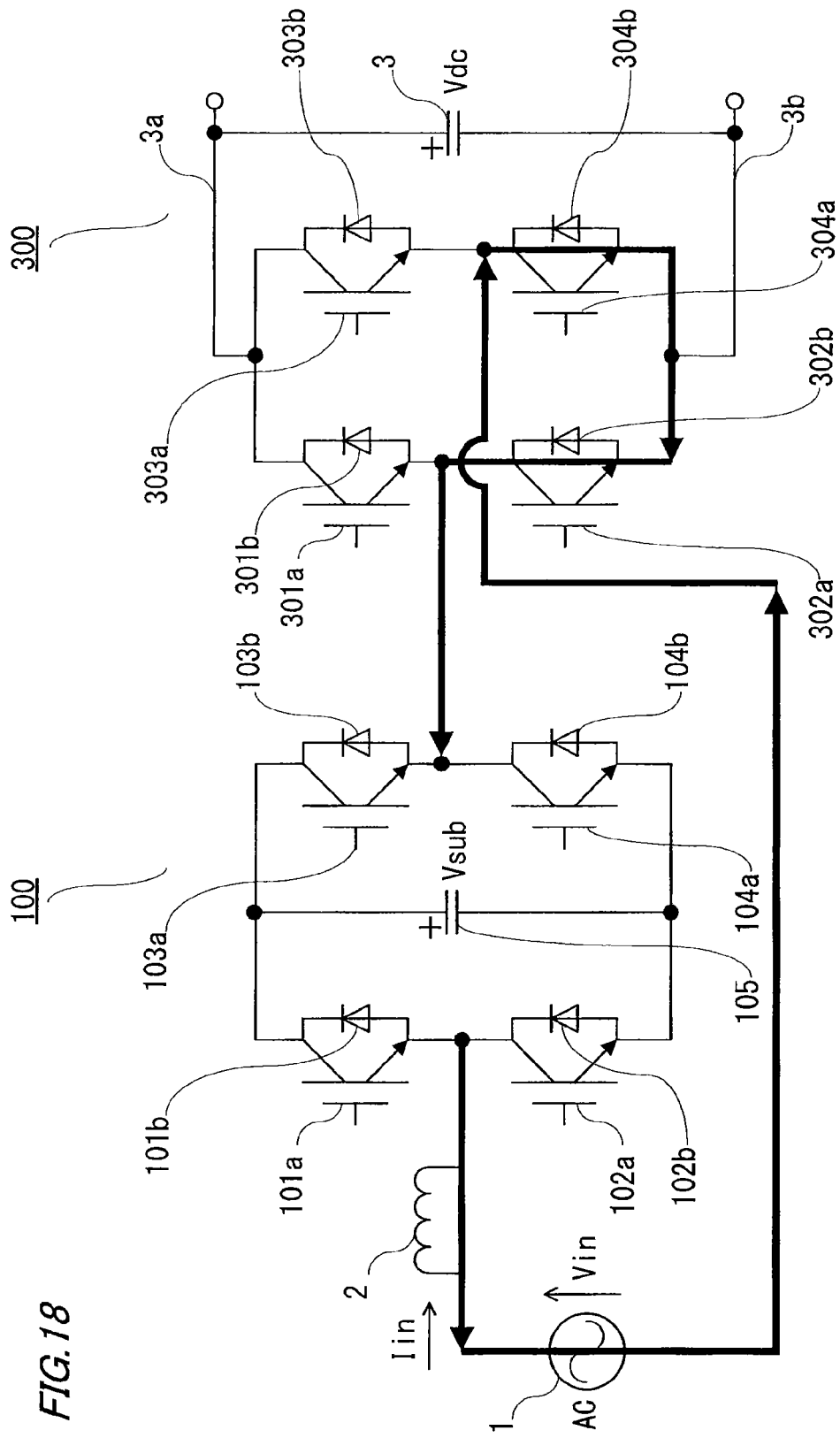
FIG. 18 is a current route diagram explaining a regeneration operation of the power conversion apparatus according to embodiment 5 of the present invention.

In the short-circuit period T which corresponds to a phase range between ±θ₁ centered at the zero cross phase of the voltage Vin of the AC power supply 1, as shown in FIG. 18, in the converter circuit 300, the semiconductor switching device 304a which is a short-circuit switch is turned on, whereby the smoothing capacitor 3 is bypassed. Current from the positive terminal of the DC capacitor 105 in the inverter circuit 100 passes through the reactor 2, to be regenerated to the AC power supply 1. Then, from the other terminal of the AC power supply 1, the current passes through the semiconductor switching device 304a and the diode 302b of the converter circuit 300, and then flows into the inverter circuit 100, to return to the negative terminal of the DC capacitor 105. At this time, in the inverter circuit 100, PWM operation is performed by a combination of control for causing the DC capacitor 105 to discharge and control for causing current not to flow therein, thereby causing the DC capacitor 105 to discharge, thus performing the current control.

Next, the case where the voltage Vin is negative, that is, θ is in a range of π≤θ<2π, will be described.

In the inverter circuit 100, when the semiconductor switching devices 102a and 103a are ON and the semiconductor switching devices 101a and 104a are OFF, current flows so as to cause the DC capacitor 105 to discharge, and when the semiconductor switching devices 101a and 104a are ON and the semiconductor switching devices 102a and 103a are OFF, current flows so as to charge the DC capacitor 105. On the other hand, when the semiconductor switching devices 101a and 103a are ON and the semiconductor switching devices 102a and 104a are OFF, and when the semiconductor switching devices 102a and 104a are ON and the semiconductor switching devices 101a and 103a are OFF, current flows without flowing in the DC capacitor 105. The inverter circuit 100 controls the semiconductor switching devices 101a to 104a by a combination of the four types of control as described above, to control and output the current Iin by PWM control such that the power factor of the AC power supply 1 is about (−1), thereby causing the DC capacitor 105 to perform charge and discharge, and superimposing the generated voltage on the AC side onto the voltage Vin which is an output of the AC power supply 1.

Figure 19:
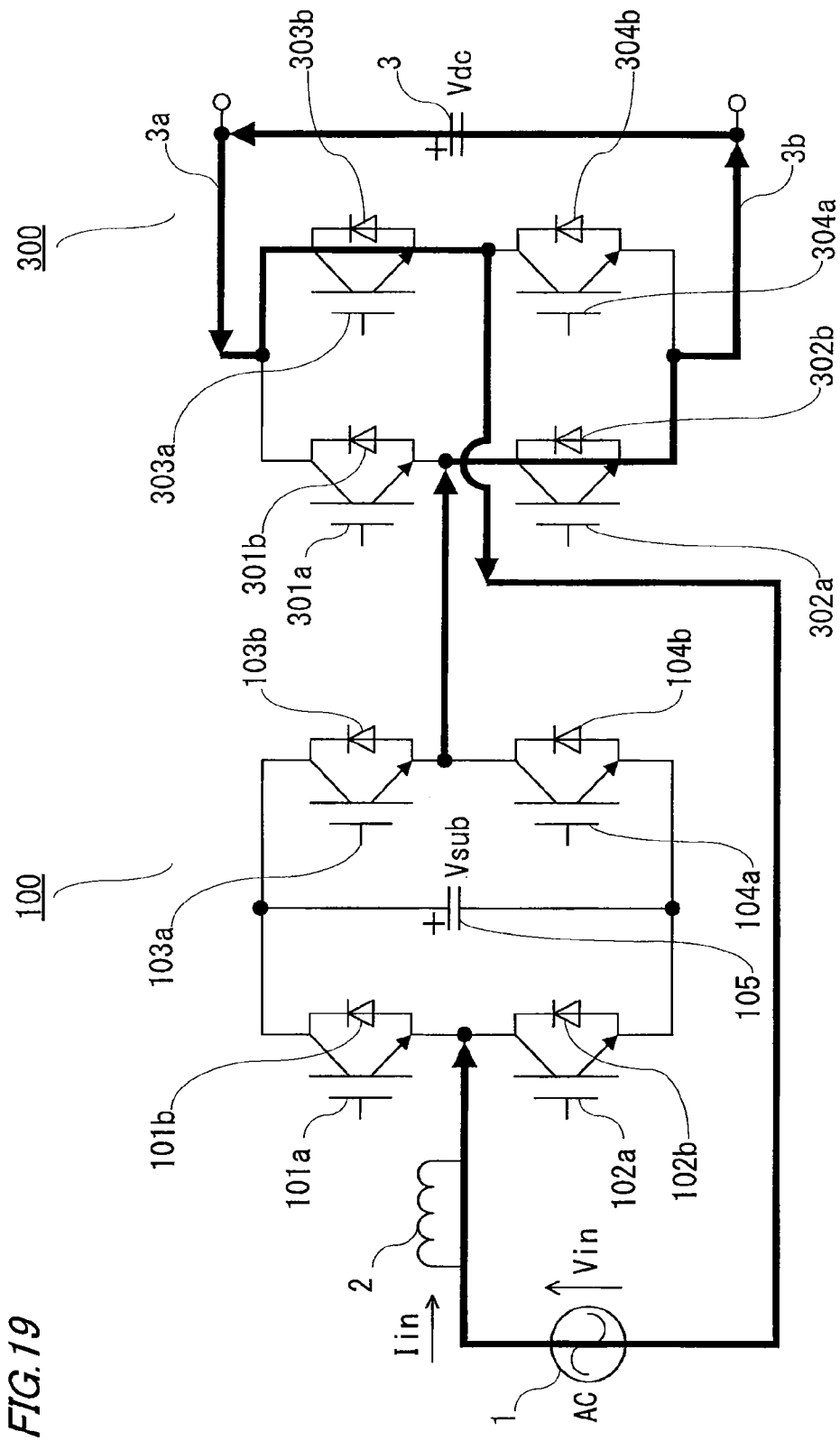
FIG. 19 is a current route diagram explaining a regeneration operation of the power conversion apparatus according to embodiment 5 of the present invention.

As shown in FIG. 19, in the converter circuit 300, the semiconductor switching devices 302a and 303a are turned on. Current from the positive terminal of the smoothing capacitor 3 passes through the semiconductor switching device 303a of the converter circuit 300 to be regenerated to the AC power supply 1. Then, from the other terminal of the AC power supply 1, the current passes through the reactor 2 and flows into the inverter circuit 100, and the current from the inverter circuit 100 passes through the semiconductor switching device 302a of the converter circuit 300, to return to the negative terminal of the smoothing capacitor 3. At this time, in the inverter circuit 100, PWM operation is performed by a combination of the above four types of control, thereby causing the DC capacitor 105 to perform charge and discharge, thus performing the current control. The DC capacitor 105 is charged with energy from the smoothing capacitor 3, and on the other hand, in the case of discharging (step-up operation), energy from the DC capacitor 105 is regenerated, together with energy from the smoothing capacitor 3, to the AC power supply 1.

Figure 20:
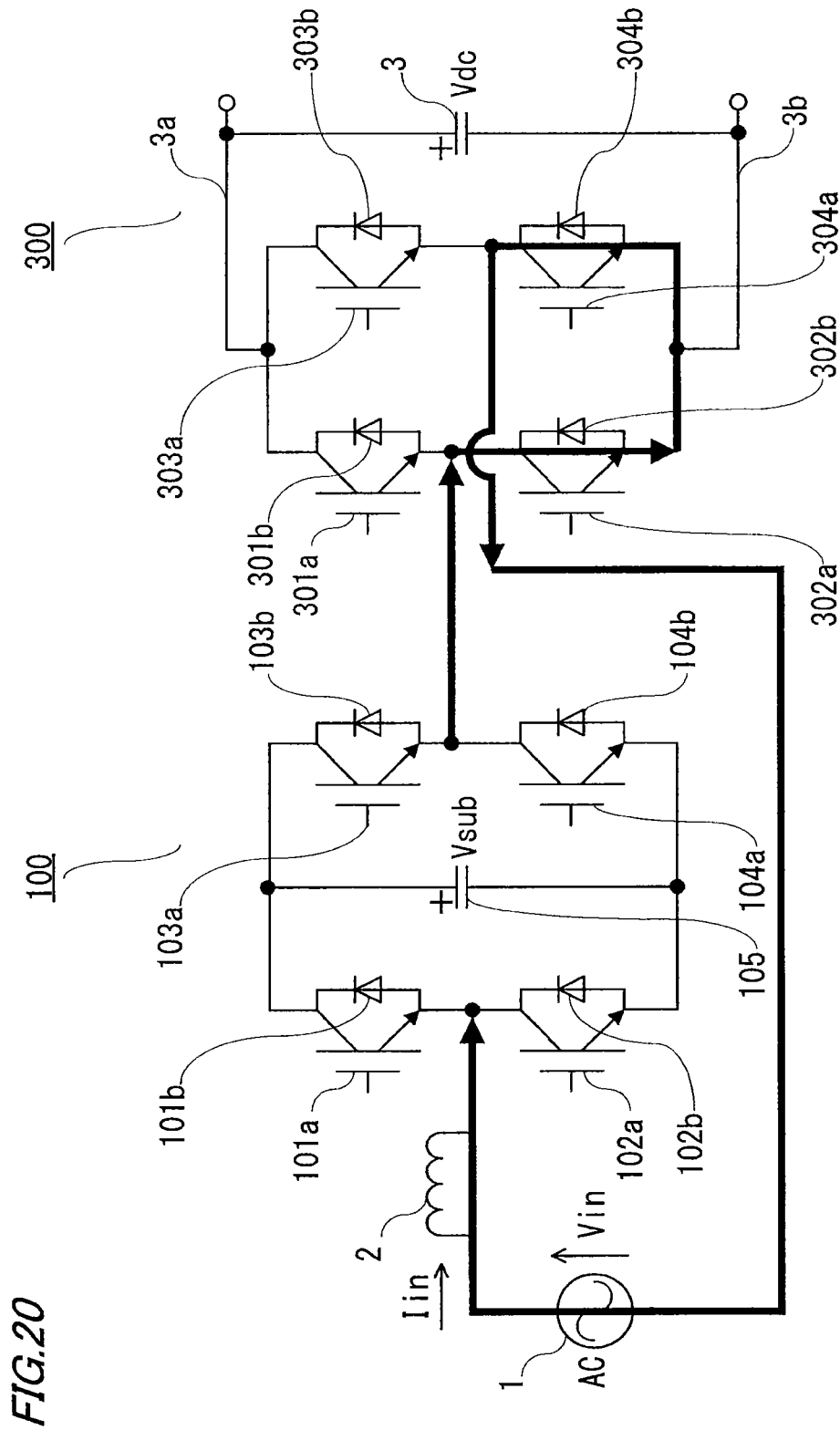
FIG. 20 is a current route diagram explaining a regeneration operation of the power conversion apparatus according to embodiment 5 of the present invention.

In the short-circuit period T which corresponds to a phase range between ±θ₁ centered at the zero cross phase of the voltage Vin of the AC power supply 1, as shown in FIG. 20, in the converter circuit 300, the semiconductor switching device 302a which is a short-circuit switch is turned on, whereby the smoothing capacitor 3 is bypassed. Current from the positive terminal in the inverter circuit 100 passes through the semiconductor switching device 302a and the diode 304b of the converter circuit 300, to be regenerated to the AC power supply 1. Then, from the other terminal of the AC power supply 1, the current passes through the reactor 2 and flows into the inverter circuit 100, to return to the negative terminal of the DC capacitor 105. At this time, in the inverter circuit 100, PWM operation is performed by a combination of control for causing the DC capacitor 105 to discharge and control for causing current not to flow therein, thereby causing the DC capacitor 105 to discharge, thus performing the current control.

In the converter circuit 300, whether the voltage Vin is positive or negative, in the short-circuit period T, the control circuit 10 may turn on the two semiconductor switching devices 302a and 304a as short-circuit switches or may turn on the other two semiconductor switching devices 301a and 303a as short-circuit switches.

As described above, also in the regeneration operation, as in the power running operation, the operation of the converter circuit 300 includes the short-circuit period T in which the AC terminals of the converter circuit 300 are continuously short-circuited so that the smoothing capacitor 3 is bypassed, and the period (hereinafter, referred to as an open-circuit period K) in which DC power from the smoothing capacitor 3 is continuously inputted to the converter circuit 300, and in both the short-circuit period T and the open-circuit period K, current is controlled by PWM operation of the inverter circuit 100.

That is, at $\pm\theta_1$ from a zero cross phase ($\theta=0$, $\pi$) of the voltage phase $\theta$ of the AC power supply 1, the control for the converter circuit 300 is switched, and only in the short-circuit period T between $\pm\theta_1$ centered at the zero cross phase, the smoothing capacitor 3 is bypassed. At this time, the inverter circuit 100 generates voltage substantially equal to the opposite polarity voltage of the voltage Vin, and controls and outputs the current Iin such that the input power factor is about (−1), while the DC capacitor 105 discharges. On the other hand, in the open-circuit period K other than the short-circuit period, the inverter circuit 100 maintains the DC voltage Vdc of the smoothing capacitor 3 at the target voltage Vdc* and controls and outputs the current Iin such that the input power factor is about (−1). At this time, when the absolute value of the voltage Vin is equal to or lower than the target voltage Vdc* of the smoothing capacitor 3, the DC capacitor 105 is charged, and when the absolute value of the voltage Vin is equal to or higher than the target voltage Vdc*, the DC capacitor 105 discharges.

Also in such a regeneration operation, as in the power running operation, the voltage Vsub of the DC capacitor 105 is set so as to satisfy the following expressions 2 and 3.

At the phase $\theta$ in the short-circuit period T, $$V\text{sub} \geq |Vp \cdot \sin\theta| \quad \text{Expression 2}$$

At the phase $\theta$ in the open-circuit period K, $$V\text{sub} \geq |Vdc^* - |Vp \cdot \sin\theta|| \quad \text{Expression 3}$$

In order to perform the control for the inverter circuit 100 to control the current Iin such that the input power factor is about (−1) in the entire phase range of the AC power supply 1, the voltage Vsub of the DC capacitor 105 is required to satisfy the following three conditions as in the power running operation.

$$V\text{sub} \geq Vp \cdot \sin\theta_1 \quad \text{Expression 4}$$

$$V\text{sub} \geq (Vdc^* - Vp \cdot \sin\theta_1) \quad \text{Expression 5}$$

$$V\text{sub} \geq (Vp - Vdc^*) \quad \text{Expression 6}$$

The operation of the power conversion apparatus in the case where the voltage Vsub of the DC capacitor 105 does not satisfy one of the above three conditions (expressions 4 to 6) will be described below. In this case, it is impossible to perform the current control by the PWM control for the inverter circuit 100 in the entire phase range of the AC power supply voltage. Therefore, the current Iin is controlled such that the input power factor is about (−1), while the PWM control for the inverter circuit 100 and the PWM control for the converter circuit 300 are switched therebetween.

Figure 21:
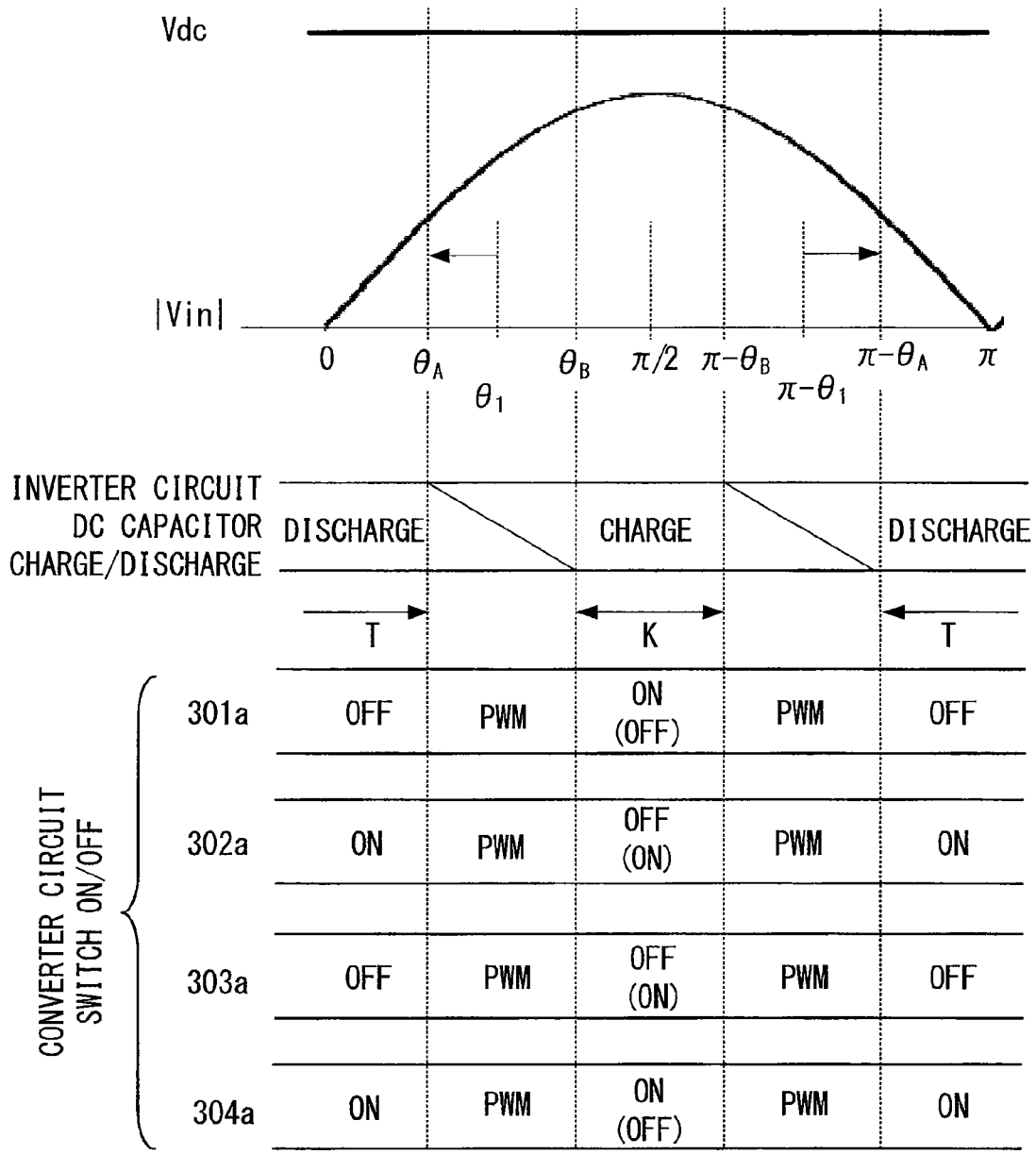
FIG. 21 is a diagram explaining a first example of current control switching operation together with a waveform at each section, in the power conversion apparatus according to embodiment 5 of the present invention.

FIG. 21 is a diagram explaining a first example of current control switching operation together with a waveform at each section. In this case, at the phase $\theta_1$ determining the short-circuit period T obtained by the above expression 1, the voltage Vsub of the DC capacitor 105 does not satisfy expression 4, that is, Vsub<Vp·sin $\theta_1$ is satisfied. Then, as in the above embodiment 1, a new phase $\theta_A$ determining the short-circuit period T is to be determined, and along with this, a new phase $\theta_B$ determining the open-circuit period K is to be determined.

That is, in the short-circuit period T, the voltage Vsub of the DC capacitor 105 satisfies the above expression 2 so that the voltage Vsub is equal to or greater than the magnitude of the voltage Vin of the AC power supply 1. In the open-circuit period K, the voltage Vsub satisfies the above expression 3 so that the voltage Vsub is equal to or greater than the difference between the magnitudes of the voltage Vdc (target voltage Vdc*) of the smoothing capacitor 3 and the voltage Vin. In addition, the short-circuit period T and the open-circuit period K are newly set such that the charge-discharge amount of the DC capacitor 105 of the inverter circuit 100 is 0 in total.

In the short-circuit period T and in the open-circuit period K, the current control is performed by PWM control for the inverter circuit 100, and in the other period, the current control is performed by PWM control for the converter circuit 300.

As shown in FIG. 21, in the short-circuit period T of $0 \leq \theta \leq \theta_A$ and $\pi - \theta_A \leq \theta \leq \pi$, the converter circuit 300 continuously turns on the semiconductor switching devices 302a and 304a which are short-circuit switches, to bypass the smoothing capacitor 3. At this time, the other semiconductor switching devices 301a and 303a in the converter circuit 300 are turned off. Current from the positive terminal of the DC capacitor 105 in the inverter circuit 100 is regenerated to the AC power supply 1, passes through the converter circuit 300, and then flows into the inverter circuit 100, to return to the negative terminal of the DC capacitor 105. At this time, in the inverter circuit 100, current control is performed by PWM control such that the DC capacitor 105 is caused to discharge.

In the open-circuit period K of $\theta_B \leq \theta \leq \pi - \theta_B$, in the converter circuit 300, the semiconductor switching devices 301a and 304a are turned on and the other semiconductor switching devices 302a and 303a are turned off, whereby DC power from the smoothing capacitor 3 is continuously inputted to the converter circuit 300. Current from the positive terminal of the smoothing capacitor 3 passes through the converter circuit 300 and flows into the inverter circuit 100, and then the current from the inverter circuit 100 is regenerated to the AC power supply 1, passes through the converter circuit 300, and returns to the negative terminal of the smoothing capacitor 3. At this time, in the inverter circuit 100, current control is performed by PWM control such that the DC capacitor 105 is charged.

It is noted that when the voltage Vin is negative, the semiconductor switching devices 302a and 303a are turned on and the other semiconductor switching devices 301a and 304a are turned off.

In the period of $\theta_A \leq \theta \leq \theta_B$ and $\pi - \theta_B \leq \theta \leq \pi - \theta_A$, in the inverter circuit 100, as shown in FIG. 9, the AC-side output voltage is controlled to be 0 to cause current not to flow in the DC capacitor 105, while the DC capacitor 105 does not perform charge and discharge. Then, in the converter circuit 300, switching of the semiconductor switching devices 301a to 304a is performed by PWM control so as to maintain the DC voltage Vdc of the smoothing capacitor 3 at the target voltage Vdc* and control the current Iin such that the input power factor is about (−1).

Thus, in the case where there is a period in which the current power factor control by the inverter circuit 100 is not realized, the short-circuit period T and the open-circuit period K are newly set such that the above expression 2 is satisfied in the short-circuit period T and the above expression 3 is satisfied in the open-circuit period K and such that the charge-discharge amount of the DC capacitor 105 of the inverter circuit 100 is 0 in total. Then, in the short-circuit period T and the open-circuit period K, current control by the inverter circuit 100 is performed, and in the other period, current control by the converter circuit 300 is performed, whereby the DC voltage of the DC capacitor 105 of the inverter circuit 100 is kept constant, and power factor control for the input current Iin is continued throughout one cycle, so that the power factor of the input current Iin is controlled to be (−1).

Next, a second example of the current control switching operation will be described below based on FIG. 22. In this case, the power conversion apparatus performs step-down operation, so that expression 6 is not satisfied, that is, Vsub< (Vp−Vdc*) is satisfied. As in the above embodiment 2, a new phase $\theta_B$ determining one end of the open-circuit period K is to be determined, and along with this, a new phase $\theta_A$ determining the short-circuit period T is to be determined. In this case, the phase $\theta_A$ is also the other end of the open-circuit period K.

That is, in the short-circuit period T, the voltage Vsub of the DC capacitor 105 satisfies the above expression 2 so that the voltage Vsub is equal to or greater than the magnitude of the voltage Vin of the AC power supply 1. In the open-circuit period K, the voltage Vsub satisfies the above expression 3 so that the voltage Vsub is equal to or greater than the difference between the magnitudes of the voltage Vdc (target voltage Vdc*) of the smoothing capacitor 3 and the voltage Vin. In addition, the short-circuit period T and the open-circuit period K are newly set such that the charge-discharge amount of the DC capacitor 105 of the inverter circuit 100 is 0 in total.

In the short-circuit period T and in the open-circuit period K, the current control is performed by PWM control for the inverter circuit 100, and in the other period, the current control is performed by PWM control for the converter circuit 300.

Figure 22:
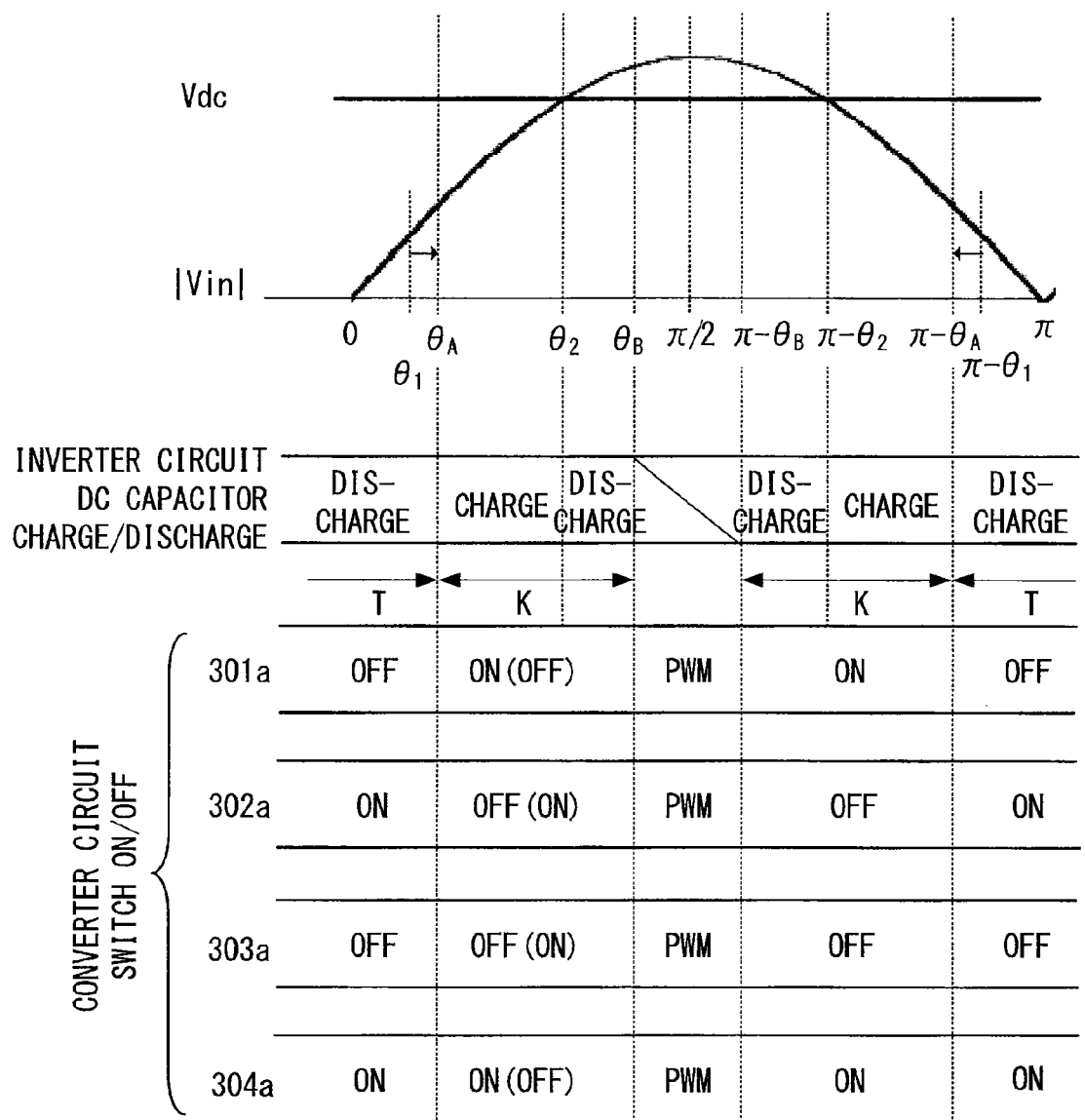
FIG. 22 is a diagram explaining a second example of current control switching operation together with a waveform at each section, in the power conversion apparatus according to embodiment 5 of the present invention.

As shown in FIG. 22, in the short-circuit period T of $0 \leq \theta \leq \theta_A$ and $\pi - \theta_A \leq \theta \leq \pi$, the converter circuit 300 continuously turns on the semiconductor switching devices 302a and 304a which are short-circuit switches, to bypass the smoothing capacitor 3. At this time, the other semiconductor switching devices 301a and 303a in the converter circuit 300 are turned off. Current from the positive terminal of the DC capacitor 105 in the inverter circuit 100 is regenerated to the AC power supply 1, passes through the converter circuit 300, and then flows into the inverter circuit 100, to return to the negative terminal of the DC capacitor 105. At this time, in the inverter circuit 100, current control is performed by PWM control such that the DC capacitor 105 is caused to discharge.

In the open-circuit period K of $\theta_A \leq \theta \leq \theta_B$ and $\pi - \theta_B \leq \theta \leq \pi - \theta_A$, in the converter circuit 300, the semiconductor switching devices 301a and 304a are turned on and the other semiconductor switching devices 302a and 303a are turned off, whereby DC power from the smoothing capacitor 3 is continuously inputted to the converter circuit 300. Current from the positive terminal of the smoothing capacitor 3 passes through the converter circuit 300 and flows into the inverter circuit 100, and then the current from the inverter circuit 100 is regenerated to the AC power supply 1, passes through the converter circuit 300, and returns to the negative terminal of the smoothing capacitor 3. At this time, in the inverter circuit 100, when the voltage Vin is equal to or smaller than the voltage Vdc* of the smoothing capacitor 3, current control is performed by PWM control such that the DC capacitor 105 is charged, and when the voltage Vin is equal to or greater than the voltage Vdc* of the smoothing capacitor 3, current control is performed by PWM control such that the DC capacitor 105 is caused to discharge.

It is noted that when the voltage Vin is negative, the semiconductor switching devices 302a and 303a are turned on and the other semiconductor switching devices 301a and 304a are turned off.

In the period of $\theta_B \leq \theta \leq \pi - \theta_B$, in the inverter circuit 100, the AC-side output voltage is controlled to be 0 to cause current not to flow in the DC capacitor 105, while the DC capacitor 105 does not perform charge and discharge. Current from the AC power supply 1 passes through the inverter circuit 100 and then flows into the converter circuit 300. Then, in the converter circuit 300, switching of the semiconductor switching devices 301a to 304a is performed by PWM control so as to maintain the DC voltage Vdc of the smoothing capacitor 3 at the target voltage Vdc* and control the current Iin such that the input power factor is about (−1).

Next, a third example of the current control switching operation will be described below based on FIG. 23. In this case, at the phase $\theta_1$ determining the short-circuit period T obtained by the above expression 1, the voltage Vsub of the DC capacitor 105 does not satisfy expression 5, that is, Vsub< (Vdc*−Vp·sin $\theta_1$) is satisfied. Then, as in the above embodiment 3, a new phase $\theta_B$ determining the open-circuit period K is to be determined, and along with this, a new phase $\theta_A$ determining the short-circuit period T is to be determined.

That is, in the short-circuit period T, the voltage Vsub of the DC capacitor 105 satisfies the above expression 2 so that the voltage Vsub is equal to or greater than the magnitude of the voltage Vin of the AC power supply 1. In the open-circuit period K, the voltage Vsub satisfies the above expression 3 so that the voltage Vsub is equal to or greater than the difference between the magnitudes of the voltage Vdc (target voltage Vdc*) of the smoothing capacitor 3 and the voltage Vin. In addition, the short-circuit period T and the open-circuit period K are newly set such that the charge-discharge amount of the DC capacitor 105 of the inverter circuit 100 is 0 in total.

In the short-circuit period T and in the open-circuit period K, the current control is performed by PWM control for the inverter circuit 100, and in the other period, the current control is performed by PWM control for the converter circuit 300.

Figure 23:
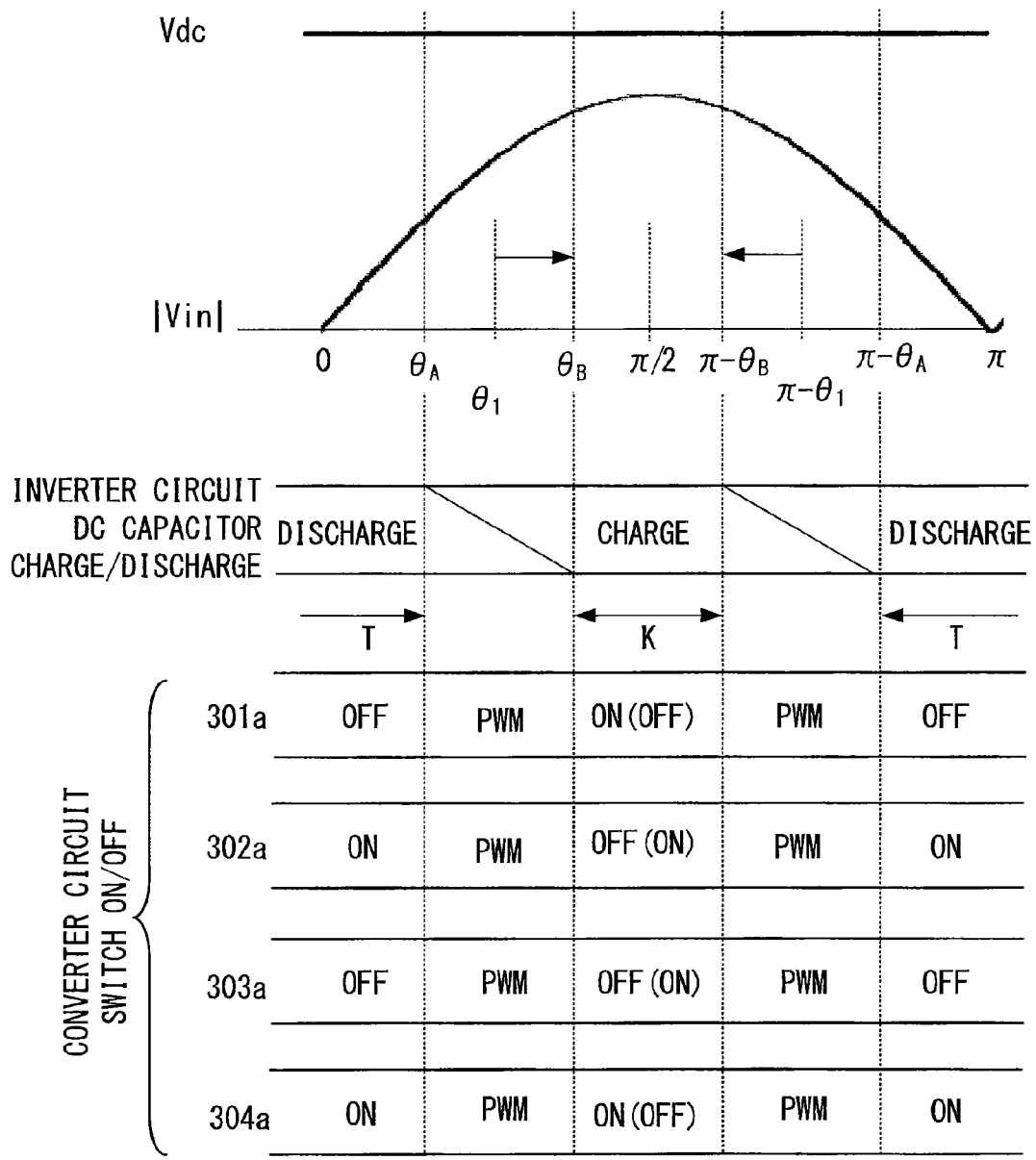
FIG. 23 is a diagram explaining a third example of current control switching operation together with a waveform at each section, in the power conversion apparatus according to embodiment 5 of the present invention.

As shown in FIG. 23, in the short-circuit period T of $0 \leq \theta \leq \theta_A$ and $\pi - \theta_A \leq \theta \leq \pi$, the converter circuit 300 continuously turns on the semiconductor switching devices 302a and 304a which are short-circuit switches, to bypass the smoothing capacitor 3. At this time, the other semiconductor switching devices 301a and 303a in the converter circuit 300 are turned off. Current from the positive terminal of the DC capacitor 105 in the inverter circuit 100 is regenerated to the AC power supply 1, passes through the converter circuit 300, and then flows into the inverter circuit 100, to return to the negative terminal of the DC capacitor 105. At this time, in the inverter circuit 100, current control is performed by PWM control such that the DC capacitor 105 is caused to discharge.

In the open-circuit period K of $\theta_B \leq \theta \leq \pi-\theta_B$, in the converter circuit 300, the semiconductor switching devices 301a and 304a are turned on and the other semiconductor switching devices 302a and 303a are turned off, whereby DC power from the smoothing capacitor 3 is continuously inputted to the converter circuit 300. Current from the positive terminal of the smoothing capacitor 3 passes through the converter circuit 300 and flows into the inverter circuit 100, and then the current from the inverter circuit 100 is regenerated to the AC power supply 1, passes through the converter circuit 300, and returns to the negative terminal of the smoothing capacitor 3. At this time, in the inverter circuit 100, current control is performed by PWM control such that the DC capacitor 105 is charged.

It is noted that when the voltage Vin is negative, the semiconductor switching devices 302a and 303a are turned on and the other semiconductor switching devices 301a and 304a are turned off.

In the period of $\theta_A \leq \theta \leq \theta_B$ and $\pi-\theta_B \leq \theta \leq \pi-\theta_A$, in the inverter circuit 100, the AC-side output voltage is controlled to be 0 to cause current not to flow in the DC capacitor 105, while the DC capacitor 105 does not perform charge and discharge. Then, in the converter circuit 300, switching of the semiconductor switching devices 301a to 304a is performed by PWM control so as to maintain the DC voltage Vdc of the smoothing capacitor 3 at the target voltage Vdc* and control the current Iin such that the input power factor is about (−1).

Next, a fourth example of the current control switching operation will be described below based on FIG. 24. In this case, at the phase $\theta_1$ determining the short-circuit period T obtained by the above expression 1, the voltage Vsub of the DC capacitor 105 does not satisfy the two conditions of expressions 4 and 5. That is, Vsub<Vp·sin $\theta_1$ and Vsub<(Vdc*−Vp·sin $\theta_1$) are satisfied. Then, as in the above embodiment 4, a new phase $\theta_A$ and a new phase $\theta_B$ determining the short-circuit period T and the open-circuit period K are to be determined.

That is, in the short-circuit period T, the voltage Vsub of the DC capacitor 105 satisfies the above expression 2 so that the voltage Vsub is equal to or greater than the magnitude of the voltage Vin of the AC power supply 1. In the open-circuit period K, the voltage Vsub satisfies the above expression 3 so that the voltage Vsub is equal to or greater than the difference between the magnitudes of the voltage Vdc (target voltage Vdc*) of the smoothing capacitor 3 and the voltage Vin. In addition, the short-circuit period T and the open-circuit period K are newly set such that the charge-discharge amount of the DC capacitor 105 of the inverter circuit 100 is 0 in total.

In the short-circuit period T and in the open-circuit period K, the current control is performed by PWM control for the inverter circuit 100, and in the other period, the current control is performed by PWM control for the converter circuit 300.

Figure 24:
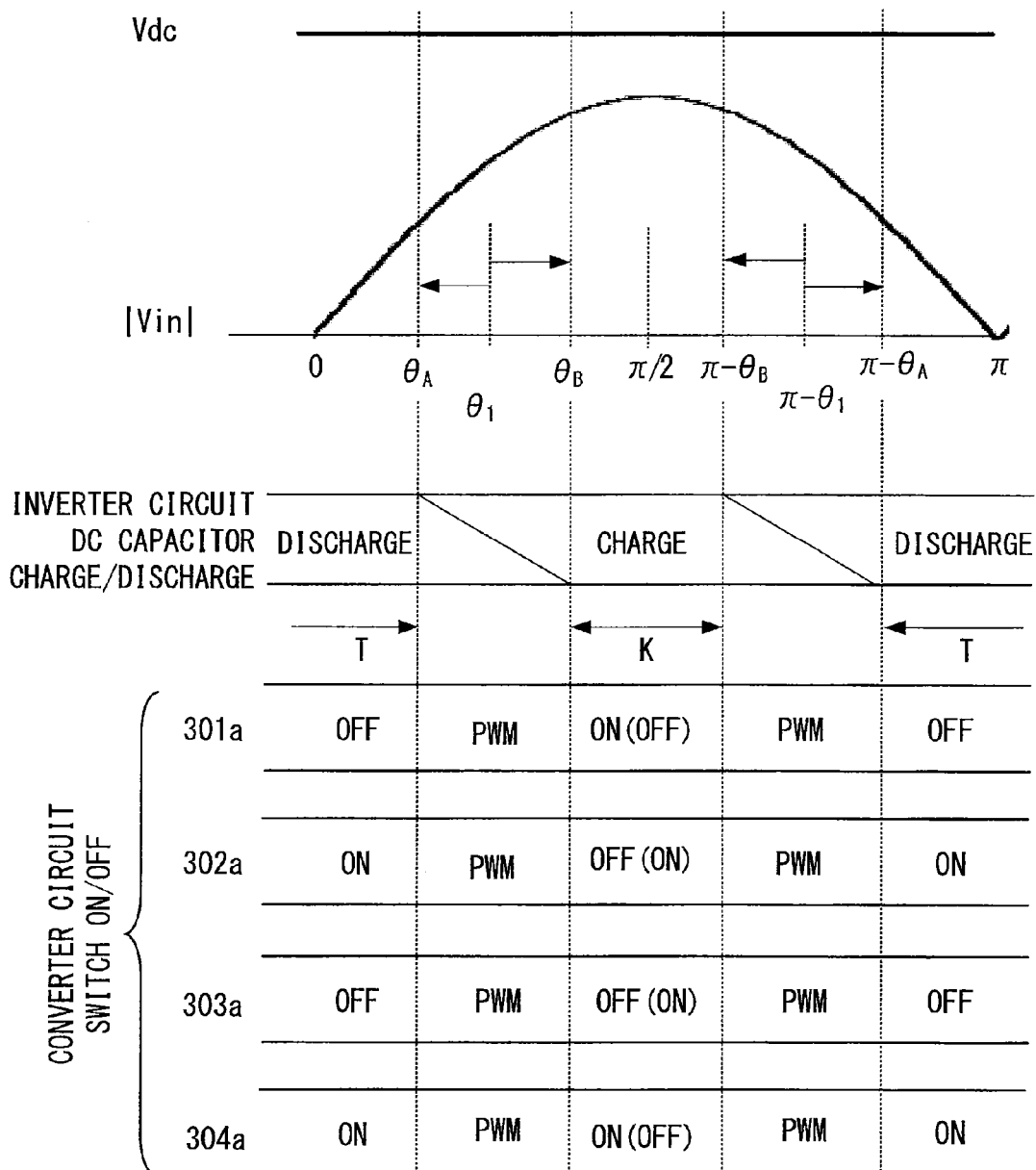
FIG. 24 is a diagram explaining a fourth example of current control switching operation together with a waveform at each section, in the power conversion apparatus according to embodiment 5 of the present invention.

As shown in FIG. 24, in the short-circuit period T of $0 \leq \theta \leq \theta_A$ and $\pi-\theta_A \leq \theta \leq \pi$, the converter circuit 300 continuously turns on the semiconductor switching devices 302a and 304a which are short-circuit switches, to bypass the smoothing capacitor 3. At this time, the other semiconductor switching devices 301a and 303a in the converter circuit 300 are turned off. Current from the positive terminal of the DC capacitor 105 in the inverter circuit 100 is regenerated to the AC power supply 1, passes through the converter circuit 300, and then flows into the inverter circuit 100, to return to the negative terminal of the DC capacitor 105. At this time, in the inverter circuit 100, current control is performed by PWM control such that the DC capacitor 105 is caused to discharge.

In the open-circuit period K of $\theta_B \leq \theta \leq \pi-\theta_B$, in the converter circuit 300, the semiconductor switching devices 301a and 304a are turned on and the other semiconductor switching devices 302a and 303a are turned off, whereby DC power from the smoothing capacitor 3 is continuously inputted to the converter circuit 300. Current from the positive terminal of the smoothing capacitor 3 passes through the converter circuit 300 and flows into the inverter circuit 100, and then the current from the inverter circuit 100 is regenerated to the AC power supply 1, passes through the converter circuit 300, and returns to the negative terminal of the smoothing capacitor 3. At this time, in the inverter circuit 100, current control is performed by PWM control such that the DC capacitor 105 is charged.

It is noted that when the voltage Vin is negative, the semiconductor switching devices 302a and 303a are turned on and the other semiconductor switching devices 301a and 304a are turned off.

In the period of $\theta_A \leq \theta \leq \theta_B$ and $\pi-\theta_B \leq \theta \leq \pi-\theta_A$, in the inverter circuit 100, the AC-side output voltage is controlled to be 0 to cause current not to flow in the DC capacitor 105, while the DC capacitor 105 does not perform charge and discharge. Then, in the converter circuit 300, switching of the semiconductor switching devices 301a to 304a is performed by PWM control so as to maintain the DC voltage Vdc of the smoothing capacitor 3 at the target voltage Vdc* and control the current Iin such that the input power factor is about (−1).

As described above, in the regeneration operation of the power conversion apparatus, in any of the first to fourth examples of the current control switching operation, in the case where there is a period in which the current power factor control by the inverter circuit 100 is not realized, the short-circuit period T and the open-circuit period K are newly set such that the above expression 2 is satisfied in the short-circuit period T and the above expression 3 is satisfied in the open-circuit period K and such that the charge-discharge amount of the DC capacitor 105 of the inverter circuit 100 is 0 in total. Then, in the short-circuit period T and the open-circuit period K, current control by the inverter circuit 100 is performed, and in the other period, current control by the converter circuit 300 is performed. Thus, the DC voltage of the DC capacitor 105 of the inverter circuit 100 is kept constant, and power factor control for the input current Iin is continued throughout one cycle, so that the power factor of the input current Iin is controlled to be (−1).

The control configuration for the converter circuit 300 by the control circuit 10 is the same as in FIG. 10 shown in the above embodiment 1. Particularly, the first example corresponds to the case of FIG. 11, and the second and third examples correspond to the case of FIG. 14. The control configuration for the inverter circuit 100 is the same as in FIG. 12. It is noted that the current Iin is controlled such that the power factor is about 1 in the power running operation and about (−1) in the regeneration operation. The gate signal 12 for the converter circuit 300 and the gate signal 11 for the inverter circuit 100 correspond to the cases of FIGS. 21 to 24.

In the present embodiment, the control circuit 10 has the regeneration function of regenerating power of the smoothing capacitor 3 to the AC power supply 1. In addition, even in the case where the voltage Vsub of the DC capacitor 105 does not satisfy the condition for realizing the current control by the inverter circuit 100 in the entire phase range of the AC power supply, a period for performing PWM control for the converter circuit 300 is provided, whereby the power factor of the input current is controlled to be (−1) while the PWM control for the inverter circuit 100 and the PWM control for the converter circuit 300 are switched therebetween.

Therefore, not only in the power running operation but also in the regeneration operation, the current control can be continued reliably throughout one cycle of the AC power supply 1 and the DC voltage Vsub of the inverter circuit 100 can be reduced. Therefore, the ranges of the AC power supply voltage Vin and the DC voltage Vdc can be expanded without increasing the withstand voltage of the power conversion apparatus, the current control can be realized in a wide operation range, and downsizing and power loss reduction of the power conversion apparatus can be realized. In addition, since the current control can be continued, reliability of the apparatus is improved.

Embodiment 6

In the above embodiments 1 to 5, when the converter circuit 300 performs the current control by PWM control, the inverter circuit 100 outputs 0. In the present embodiment 6, when the converter circuit 300 performs the current control by PWM control, the inverter circuit 100 outputs voltage having a polarity opposite to the power supply voltage Vin. It is noted that the main circuit configuration is the same as in the above embodiment 1, and the basic power running operation described with reference to FIGS. 2 to 7 is also the same as in the above embodiment 1.

The case where the voltage Vsub of the DC capacitor 105 does not satisfy one or both of expressions 4 and 5 of the above three conditions (expressions 4 to 6) will be described below based on FIG. 25. Here, the power running operation is assumed.

In this case, there is a period including the phase $\theta_1$ of the AC power supply 1 in which the inverter circuit 100 cannot perform one or both of operation of outputting voltage (−Vin) to charge the DC capacitor 105 and operation of outputting voltage (Vdc*−Vin) to cause the DC capacitor 105 to discharge. Therefore, a new phase $\theta_A$ and a new phase $\theta B$ determining the short-circuit period T and the open-circuit period K are to be determined.

In the short-circuit period T and the open-circuit period K, current control is performed by PWM control for the inverter circuit 100, and in the other period, PWM control is performed for the converter circuit 300. In the short-circuit period T of $0 \leq \theta \leq \theta_A$, $\pi - \theta_A \leq \theta \leq \pi + \theta_A$, and $2\pi - \theta_A \leq \theta \leq 2\pi$, the voltage Vsub of the DC capacitor 105 satisfies the above expression 2, and in the open-circuit period K of $\theta_B \leq \theta \leq \pi - \theta_B$ and $\pi + \theta_B \leq \theta \leq 2\pi - \theta_B$, the voltage Vsub satisfies the above expression 3.

That is, in the short-circuit period T, the voltage Vsub is equal to or greater than the magnitude of the voltage Vin of the AC power supply 1, and in the open-circuit period K, the voltage Vsub is equal to or greater than the difference between the magnitudes of the voltage Vdc (target voltage Vdc*) of the smoothing capacitor 3 and the voltage Vin.

In the period other than the short-circuit period T and the open-circuit period K, the converter circuit 300 performs current control by PWM control, and in said period, the inverter circuit 100 outputs voltage having a polarity opposite to the power supply voltage Vin.

Therefore, the control circuit 10 determines the phase $\theta_A$ and the phase $\theta_B$ such that the above expression 2 is satisfied in the short-circuit period T and the above expression 3 is satisfied in the open-circuit period K and such that the charge-discharge amount of the DC capacitor 105 is 0 in one cycle (or half cycle or ¼ cycle) including the short-circuit period T, the open-circuit period K, and the period in which the converter circuit 300 performs PWM control. In this case, the phase $\theta_A$ and the phase $\theta_B$ are determined so as to satisfy the following expression D.

[Mathematical 4]

$$\int_0^{\theta_A} V_p \sin\theta \cdot I_p \sin\theta \cdot d\theta + \int_{\theta_A}^{\theta_B} V_{sub} \sin \cdot I_p \sin\theta \cdot d\theta = \int_{\theta_B}^{\theta/2} (V_{dc}{}^* - V_p \sin\theta) \cdot I_p \sin\theta \cdot d\theta \quad \text{Expression D}$$

Figure 25:
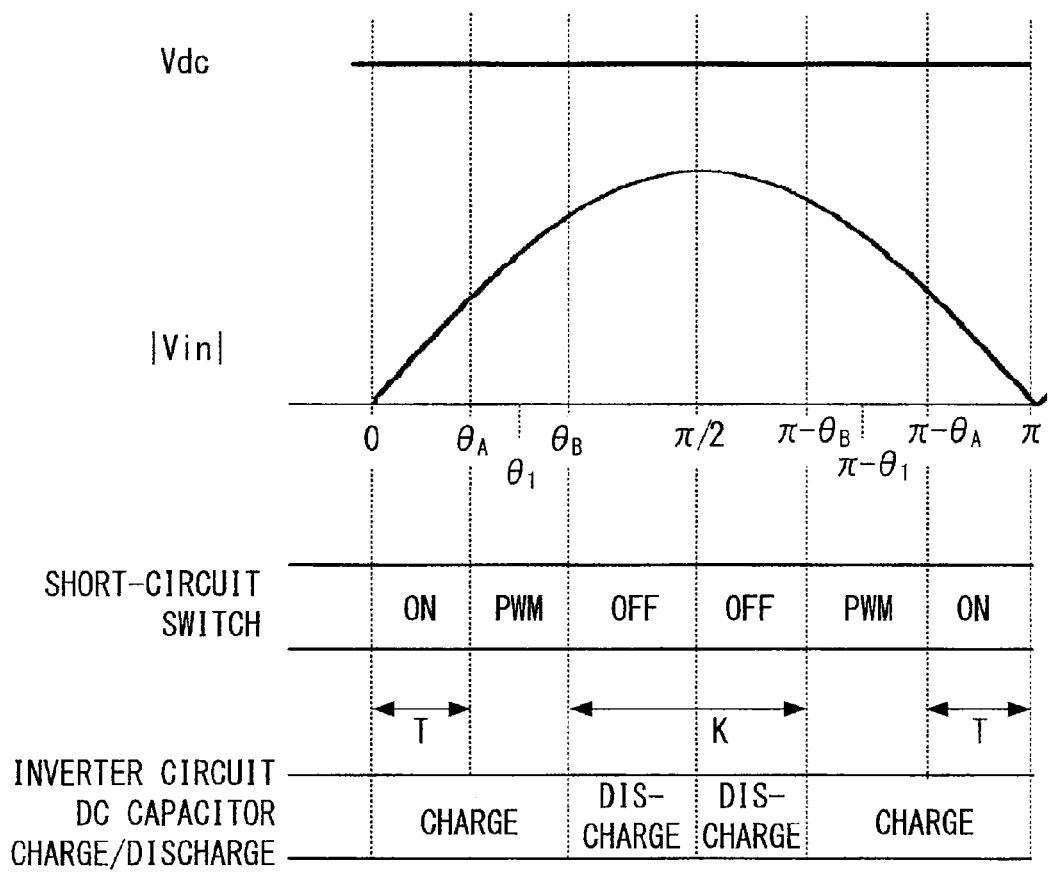
FIG. 25 is a diagram explaining current control switching operation together with a waveform at each section, in the power conversion apparatus according to embodiment 6 of the present invention.

Then, as shown in FIG. 25, in the short-circuit period T of $0 \leq \theta \leq \theta_A$ and $\pi - \theta_A \leq \theta \leq \pi$, the converter circuit 300 continuously turns on the semiconductor switching devices 302a and 304a which are short-circuit switches, to bypass the smoothing capacitor 3. At this time, the other semiconductor switching devices 301a and 303a in the converter circuit 300 are turned off. Current from the AC power supply 1 flows into the inverter circuit 100 to charge the DC capacitor 105, and then passes through the converter circuit 300 to return to the AC power supply 1. At this time, in the inverter circuit 100, current control is performed by PWM control such that the DC capacitor 105 is charged.

In the open-circuit period K of $\theta_B \leq \theta \leq \pi - \theta_B$, in the converter circuit 300, all the semiconductor switching devices 301a to 304a are turned off. Current from the AC power supply 1 flows into the inverter circuit 100, and its output passes through the converter circuit 300 while charging the smoothing capacitor 3, and then returns to the AC power supply 1. At this time, in the inverter circuit 100, current control is performed by PWM control such that the DC capacitor 105 is caused to discharge.

In the period of $\theta_A \leq \theta \leq \theta_B$ and $\pi - \theta_B \leq \theta \leq \pi - \theta_A$, in the inverter circuit 100, the semiconductor switching devices 101a and 104a are turned on and the semiconductor switching devices 102a and 103a are turned off. Current from the AC power supply 1 charges the DC capacitor 105 of the inverter circuit 100 and then flows into the converter circuit 300. Then, in the converter circuit 300, the semiconductor switching devices 301a and 303a are turned off and the semiconductor switching device 302a is turned on, and current is controlled by PWM control using the semiconductor switching device 304a, thereby charging the smoothing capacitor 3.

It is noted that when the voltage Vin is negative, in the inverter circuit 100, the semiconductor switching devices 102a and 103a are turned on and the semiconductor switching devices 101a and 104a are turned off, to charge the DC capacitor 105. In the converter circuit 300, the semiconductor switching device 304a is turned on and current is controlled by PWM control using the semiconductor switching device 302a, thereby charging the smoothing capacitor 3.

Thus, in the case where there is a period in which the input current power factor control by the inverter circuit 100 is not realized, the short-circuit period T and the open-circuit period K are newly set so as to cause the charge-discharge amount of the DC capacitor 105 of the inverter circuit 100 to be 0 in total. Then, in the short-circuit period T and the open-circuit period K, current control by the inverter circuit 100 is performed, and in the other period, current control by the converter circuit 300 is performed and the inverter circuit 100 outputs voltage having a polarity opposite to the power supply voltage Vin.

Next, the case where the voltage Vsub of the DC capacitor 105 does not satisfy expression 6 among the above three conditions (expressions 4 to 6) will be described below based on FIG. 26. That is, the power conversion apparatus performs step-down operation, thus satisfying Vsub<(Vp−Vdc*).

In this case, there is a period including a peak voltage point of the AC power supply 1 in which the inverter circuit 100 cannot perform operation of outputting voltage (Vin−Vdc*) to charge the DC capacitor 105. Therefore, a new phase $\theta_B$ determining one end of the open-circuit period K is to be determined, and along with this, a new phase $\theta_A$ determining the short-circuit period T is to be determined. In this case, the phase $\theta_A$ is also the other end of the open-circuit period K.

In the short-circuit period T and the open-circuit period K, current control is performed by PWM control for the inverter circuit 100, and in the other period, PWM control is performed for the converter circuit 300. In the short-circuit period T of $0 \leq \theta \leq \theta_A$, $\pi - \theta_A \leq \theta \leq \pi + \theta_A$, and $2\pi - \theta_A \leq \theta \leq 2\pi$, the voltage Vsub of the DC capacitor 105 satisfies the above expression 2, and in the open-circuit period K of $\theta_A \leq \theta \leq \theta_B$, $\pi - \theta_B \leq \theta \leq \pi - \theta_A$, $\pi + \theta_A \leq \theta \leq \pi + \theta_B$, $2\pi - \theta_B \leq \theta \leq 2\pi - \theta_A$, the voltage Vsub satisfies the above expression 3.

That is, in the short-circuit period T, the voltage Vsub is equal to or greater than the magnitude of the voltage Vin of the AC power supply 1, and in the open-circuit period K, the voltage Vsub is equal to or greater than the difference between the magnitudes of the voltage Vdc (target voltage Vdc*) of the smoothing capacitor 3 and the voltage Vin.

In the period other than the short-circuit period T and the open-circuit period K, the converter circuit 300 performs current control by PWM control, and in said period, the inverter circuit 100 outputs voltage having a polarity opposite to the power supply voltage Vin.

Therefore, the control circuit 10 determines the phase $\theta_A$ and the phase $\theta_B$ such that the above expression 2 is satisfied in the short-circuit period T and the above expression 3 is satisfied in the open-circuit period K and such that the charge-discharge amount of the DC capacitor 105 is 0 in one cycle (or half cycle or ¼ cycle) including the short-circuit period T, the open-circuit period K, and the period in which the converter circuit 300 performs PWM control. In this case, the phase $\theta_A$ and the phase $\theta_B$ are determined so as to satisfy the following expression E.

[Mathematical 5]

$$\int_0^{\theta_A} V_p \sin\theta \cdot I_p \sin\theta \cdot d\theta + \int_{\theta_2}^{\theta_B}(V_p \sin\theta - V_{dc}^*) \cdot I_p \sin\theta \cdot d\theta + \int_{\theta_B}^{\pi/2} V_{sub} \cdot I_p \sin\theta \cdot d\theta = \int_{\theta_A}^{\theta_2}(V_{dc}^* - V_p \sin\theta) \cdot I_p \sin\theta \cdot d\theta$$

Expression E

Figure 26:
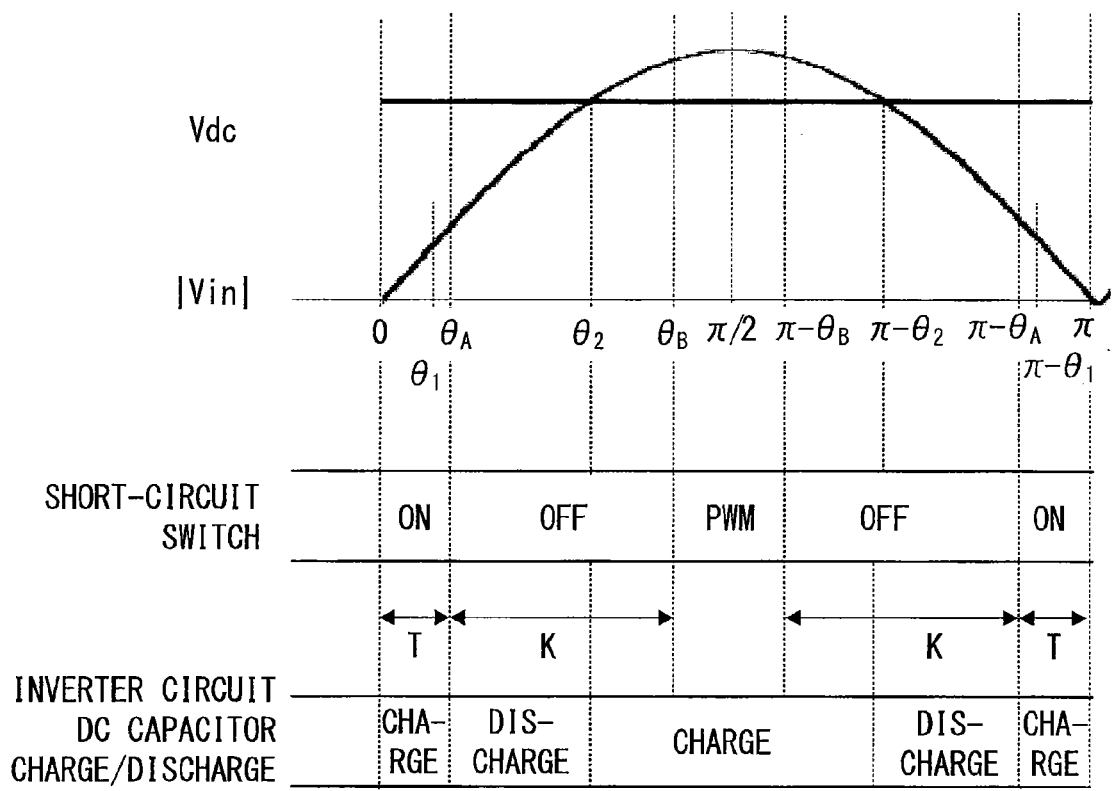
FIG. 26 is a diagram explaining another example of current control switching operation together with a waveform at each section, in the power conversion apparatus according to embodiment 6 of the present invention.

Then, as shown in FIG. 26, in the short-circuit period T of $0 \leq \theta \leq \theta_A$ and $\pi - \theta_A \leq \theta \leq \pi$, the converter circuit 300 continuously turns on the semiconductor switching devices 302a and 304a which are short-circuit switches, to bypass the smoothing capacitor 3. At this time, the other semiconductor switching devices 301a and 303a in the converter circuit 300 are turned off. Current from the AC power supply 1 flows into the inverter circuit 100 to charge the DC capacitor 105, and then passes through the converter circuit 300 to return to the AC power supply 1. At this time, in the inverter circuit 100, current control is performed by PWM control such that the DC capacitor 105 is charged.

In the open-circuit period K of $\theta_A \leq \theta \leq \theta_B$ and $\pi - \theta_B \leq \theta \leq \pi - \theta_A$, in the converter circuit 300, all the semiconductor switching devices 301a to 304a are turned off. Current from the AC power supply 1 flows into the inverter circuit 100, and its output passes through the converter circuit 300 while charging the smoothing capacitor 3, and then returns to the AC power supply 1. At this time, in the inverter circuit 100, when the voltage Vin is equal to or smaller than the voltage Vdc* of the smoothing capacitor 3, current control is performed by PWM control such that the DC capacitor 105 is caused to discharge, and when the voltage Vin is equal to or greater than the voltage Vdc* of the smoothing capacitor 3, current control is performed by PWM control such that the DC capacitor 105 is charged.

In the period of $\theta_B \leq \theta \leq \pi - \theta_B$, in the inverter circuit 100, the semiconductor switching devices 101a and 104a are turned on and the semiconductor switching devices 102a and 103a are turned off. Current from the AC power supply 1 charges the DC capacitor 105 of the inverter circuit 100 and then flows into the converter circuit 300. Then, in the converter circuit 300, the semiconductor switching devices 301a and 303a are turned off and the semiconductor switching device 302a is turned on, and current is controlled by PWM control using the semiconductor switching device 304a, thereby charging the smoothing capacitor 3.

It is noted that when the voltage Vin is negative, in the inverter circuit 100, the semiconductor switching devices 102a and 103a are turned on and the semiconductor switching devices 101a and 104a are turned off, to charge the DC capacitor 105. In the converter circuit 300, the semiconductor switching device 304a is turned on and current is controlled by PWM control using the semiconductor switching device 302a, thereby charging the smoothing capacitor 3.

Also in this case, as in the case shown in FIG. 25, if there is a period in which the input current power factor control by the inverter circuit 100 is not realized, the short-circuit period T and the open-circuit period K are newly set so as to cause the charge-discharge amount of the DC capacitor 105 of the inverter circuit 100 to be 0 in total. Then, in the short-circuit period T and the open-circuit period K, current control by the inverter circuit 100 is performed, and in the other period, current control by the converter circuit 300 is performed and the inverter circuit 100 outputs voltage having a polarity opposite to the power supply voltage Vin.

The control configuration for the converter circuit 300 by the control circuit 10 is the same as in FIGS. 10 and 14 shown in the above embodiment 1. The gate signal 12 for the converter circuit 300 corresponds to the case of FIG. 25 or 26.

Figure 27:
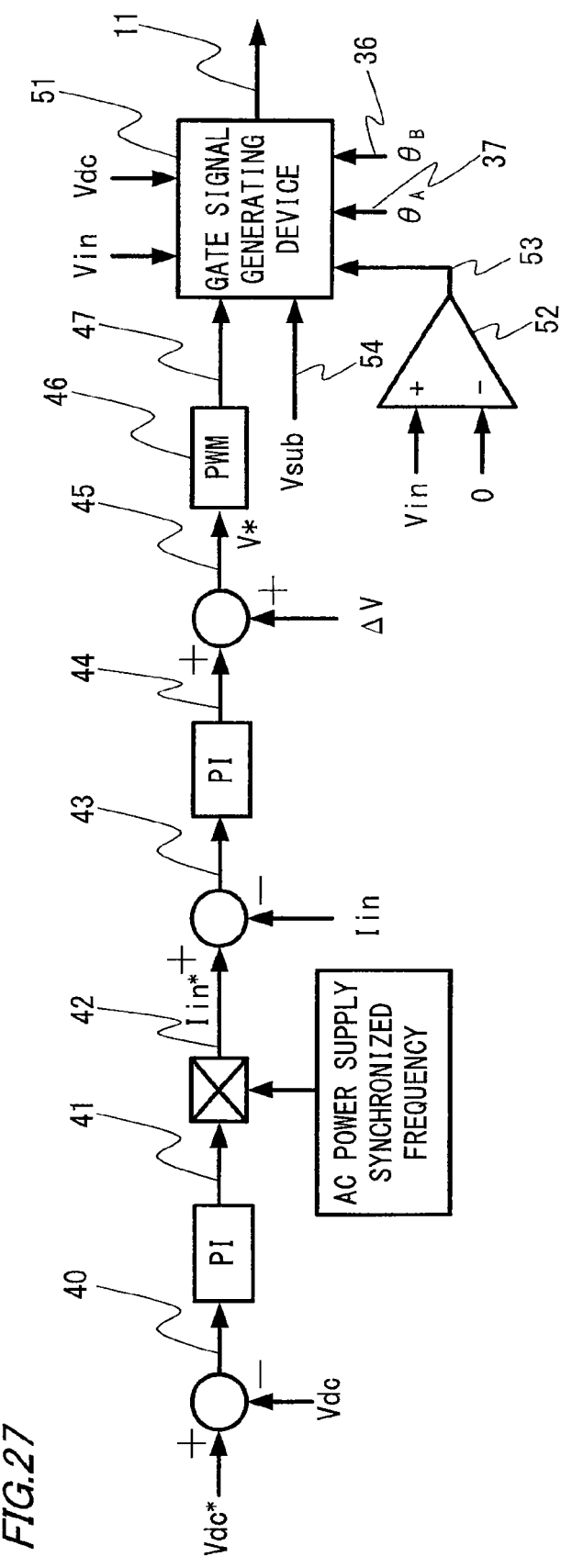
FIG. 27 is a control block diagram showing control for the converter circuit by the control circuit according to embodiment 6 of the present invention.

The output control for the inverter circuit 100 will be described below. FIG. 27 is a control block diagram of output control for the inverter circuit 100 by the control circuit 10. As shown in FIG. 27, in basic output control for the inverter circuit 100, the DC voltage Vdc of the smoothing capacitor 3 is maintained at the target voltage Vdc* and the current Iin is controlled such that the power factor of the AC power supply 1 is about 1.

First, using as a feedback amount a difference 40 between the DC voltage Vdc and the target voltage Vdc* of the smoothing capacitor 3, PI control is performed to obtain an output as an amplitude target value 41, and then based on the amplitude target value 41, a current instruction Iin*42 represented by a sine wave synchronized with the voltage Vin is generated from an AC power supply synchronized frequency. Next, using as a feedback amount a difference 43 between the current instruction value Iin*42 and the detected current Iin, PI control is performed to obtain an output as a voltage instruction 44 which is a target value of the generated voltage of the inverter circuit 100. At this time, the voltage instruction 44 is corrected by adding thereto a feedforward correction voltage ΔV synchronized with a time of switching between control in the short-circuit period T for short-circuiting the AC terminals of the converter circuit 300, and control in the periods other than the short-circuit period. Then, a gate signal 47 for each of the semiconductor switching devices 101a to 104a of the inverter circuit 100 is generated by PWM control 46 using the corrected voltage instruction 45, and is inputted to a gate signal generating device 51.

Then, the gate signal generating device 51 receives the gate signal 47 by the input current power factor control, the phases $\theta_A$ 37 and $\theta_B$ 36 determining the short-circuit period T and the open-circuit period K, calculated by the control of the converter circuit 300, the voltage Vsub of the DC capacitor 105, and a polarity 53 of the power supply voltage Vin. Then, further based on the voltage Vin of the AC power supply 1 and the DC voltage Vdc of the smoothing capacitor 3, the gate signal generating device 51 outputs the gate signal 11 to the inverter circuit 100. As the gate signal 11 to the inverter circuit 100, the gate signal 47 is outputted in the short-circuit period T and in the open-circuit period K, and a gate signal for outputting voltage Vsub is outputted in the other period.

In the present embodiment, the DC voltage of the DC capacitor 105 of the inverter circuit 100 is kept constant, and power factor control for the input current Iin is continued throughout one cycle, so that the power factor of the input current Iin is controlled to be 1. Further, in the period in which current control is performed by the converter circuit 300, since the inverter circuit 100 outputs voltage having a polarity opposite to the power supply voltage Vin, the switching voltage in the converter circuit 300 is equal to the differential voltage between the power supply voltage Vin and the output voltage Vsub of the inverter circuit 100. Therefore, the switching voltage is reduced as compared to the case of the above embodiments 1 to 4, so that switching loss in the converter circuit 300 is reduced. In addition, applied voltage on the reactor 2 is also equal to the differential voltage between the power supply voltage Vin and the output voltage Vsub of the inverter circuit 100, and therefore the applied voltage is reduced. In this case, iron loss of the reactor 2 can be reduced, and further, the reactor capacity can be reduced by an amount corresponding to the reduction amount of the applied voltage.

It is noted that also the present embodiment can be applied to a power conversion apparatus capable of bidirectional control for power running/regeneration, and also in such a case, the same effect is obtained.

Embodiment 7

In the above embodiments, the inverter circuit 100 is composed of one single-phase inverter. However, the inverter circuit may be composed of a plurality of single-phase inverters whose AC sides are connected in series. In this case, the sum of the voltages of DC capacitors of the plurality of single-phase inverters connected in series is considered to be the voltage Vsub. Then, based on whether or not such voltage Vsub satisfies the above three conditions (expressions 4 to 6), whether or not current control by the inverter circuit can be realized in the entire phase range of the AC power supply is determined.

Then, in the case where there is a period in which the input current power factor control by the inverter circuit 100 is not realized, the short-circuit period T and the open-circuit period K are newly set so as to cause the charge-discharge amount of each DC capacitor of the inverter circuit to be 0 in total. Then, in the short-circuit period T and the open-circuit period K, PWM control is performed for the inverter circuit to perform current control, and in the other period, PWM control is performed for the converter circuit 300 to perform current control, whereby the DC voltage of the DC capacitor 105 of the inverter circuit 100 is kept constant, and power factor control for the input current Iin is continued throughout one cycle, so that the power factor of the input current Iin is controlled to be 1. In this case, during the period in which PWM control is performed for the converter circuit 300, all the output voltages of the single-phase inverters of the inverter circuit are set to 0. Alternatively, by applying the above embodiment 6, the output voltages of one or more single-phase inverters may be set to have a polarity opposite to the power supply voltage Vin.

Also in this case, the same effect as in the above embodiments 1 to 4 and the above embodiment 6 can be obtained.

Further, the present embodiment can be applied to a power conversion apparatus capable of bidirectional control for power running/regeneration, whereby the same effect as in the above embodiment 5 can be obtained.

It is noted that, within the scope of the present invention, the above embodiments may be freely combined with each other, or each of the above embodiments may be modified or abbreviated as appropriate.

INDUSTRIAL APPLICABILITY

The present invention relates to an apparatus which superimposes the AC-side output of a single-phase inverter onto a power supply output to obtain desired DC voltage, and the present invention is widely applicable to a field of power conversion.

The invention claimed is:
1. A power conversion apparatus comprising:
an inverter circuit including a plurality of semiconductor switching devices and a DC capacitor and connected in series to a first terminal of an AC power supply;
a converter circuit including a plurality of semiconductor switching devices provided between DC bus lines, the converter circuit having one AC terminal connected in series to the inverter circuit and the other AC terminal connected to a second terminal of the AC power supply, and being configured to output DC power between the DC bus lines;
a smoothing capacitor connected between the DC bus lines, for smoothening output of the converter circuit; and
a control circuit for controlling the inverter circuit and the converter circuit such that voltage of the DC capacitor of the inverter circuit follows a set voltage instruction value, voltage of the smoothing capacitor follows target voltage, and a power factor of input current which is current from the AC power supply is 1, wherein
the control circuit provides a short-circuit period including a zero cross phase of the AC power supply in which the AC terminals of the converter circuit are continuously short-circuited to bypass the smoothing capacitor, and an open-circuit period in which DC output of the converter circuit is continuously outputted to the smoothing capacitor, and the control circuit thereby causes the voltage of the DC capacitor of the inverter circuit to follow the set voltage instruction value,
the control circuit performs PWM control for the inverter circuit to control an input power factor to be 1 in the short-circuit period and in the open-circuit period and disables the PWM control for the inverter circuit in an other time period between the short-circuit period and the open-circuit period, and
the control circuit provides a period for performing the PWM control for the converter circuit during the other time period when the PWM control for the inverter circuit is disabled in accordance with the voltage of the DC capacitor, and controls the power factor of the input current to be 1 by switching the PWM control for the inverter circuit and the PWM control for the converter circuit therebetween.
2. The power conversion apparatus according to claim 1, wherein the control circuit determines the short-circuit period and the open-circuit period such that the voltage of the DC capacitor of the inverter circuit is, in the short-circuit period, equal to or greater than voltage of the AC power supply, and in the open-circuit period, equal to or greater than a difference between the magnitudes of the voltage of the smoothing capacitor and the voltage of the AC power supply.

3. The power conversion apparatus according to claim 1, wherein the control circuit controls AC-side output voltage of the inverter circuit to be 0 in the period for performing the PWM control for the converter circuit, and causes a charge-discharge amount of the DC capacitor of the inverter circuit in the short-circuit period and in the open-circuit period to be substantially 0 in total.

4. The power conversion apparatus according to claim 3, wherein the control circuit has a regeneration function of regenerating power from the smoothing capacitor to the AC power supply, and controls the inverter circuit and the converter circuit such that the power factor of the input current is (−1) upon regeneration.

5. The power conversion apparatus according to claim 4, wherein the control circuit controls the inverter circuit and the converter circuit such that, upon power running for outputting power to the smoothing capacitor, the DC capacitor of the inverter circuit is charged in the short-circuit period, and upon power regeneration from the smoothing capacitor, the DC capacitor of the inverter circuit discharges in the short-circuit period.

6. The power conversion apparatus according to claim 1, wherein the control circuit causes the inverter circuit to continuously output, to AC side, voltage having a polarity opposite to the voltage of the AC power supply in the period for performing the PWM control for the converter circuit, and causes a charge-discharge amount of the DC capacitor of the inverter circuit in one cycle including the short-circuit period, the open-circuit period, and the period for performing the PWM control for the converter circuit, to be substantially 0 in total.

7. The power conversion apparatus according to claim 6, wherein the control circuit has a regeneration function of regenerating power from the smoothing capacitor to the AC power supply, and controls the inverter circuit and the converter circuit such that the power factor of the input current is (−1) upon regeneration.

8. The power conversion apparatus according to claim 7, wherein the control circuit controls the inverter circuit and the converter circuit such that, upon power running for outputting power to the smoothing capacitor, the DC capacitor of the inverter circuit is charged in the short-circuit period, and upon power regeneration from the smoothing capacitor, the DC capacitor of the inverter circuit discharges in the short-circuit period.

9. The power conversion apparatus according to claim 1, wherein the control circuit has a regeneration function of regenerating power from the smoothing capacitor to the AC power supply, and controls the inverter circuit and the converter circuit such that the power factor of the input current is (−1) upon regeneration.

10. The power conversion apparatus according to claim 9, wherein the control circuit controls the inverter circuit and the converter circuit such that, upon power running for outputting power to the smoothing capacitor, the DC capacitor of the inverter circuit is charged in the short-circuit period, and upon power regeneration from the smoothing capacitor, the DC capacitor of the inverter circuit discharges in the short-circuit period.

* * * * *